(12) United States Patent
Campanella et al.

(10) Patent No.: US 11,844,163 B2
(45) Date of Patent: Dec. 12, 2023

(54) METHOD AND APPARATUS FOR LIGHTING IN AN OFFICE ENVIRONMENT

(71) Applicant: Delos Living LLC, New York, NY (US)

(72) Inventors: Carolina Campanella, New York, NY (US); Nicholas Clements, Denver, CO (US); Syed Shabih Hasan, Princeton Junction, NJ (US); Anja Jamrozik Otto, Montréal (CA); Paige Porter, Naples, FL (US); Rongpeng Zhang, Rochester, MN (US); Jie Zhao, Hoboken, NJ (US)

(73) Assignee: Delos Living LLC, New York, NY (US)

( * ) Notice: Subject to any disclaimer, the term of this patent is extended or adjusted under 35 U.S.C. 154(b) by 275 days.

(21) Appl. No.: 17/433,016

(22) PCT Filed: Feb. 25, 2020

(86) PCT No.: PCT/US2020/019697
§ 371 (c)(1),
(2) Date: Aug. 23, 2021

(87) PCT Pub. No.: WO2020/176503
PCT Pub. Date: Sep. 3, 2020

(65) Prior Publication Data
US 2022/0159811 A1        May 19, 2022

Related U.S. Application Data

(60) Provisional application No. 62/810,554, filed on Feb. 26, 2019.

(51) Int. Cl.
*H05B 47/115*        (2020.01)
*H05B 47/11*         (2020.01)

(52) U.S. Cl.
CPC ........... *H05B 47/115* (2020.01); *H05B 47/11* (2020.01)

(58) Field of Classification Search
CPC ........ H05B 47/11; H05B 47/115; Y02B 20/40
See application file for complete search history.

(56) References Cited

U.S. PATENT DOCUMENTS

| 628,351 A | 7/1899 | Gibson |
| 828,733 A | 8/1906 | Fuller |

(Continued)

FOREIGN PATENT DOCUMENTS

| CA | 2307458 | 11/2001 |
| CA | 2740939 | 3/2010 |

(Continued)

OTHER PUBLICATIONS

International Search Report for PCT/JUS2020/019697, dated Jul. 14, 2020 (4 pages).

(Continued)

*Primary Examiner* — Alexander H Taningco
*Assistant Examiner* — Pedro C Fernandez
(74) *Attorney, Agent, or Firm* — Fitch, Even, Tabin & Flannery LLP

(57) ABSTRACT

In some embodiments, devices, systems, and methods herein may be used to operate an environmental control system in order to improve environmental satisfaction and/or cognitive function for one or more occupants or groups of occupants of an indoor environment. By some approaches, the devices, systems, and methods described herein may be employed by occupants, managers or owners of indoor environments to improve satisfaction with lighting and/or improve the performance of various executive functions for one or more occupants of an indoor environment. In some embodiments, the devices, systems, and methods described (Continued)

herein may be used to adjust various lighting parameters in an indoor environment, for example, lighting parameters that are indicative of access to natural light in the indoor environment.

20 Claims, 10 Drawing Sheets

(56) References Cited

U.S. PATENT DOCUMENTS

| | | |
|---|---|---|
| 853,033 A | 5/1907 | Roberts |
| 1,648,277 A | 11/1927 | Korb |
| 1,856,969 A | 5/1932 | Reiter |
| 2,184,644 A | 12/1939 | Homberger |
| 3,483,302 A | 12/1969 | Ashkenas |
| RE27,027 E | 1/1971 | Cristofv |
| 3,621,838 A | 11/1971 | Antho |
| 3,678,337 A | 7/1972 | Grauvogel |
| 3,782,006 A | 1/1974 | Symmes |
| 3,901,215 A | 8/1975 | John |
| 3,910,701 A | 10/1975 | Henderson |
| 4,074,124 A | 2/1978 | Maute |
| 4,122,334 A | 10/1978 | Owens |
| 4,135,116 A | 1/1979 | Smith |
| 4,233,545 A | 11/1980 | Webster |
| 4,236,101 A | 11/1980 | Luchaco |
| 4,247,766 A | 1/1981 | Warren |
| 4,273,999 A | 6/1981 | Pierpoint |
| 4,308,911 A | 1/1982 | Mandl |
| 4,319,088 A | 3/1982 | Orfield |
| 4,587,459 A | 5/1986 | Blake |
| 4,638,853 A | 1/1987 | Papak |
| 4,701,669 A | 10/1987 | Head |
| 4,717,343 A | 1/1988 | Densky |
| D295,934 S | 5/1988 | Dyrhood |
| 4,755,140 A | 7/1988 | Rimland |
| 4,770,636 A | 9/1988 | Buschke |
| 4,803,625 A | 2/1989 | Fu |
| 4,828,609 A | 5/1989 | Anderson |
| 4,853,854 A | 8/1989 | Behar |
| 4,858,609 A | 8/1989 | Cole |
| 4,882,166 A | 11/1989 | Graham |
| 4,893,291 A | 1/1990 | Bick |
| 4,911,166 A | 3/1990 | Leighton |
| 4,911,737 A | 3/1990 | Yehl |
| 4,916,642 A | 4/1990 | Kaiser |
| 4,930,505 A | 6/1990 | Hatje |
| 4,938,582 A | 7/1990 | Leslie |
| 4,947,928 A | 8/1990 | Parker |
| 4,953,784 A | 9/1990 | Yasufuku |
| 4,962,687 A | 10/1990 | Belliveau |
| D312,018 S | 11/1990 | Giesy |
| 5,006,985 A | 4/1991 | Ehret |
| 5,010,777 A | 4/1991 | Yehl |
| 5,017,142 A | 5/1991 | Bemis |
| 5,043,840 A | 8/1991 | Yehl |
| 5,079,682 A | 1/1992 | Roberts |
| 5,079,726 A | 1/1992 | Keller |
| 5,082,173 A | 1/1992 | Poehlman |
| 5,086,385 A | 2/1992 | Launey |
| 5,092,669 A | 3/1992 | Anderson |
| 5,103,391 A | 4/1992 | Barrett |
| 5,103,408 A | 4/1992 | Greenberg |
| 5,121,030 A | 6/1992 | Schott |
| 5,176,133 A | 1/1993 | Czeisler |
| 5,193,900 A | 3/1993 | Yano |
| 5,197,941 A | 3/1993 | Whitaker |
| 5,207,580 A | 5/1993 | Strecher |
| 5,214,736 A | 5/1993 | Uemiya |
| D335,978 S | 6/1993 | Grahn |
| 5,230,629 A | 7/1993 | Buschke |
| 5,250,799 A | 10/1993 | Werner |
| 5,259,553 A | 11/1993 | Shyu |
| 5,285,356 A | 2/1994 | Skene |
| 5,285,430 A | 2/1994 | Decker |
| D345,071 S | 3/1994 | Gould |
| 5,290,200 A | 3/1994 | Kiser |
| 5,292,345 A | 3/1994 | Gerardo |
| 5,295,491 A | 3/1994 | Gevins |
| 5,304,212 A | 4/1994 | Czeisler |
| 5,343,121 A | 8/1994 | Terman |
| 5,344,068 A | 9/1994 | Haessig |
| 5,344,324 A | 9/1994 | O'Donnell |
| 5,350,977 A | 9/1994 | Hamamoto |
| 5,357,170 A | 10/1994 | Luchaco |
| 5,374,876 A | 12/1994 | Horibata |
| 5,377,258 A | 12/1994 | Bro |
| 5,395,042 A | 3/1995 | Riley |
| 5,433,923 A | 7/1995 | Wolverton |
| 5,436,535 A | 7/1995 | Yang |
| 5,462,485 A | 10/1995 | Kinkead |
| D364,762 S | 12/1995 | Compton |
| D365,484 S | 12/1995 | Trattner, Jr |
| 5,473,537 A | 12/1995 | Glazer |
| 5,503,637 A | 4/1996 | Kyricos |
| 5,545,192 A | 8/1996 | Czeisler |
| 5,589,741 A | 12/1996 | Terman |
| 5,596,994 A | 1/1997 | Bro |
| 5,648,656 A | 7/1997 | Begemann |
| 5,692,501 A | 12/1997 | Minturn |
| 5,721,471 A | 2/1998 | Begemann |
| 5,722,418 A | 3/1998 | Bro |
| 5,724,987 A | 3/1998 | Gevins |
| 5,742,516 A | 4/1998 | Olcerst |
| 5,749,365 A | 5/1998 | Magill |
| D396,581 S | 8/1998 | Schubert |
| 5,791,982 A | 8/1998 | Curry |
| 5,805,267 A | 9/1998 | Goldman |
| 5,813,863 A | 9/1998 | Sloane |
| D401,085 S | 11/1998 | Grant |
| 5,833,466 A | 11/1998 | Borg |
| 5,861,717 A | 1/1999 | Begemann |
| 5,892,690 A | 4/1999 | Boatman |
| 5,908,301 A | 6/1999 | Lutz |
| 5,911,581 A | 6/1999 | Reynolds |
| 5,919,217 A | 7/1999 | Hughes |
| 5,937,387 A | 8/1999 | Summerell |
| 5,954,510 A | 9/1999 | Merrill |
| 5,963,294 A | 10/1999 | Schiffer |
| 5,967,789 A | 10/1999 | Segel |
| 5,976,010 A | 11/1999 | Reese |
| 6,053,936 A | 4/2000 | Koyama |
| 6,055,480 A | 4/2000 | Nevo |
| D424,356 S | 5/2000 | Hahn |
| 6,118,230 A | 9/2000 | Fleischmann |
| 6,135,970 A | 10/2000 | Kadhiresan |
| 6,166,496 A | 12/2000 | Lys |
| 6,170,318 B1 | 1/2001 | Lewis |
| 6,197,094 B1 | 3/2001 | Thofelt |
| 6,208,905 B1 | 3/2001 | Giddings |
| 6,235,046 B1 | 5/2001 | Gerdt |
| 6,238,337 B1 | 5/2001 | Kambhatla |
| 6,269,339 B1 | 7/2001 | Silver |
| 6,280,198 B1 | 8/2001 | Calhoun |
| 6,290,140 B1 | 9/2001 | Pesko |
| 6,331,160 B1 | 12/2001 | Bardy |
| 6,340,864 B1 | 1/2002 | Wacyk |
| 6,340,868 B1 | 1/2002 | Lys |
| 6,344,641 B1 | 2/2002 | Blalock |
| 6,348,867 B1 | 2/2002 | Matti |
| 6,350,275 B1 | 2/2002 | Vreman |
| 6,369,716 B1 | 4/2002 | Abbas |
| 6,387,844 B1 | 5/2002 | Fujishima |
| 6,411,046 B1 | 6/2002 | Muthu |
| 6,416,472 B1 | 7/2002 | Cady |
| 6,417,019 B1 | 7/2002 | Mueller |
| 6,419,629 B1 | 7/2002 | Balkin |
| 6,435,878 B1 | 8/2002 | Reynolds |
| 6,439,893 B1 | 8/2002 | Byrd |
| 6,441,558 B1 | 8/2002 | Muthu |
| 6,448,550 B1 | 9/2002 | Nishimura |
| 6,448,978 B1 | 9/2002 | Salvador |
| 6,459,919 B1 | 10/2002 | Lys |

(56) References Cited

U.S. PATENT DOCUMENTS

| | | |
|---|---|---|
| 6,488,698 B1 | 12/2002 | Hyman |
| 6,498,440 B2 | 12/2002 | Stam |
| 6,503,462 B1 | 1/2003 | Michalakos |
| 6,507,159 B2 | 1/2003 | Muthu |
| 6,507,709 B2 | 1/2003 | Hirai |
| 6,525,658 B2 | 2/2003 | Streetman |
| 6,535,190 B2 | 3/2003 | Evanicky |
| 6,553,252 B2 | 4/2003 | Balkin |
| 6,554,439 B1 | 4/2003 | Teicher |
| 6,565,359 B2 | 5/2003 | Calhoun |
| 6,567,009 B2 | 5/2003 | Ohishi |
| 6,582,380 B2 | 6/2003 | Kazlausky |
| 6,583,573 B2 | 6/2003 | Bierman |
| 6,583,720 B1 | 6/2003 | Quigley |
| D477,158 S | 7/2003 | Calcerano |
| 6,589,912 B2 | 7/2003 | Kawai |
| 6,607,484 B2 | 8/2003 | Suzuki |
| 6,608,453 B2 | 8/2003 | Morgan |
| 6,610,127 B2 | 8/2003 | Lu |
| 6,614,013 B2 | 9/2003 | Pitigoi-Aron |
| 6,618,723 B1 | 9/2003 | Smith |
| 6,623,512 B1 | 9/2003 | Heller |
| 6,632,174 B1 | 10/2003 | Breznitz |
| 6,661,798 B2 | 12/2003 | Sano |
| 6,666,567 B1 | 12/2003 | Feldman |
| 6,669,481 B2 | 12/2003 | Winter |
| 6,683,419 B2 | 1/2004 | Kriparos |
| 6,691,070 B1 | 2/2004 | Williams |
| 6,711,470 B1 | 3/2004 | Hartenstein |
| 6,712,615 B2 | 3/2004 | Martin |
| 6,720,745 B2 | 4/2004 | Lys |
| 6,727,091 B2 | 4/2004 | Darlington |
| 6,738,551 B2 | 5/2004 | Noda |
| 6,743,171 B1 | 6/2004 | Bowles |
| 6,755,783 B2 | 6/2004 | Cosentino |
| 6,756,998 B1 | 6/2004 | Bilger |
| 6,757,710 B2 | 6/2004 | Reed |
| 6,769,915 B2 | 8/2004 | Murgia |
| 6,772,016 B1 | 8/2004 | Bertil |
| 6,774,802 B2 | 8/2004 | Bachinski |
| 6,782,351 B2 | 8/2004 | Reichel |
| 6,806,659 B1 | 10/2004 | Mueller |
| 6,834,208 B2 | 12/2004 | Gonzales |
| 6,862,529 B2 | 3/2005 | Brown |
| 6,865,428 B2 | 3/2005 | Gonzales |
| 6,872,221 B2 | 3/2005 | Lytle |
| 6,878,191 B2 | 4/2005 | Escaffre |
| 6,879,451 B1 | 4/2005 | Hewlett |
| 6,884,078 B2 | 4/2005 | Wiig |
| 6,888,453 B2 | 5/2005 | Lutz |
| 6,888,779 B2 | 5/2005 | Mollicone |
| 6,904,508 B2 | 6/2005 | Selkirk |
| 6,912,429 B1 | 6/2005 | Bilger |
| 6,923,653 B2 | 8/2005 | Ito |
| 6,933,486 B2 | 8/2005 | Pitigoi-Aron |
| 6,955,684 B2 | 10/2005 | Savage, Jr. |
| 6,964,638 B2 | 11/2005 | Theodoracopulos |
| 6,967,565 B2 | 11/2005 | Lingemann |
| 6,991,029 B2 | 1/2006 | Orfield |
| 6,992,803 B2 | 1/2006 | Chang |
| 7,004,606 B2 | 2/2006 | Schofield |
| 7,014,336 B1 | 3/2006 | Ducharme |
| 7,024,256 B2 | 4/2006 | Krzyzanowski |
| 7,038,399 B2 | 5/2006 | Lys |
| 7,065,280 B2 | 6/2006 | Ogawa |
| 7,067,995 B2 | 6/2006 | Gunter |
| 7,081,128 B2 | 7/2006 | Hart |
| D526,512 S | 8/2006 | Hahn |
| 7,092,101 B2 | 8/2006 | Brady |
| 7,095,056 B2 | 8/2006 | Vitta |
| 7,097,111 B2 | 8/2006 | Riley |
| 7,099,723 B2 | 8/2006 | Gonzales |
| 7,113,086 B2 | 9/2006 | Shorrock |
| D530,940 S | 10/2006 | Raile |
| 7,129,855 B2 | 10/2006 | Krzyzanowski |
| 7,145,295 B1 | 12/2006 | Lee |
| 7,145,614 B2 | 12/2006 | Lee |
| 7,173,384 B2 | 2/2007 | Ludwig |
| 7,190,126 B1 | 3/2007 | Paton |
| 7,196,619 B2 | 3/2007 | Perlman |
| 7,202,613 B2 | 4/2007 | Morgan |
| 7,204,611 B2 | 4/2007 | Lukas |
| 7,213,940 B1 | 5/2007 | Van De Ven |
| 7,215,086 B2 | 5/2007 | Maxik |
| 7,224,282 B2 | 5/2007 | Terauchi |
| 7,234,943 B1 | 6/2007 | Aleali |
| 7,256,554 B2 | 8/2007 | Lys |
| 7,260,950 B2 | 8/2007 | Choi |
| 7,274,160 B2 | 9/2007 | Mueller |
| 7,288,902 B1 | 10/2007 | Melanson |
| 7,294,107 B2 | 11/2007 | Simon |
| 7,298,871 B2 | 11/2007 | Lee |
| 7,302,313 B2 | 11/2007 | Sharp |
| 7,308,296 B2 | 12/2007 | Lys |
| 7,319,298 B2 | 1/2008 | Jungwirth |
| 7,324,874 B2 | 1/2008 | Jung |
| 7,327,337 B2 | 2/2008 | Callahan |
| 7,328,243 B2 | 2/2008 | Yeager |
| 7,347,818 B2 | 3/2008 | Simon |
| 7,348,949 B2 | 3/2008 | Lee |
| D566,428 S | 4/2008 | Kester |
| 7,354,172 B2 | 4/2008 | Chemel |
| 7,358,679 B2 | 4/2008 | Lys |
| 7,364,583 B2 | 4/2008 | Rose |
| 7,366,989 B2 | 4/2008 | Naik |
| 7,369,903 B2 | 5/2008 | Diederiks |
| 7,387,405 B2 | 6/2008 | Ducharme |
| 7,415,310 B2 | 8/2008 | Bovee |
| 7,446,303 B2 | 11/2008 | Maniam |
| 7,453,217 B2 | 11/2008 | Lys |
| 7,457,834 B2 | 11/2008 | Jung |
| 7,507,091 B1 | 3/2009 | Aleali |
| 7,520,634 B2 | 4/2009 | Ducharme |
| 7,524,279 B2 | 4/2009 | Auphan |
| 7,534,255 B1 | 5/2009 | Streeter |
| 7,536,388 B2 | 5/2009 | Jung |
| 7,545,267 B2 | 6/2009 | Stortoni |
| 7,553,039 B2 | 6/2009 | Harris |
| 7,556,604 B2 | 7/2009 | Murata |
| 7,557,521 B2 | 7/2009 | Lys |
| 7,558,546 B2 | 7/2009 | Johnson |
| 7,567,956 B2 | 7/2009 | Yu |
| 7,572,028 B2 | 8/2009 | Mueller |
| 7,573,210 B2 | 8/2009 | Ashdown |
| 7,574,320 B2 | 8/2009 | Corwin |
| 7,577,915 B2 | 8/2009 | Hunter |
| 7,621,871 B2 | 11/2009 | Downs, III |
| 7,624,028 B1 | 11/2009 | Brown |
| 7,647,285 B2 | 1/2010 | Heckerman |
| 7,652,582 B2 | 1/2010 | Littell |
| 7,659,673 B2 | 2/2010 | Lys |
| 7,676,280 B1 | 3/2010 | Bash |
| 7,679,281 B2 | 3/2010 | Kim |
| 7,680,745 B2 | 3/2010 | Hunter |
| 7,689,437 B1 | 3/2010 | Teller |
| 7,725,842 B2 | 5/2010 | Bronkema |
| 7,759,854 B2 | 7/2010 | Miller |
| 7,766,503 B2 | 8/2010 | Heiking |
| 7,767,280 B2 | 8/2010 | Klasen-Memmer |
| 7,772,965 B2 | 8/2010 | Farhan |
| 7,779,097 B2 | 8/2010 | Lamkin |
| 7,792,920 B2 | 9/2010 | Istvan |
| 7,827,039 B2 | 11/2010 | Butcher |
| 7,828,205 B2 | 11/2010 | Cronin |
| 7,837,472 B1 | 11/2010 | Elsmore |
| 7,839,275 B2 | 11/2010 | Spalink |
| 7,840,310 B2 | 11/2010 | Orfield |
| 7,843,353 B2 | 11/2010 | Pan |
| 7,845,823 B2 | 12/2010 | Mueller |
| 7,848,945 B2 | 12/2010 | Rozell |
| D632,102 S | 2/2011 | Sato |
| 7,878,810 B2 | 2/2011 | Kuntz |
| D634,952 S | 3/2011 | Gile |
| 7,901,071 B1 | 3/2011 | Kulas |

(56) References Cited

U.S. PATENT DOCUMENTS

| | | | |
|---|---|---|---|
| 7,906,789 | B2 | 3/2011 | Jung |
| 7,914,172 | B2 | 3/2011 | Nagara |
| 7,918,406 | B2 | 4/2011 | Rosen |
| 7,918,407 | B2 | 4/2011 | Patch |
| 7,925,673 | B2 | 4/2011 | Beard |
| 7,953,678 | B2 | 5/2011 | Hunter |
| 7,967,731 | B2 | 6/2011 | Kil |
| 7,973,759 | B2 | 7/2011 | Huang |
| 7,977,904 | B2 | 7/2011 | Berman |
| 7,987,490 | B2 | 7/2011 | Ansari |
| 8,025,687 | B2 | 9/2011 | Streeter |
| 8,028,706 | B2 | 10/2011 | Skene |
| 8,035,320 | B2 | 10/2011 | Sibert |
| 8,038,615 | B2 | 10/2011 | Gobeyn |
| 8,042,049 | B2 | 10/2011 | Killian |
| 8,064,295 | B2 | 11/2011 | Palmer |
| 8,066,405 | B2 | 11/2011 | Simon |
| 8,081,216 | B2 | 12/2011 | Cheung |
| 8,083,675 | B2 | 12/2011 | Robinson |
| 8,086,407 | B2 | 12/2011 | Chan |
| 8,095,153 | B2 | 1/2012 | Jenkins |
| 8,100,552 | B2 | 1/2012 | Spero |
| 8,100,746 | B2 | 1/2012 | Heidel |
| 8,137,108 | B2 | 3/2012 | Hamway |
| 8,140,391 | B2 | 3/2012 | Jacobi |
| 8,143,792 | B2 | 3/2012 | Joo |
| 8,147,302 | B2 | 4/2012 | Desrochers |
| 8,150,707 | B2 | 4/2012 | Hayet |
| 8,154,398 | B2 | 4/2012 | Rolf |
| 8,159,150 | B2 | 4/2012 | Ashdown |
| 8,172,153 | B1 | 5/2012 | Kennedy |
| 8,188,873 | B2 | 5/2012 | Barth |
| 8,200,744 | B2 | 6/2012 | Jung |
| 8,202,095 | B2 | 6/2012 | Shankle |
| 8,219,115 | B1 | 7/2012 | Nelissen |
| 8,226,418 | B2 | 7/2012 | Lycas |
| D666,123 | S | 8/2012 | Sichello |
| 8,253,349 | B2 | 8/2012 | Shteynberg |
| 8,271,575 | B2 | 9/2012 | Hunter |
| 8,292,468 | B2 | 10/2012 | Narendran |
| 8,296,408 | B2 | 10/2012 | Anke |
| 8,301,482 | B2 | 10/2012 | Reynolds |
| 8,308,784 | B2 | 11/2012 | Streeter |
| 8,321,192 | B2 | 11/2012 | Boyce |
| 8,344,665 | B2 | 1/2013 | Verfuerth |
| 8,352,408 | B2 | 1/2013 | Guillama |
| 8,358,214 | B2 | 1/2013 | Amigo |
| 8,359,208 | B2 | 1/2013 | Slutzky |
| 8,380,359 | B2 | 2/2013 | Duchene |
| 8,385,812 | B2 | 2/2013 | Bertelsen |
| 8,392,025 | B2 | 3/2013 | Orfield |
| 8,429,223 | B2 | 4/2013 | Gilley |
| 8,436,556 | B2 | 5/2013 | Eisele |
| 8,446,275 | B2 | 5/2013 | Utter, II |
| 8,449,300 | B2 | 5/2013 | Lycas |
| 8,454,729 | B2 | 6/2013 | Mittelmark |
| 8,469,547 | B2 | 6/2013 | Paolini |
| 8,484,153 | B2 | 7/2013 | Mott |
| 8,490,006 | B1 | 7/2013 | Reeser |
| 8,497,871 | B2 | 7/2013 | Zulch |
| 8,506,612 | B2 | 8/2013 | Ashdown |
| 8,508,169 | B2 | 8/2013 | Zaharchuk |
| 8,515,785 | B2 | 8/2013 | Clark |
| 8,527,213 | B2 | 9/2013 | Kailas |
| 8,540,515 | B2 | 9/2013 | Williams |
| 8,543,244 | B2 | 9/2013 | Keeling |
| 8,543,665 | B2 | 9/2013 | Ansari |
| 8,558,466 | B2 | 10/2013 | Curasi |
| 8,558,687 | B2 | 10/2013 | Haupt |
| 8,560,344 | B2 | 10/2013 | Earles |
| 8,609,121 | B2 | 12/2013 | Averett |
| 8,622,560 | B2 | 1/2014 | Di Trapani |
| 8,630,741 | B1 | 1/2014 | Matsuoka |
| 8,632,209 | B2 | 1/2014 | Graeber |
| 8,640,038 | B1 | 1/2014 | Reeser |
| 8,655,717 | B2 | 2/2014 | Schwarzberg |
| 8,660,861 | B2 | 2/2014 | Chun |
| 8,662,897 | B2 | 3/2014 | Sims, Jr. |
| 8,666,666 | B2 | 3/2014 | Bassa |
| 8,674,608 | B2 | 3/2014 | Holland |
| 8,674,842 | B2 | 3/2014 | Zishaan |
| 8,690,771 | B2 | 4/2014 | Wekell |
| 8,707,619 | B2 | 4/2014 | Edwards |
| 8,716,952 | B2 | 5/2014 | Van De Ven |
| 8,740,623 | B2 | 6/2014 | Walker |
| 8,755,942 | B2 | 6/2014 | Bonilla |
| 8,760,370 | B2 | 6/2014 | Maxik |
| 8,783,902 | B2 | 7/2014 | Takakura |
| 8,795,169 | B2 | 8/2014 | Cosentino |
| 8,801,636 | B2 | 8/2014 | Lewicke |
| 8,823,507 | B1 | 9/2014 | Touloumtzis |
| 8,827,489 | B2 | 9/2014 | Li |
| 8,836,243 | B2 | 9/2014 | Eisele |
| 8,843,484 | B2 | 9/2014 | Gu |
| 8,852,254 | B2 | 10/2014 | Moscovici |
| 8,855,757 | B2 | 10/2014 | Kapoor |
| 8,862,532 | B2 | 10/2014 | Beaulieu |
| 8,870,740 | B2 | 10/2014 | Clegg |
| 8,896,427 | B1 | 11/2014 | Ramirez |
| 8,907,803 | B2 | 12/2014 | Martin |
| 8,924,026 | B2 | 12/2014 | Federspiel |
| 8,939,885 | B2 | 1/2015 | Martin |
| 8,941,500 | B1 | 1/2015 | Faaborg |
| 8,952,626 | B2 | 2/2015 | Huang |
| 8,961,414 | B2 | 2/2015 | Teller |
| 8,975,827 | B2 | 3/2015 | Chobot |
| 8,979,913 | B2 | 3/2015 | Marie |
| 8,986,204 | B2 | 3/2015 | Pacey |
| 8,986,427 | B2 | 3/2015 | Hauville |
| 9,007,877 | B2 | 4/2015 | Godlieb |
| 9,010,019 | B2 | 4/2015 | Mittelmark |
| 9,015,610 | B2 | 4/2015 | Hunter |
| 9,020,647 | B2 | 4/2015 | Johnson |
| 9,032,097 | B2 | 5/2015 | Albanese |
| 9,032,215 | B2 | 5/2015 | Kalofonos |
| 9,041,530 | B2 | 5/2015 | Sprigg |
| 9,042,563 | B1 | 5/2015 | Beaty |
| 9,044,567 | B2 | 6/2015 | Poirrier |
| 9,063,739 | B2 | 6/2015 | Ward |
| 9,066,405 | B2 | 6/2015 | Van De Ven |
| 9,068,887 | B1 | 6/2015 | Bennouri |
| D734,958 | S | 7/2015 | Gosling |
| 9,095,029 | B2 | 7/2015 | Lu |
| D737,078 | S | 8/2015 | McKinney |
| 9,098,114 | B2 | 8/2015 | Potter |
| 9,104,183 | B2 | 8/2015 | Zheng |
| 9,110,958 | B2 | 8/2015 | Brust |
| 9,118,499 | B2 | 8/2015 | Hunter |
| 9,125,257 | B2 | 9/2015 | Eisele |
| 9,125,274 | B1 | 9/2015 | Brunault |
| 9,131,573 | B2 | 9/2015 | Maxik |
| 9,147,296 | B2 | 9/2015 | Ricci |
| 9,154,559 | B1 | 10/2015 | Bovee |
| 9,155,165 | B2 | 10/2015 | Chobot |
| 9,204,518 | B2 | 12/2015 | Jung |
| 9,220,202 | B2 | 12/2015 | Maxik |
| 9,226,371 | B2 | 12/2015 | Mohan |
| 9,230,064 | B2 | 1/2016 | Yanev |
| 9,230,560 | B2 | 1/2016 | Ehsani |
| 9,235,978 | B1 | 1/2016 | Charlton |
| 9,236,026 | B2 | 1/2016 | Jia |
| 9,248,309 | B2 | 2/2016 | Pugh |
| 9,251,716 | B2 | 2/2016 | Drane |
| 9,286,442 | B2 | 3/2016 | Csoma |
| 9,297,748 | B2 | 3/2016 | Risk |
| 9,306,763 | B2 | 4/2016 | Tatzel |
| 9,307,608 | B2 | 4/2016 | Maxik |
| 9,326,363 | B2 | 4/2016 | Godlieb |
| 9,339,227 | B2 | 5/2016 | D'Arcy et al. |
| 9,345,091 | B2 | 5/2016 | Pickard |
| 9,360,364 | B2 | 6/2016 | Hingorani |
| 9,360,731 | B2 | 6/2016 | Berman |
| 9,370,689 | B2 | 6/2016 | Guillama |
| D761,598 | S | 7/2016 | Goodman |

(56) References Cited

U.S. PATENT DOCUMENTS

| | | |
|---|---|---|
| 9,380,978 B2 | 7/2016 | Reiner |
| 9,392,665 B2 | 7/2016 | Eisele |
| 9,401,098 B2 | 7/2016 | Ellis |
| 9,410,664 B2 | 8/2016 | Krames |
| 9,420,667 B2 | 8/2016 | Mohan |
| 9,420,671 B1 | 8/2016 | Sugimoto |
| 9,426,867 B2 | 8/2016 | Beghelli |
| 9,429,009 B2 | 8/2016 | Paulk |
| 9,430,617 B2 | 8/2016 | Brust |
| 9,430,927 B2 | 8/2016 | Yu |
| 9,450,904 B2 | 9/2016 | Wheeler |
| 9,456,482 B1 | 9/2016 | Pope |
| 9,465,392 B2 | 10/2016 | Bradley |
| 9,471,751 B1 | 10/2016 | Kahn |
| 9,473,321 B1 | 10/2016 | Bazar |
| 9,480,115 B2 | 10/2016 | Bradford |
| 9,493,112 B2 | 11/2016 | Thomas |
| 9,500,325 B2 | 11/2016 | Tong et al. |
| 9,501,049 B2 | 11/2016 | Rajalakshmi |
| 9,510,426 B2 | 11/2016 | Chemel |
| 9,526,455 B2 | 12/2016 | Horseman |
| 9,528,876 B2 | 12/2016 | Micheels |
| 9,562,702 B2 | 2/2017 | Law |
| 9,576,939 B2 | 2/2017 | Roth |
| 9,589,475 B2 | 3/2017 | Lycas |
| 9,589,480 B2 | 3/2017 | Ellis |
| 9,593,861 B1 | 3/2017 | Burnett |
| 9,595,118 B2 | 3/2017 | Maxik |
| 9,602,589 B1 | 3/2017 | Jackson |
| 9,609,724 B2 | 3/2017 | Bulut |
| 9,615,429 B2 | 4/2017 | Roosli |
| 9,636,520 B2 | 5/2017 | Pedersen |
| 9,642,209 B2 | 5/2017 | Eisele |
| 9,655,195 B2 | 5/2017 | Tseng |
| 9,659,150 B2 | 5/2017 | Greene |
| 9,661,715 B2 | 5/2017 | Van De Ven |
| RE46,430 E | 6/2017 | Sibert |
| 9,672,335 B2 | 6/2017 | Shuart |
| 9,672,472 B2 | 6/2017 | Snyder |
| 9,687,187 B2 | 6/2017 | Dagum |
| 9,693,724 B2 | 7/2017 | Dagum |
| 9,694,496 B2 | 7/2017 | Martinson |
| 9,696,052 B2 | 7/2017 | Malchiondo |
| 9,699,874 B2 | 7/2017 | Phillips |
| 9,703,931 B2 | 7/2017 | Hinkel |
| 9,715,242 B2 | 7/2017 | Pillai |
| 9,717,459 B2 | 8/2017 | Sereno |
| 9,730,298 B2 | 8/2017 | Vangeel |
| 9,734,293 B2 | 8/2017 | Collins, Jr. |
| 9,734,542 B2 | 8/2017 | Ji |
| 9,737,842 B2 | 8/2017 | Matlin |
| 9,750,116 B2 | 8/2017 | Witzgall |
| 9,763,592 B2 | 9/2017 | Le |
| 9,774,697 B2 | 9/2017 | Li |
| 9,788,373 B1 | 10/2017 | Chowdhury |
| 9,791,129 B2 | 10/2017 | Dennis |
| 9,794,355 B2 | 10/2017 | Moghaddam |
| 9,801,259 B2 | 10/2017 | Rasmussen |
| 9,820,656 B2 | 11/2017 | Olivier |
| 9,827,439 B2 | 11/2017 | Maxik |
| 9,839,083 B2 | 12/2017 | Van De Ven |
| 9,842,313 B2 | 12/2017 | Reza |
| 9,848,811 B2 | 12/2017 | Yasumura |
| 9,870,449 B2 | 1/2018 | Rajan |
| 9,874,317 B2 | 1/2018 | Dijken |
| 9,875,667 B2 | 1/2018 | Thompson |
| 9,881,511 B1 | 1/2018 | Srinivasan |
| 9,883,563 B2 | 1/2018 | Bosua |
| 9,887,854 B2 | 2/2018 | Park |
| 9,890,969 B2 | 2/2018 | Martin |
| 9,894,729 B2 | 2/2018 | Forbis |
| 9,907,149 B1 | 2/2018 | Dolan |
| 9,909,772 B2 | 3/2018 | Bazar |
| 9,913,583 B2 | 3/2018 | Smith, Sr. |
| 9,915,438 B2 | 3/2018 | Cheatham, III |
| 9,916,474 B2 | 3/2018 | Tribble |
| 9,924,243 B2 | 3/2018 | Lupien |
| 9,933,182 B2 | 4/2018 | Alfakhrany |
| 9,939,823 B2 | 4/2018 | Ovadia |
| 9,944,519 B2 | 4/2018 | Bohler |
| 9,949,074 B2 | 4/2018 | Austraat |
| 9,952,614 B2 | 4/2018 | Hunter |
| 9,954,147 B2 | 4/2018 | Pentlehner |
| 9,955,423 B2 | 4/2018 | Kates |
| 9,955,550 B2 | 4/2018 | Baek |
| 9,958,180 B2 | 5/2018 | Mahar |
| 9,959,997 B2 | 5/2018 | Bailey |
| 9,984,590 B2 | 5/2018 | Stevens |
| 9,986,313 B2 | 5/2018 | Schwarzkopf |
| 9,992,292 B2 | 6/2018 | Gunnarsson |
| 9,993,198 B2 | 6/2018 | Dugan |
| 10,001,789 B2 | 6/2018 | Hunka |
| 10,015,865 B2 | 7/2018 | Engelen |
| 10,019,690 B2 | 7/2018 | Oobayashi |
| 10,022,556 B1 | 7/2018 | Holbert |
| 10,024,699 B2 | 7/2018 | Rapetti Mogol |
| 10,030,833 B2 | 7/2018 | Adler |
| 10,031,973 B2 | 7/2018 | Dey |
| 10,039,169 B2 | 7/2018 | Chen |
| 10,042,336 B2 | 8/2018 | Cipollo |
| 10,047,971 B2 | 8/2018 | Nyamjav |
| 10,051,707 B2 | 8/2018 | Deixler |
| 10,052,061 B2 | 8/2018 | Raymann |
| 10,054,534 B1 | 8/2018 | Nourbakhsh |
| 10,057,963 B2 | 8/2018 | Mead |
| 10,060,787 B2 | 8/2018 | Balooch |
| 10,064,255 B2 | 8/2018 | Barroso |
| 10,068,297 B2 | 9/2018 | Hull Roskos |
| 10,072,866 B2 | 9/2018 | Bazar |
| 10,075,757 B2 | 9/2018 | Ugan |
| 10,078,865 B2 | 9/2018 | Joshi |
| 10,088,577 B2 | 10/2018 | Klein |
| 10,091,017 B2 | 10/2018 | Landow |
| 10,091,303 B1 | 10/2018 | Ledvina |
| 10,092,772 B1 | 10/2018 | Makesh |
| 10,129,367 B2 | 11/2018 | Yan |
| 10,139,118 B2 | 11/2018 | Law |
| 10,154,574 B2 | 12/2018 | Yeh |
| 10,178,972 B2 | 1/2019 | Raymann |
| 10,203,267 B2 | 2/2019 | D'Orlando et al. |
| 10,230,538 B2 | 3/2019 | Killian |
| 10,234,162 B2 | 3/2019 | Lu |
| 10,242,757 B2 | 3/2019 | Baughman |
| 10,244,606 B2 | 3/2019 | Wingren |
| 10,265,011 B2 | 4/2019 | Garnavi |
| 10,271,400 B2 | 4/2019 | Parker |
| 10,304,249 B2 | 5/2019 | Cronin |
| 10,420,912 B2 | 9/2019 | Alawi |
| 10,527,490 B2 | 1/2020 | Dumont |
| 10,561,376 B1 | 2/2020 | Kahn |
| 10,602,599 B2 | 3/2020 | Wouhaybi |
| 10,709,899 B1 | 7/2020 | Maa |
| 10,775,068 B2 | 9/2020 | Lee |
| 10,845,829 B2 | 11/2020 | Pillai |
| 10,917,259 B1 | 2/2021 | Chein |
| 10,948,348 B2 | 3/2021 | Rountree |
| 10,972,360 B2 | 4/2021 | Cahill |
| 10,976,065 B2 | 4/2021 | Kohn |
| 10,980,096 B2 | 4/2021 | Summers |
| 11,078,899 B2 | 8/2021 | Mou |
| 11,137,163 B2 | 10/2021 | Nasis |
| 11,141,688 B2 | 10/2021 | Hur |
| 11,187,419 B2 | 11/2021 | Aleti |
| 2002/0072322 A1 | 6/2002 | Sharp |
| 2002/0072859 A1 | 6/2002 | Kajimoto |
| 2002/0096121 A1 | 7/2002 | Ingman |
| 2002/0119281 A1 | 8/2002 | Higgins |
| 2002/0128864 A1 | 9/2002 | Maus |
| 2002/0163529 A1 | 11/2002 | Evanicky |
| 2002/0187082 A1 | 12/2002 | Wu |
| 2002/0192624 A1 | 12/2002 | Darby |
| 2003/0100837 A1 | 5/2003 | Lys |
| 2003/0133292 A1 | 7/2003 | Mueller |
| 2003/0199244 A1 | 10/2003 | Siddaramanna |

(56) References Cited

U.S. PATENT DOCUMENTS

| | | |
|---|---|---|
| 2003/0209140 A1 | 11/2003 | Kutt |
| 2003/0209501 A1 | 11/2003 | Leung |
| 2004/0002792 A1 | 1/2004 | Hoffknecht |
| 2004/0052076 A1 | 3/2004 | Mueller |
| 2004/0060677 A1 | 4/2004 | Huang |
| 2004/0065098 A1 | 4/2004 | Choi |
| 2004/0105264 A1 | 6/2004 | Spero |
| 2004/0111036 A1 | 6/2004 | Nissila |
| 2004/0131199 A1 | 7/2004 | Moeller |
| 2004/0152995 A1 | 8/2004 | Cox |
| 2004/0160199 A1 | 8/2004 | Morgan |
| 2004/0176666 A1 | 9/2004 | Chait |
| 2004/0178751 A1 | 9/2004 | Mueller |
| 2004/0212321 A1 | 10/2004 | Lys |
| 2004/0222307 A1 | 11/2004 | Deluca |
| 2004/0245351 A1 | 12/2004 | Orfield |
| 2004/0264193 A1 | 12/2004 | Okumura |
| 2004/0267385 A1 | 12/2004 | Lingemann |
| 2005/0004942 A1 | 1/2005 | Madsen |
| 2005/0053904 A1 | 3/2005 | Shephard |
| 2005/0057158 A1 | 3/2005 | Chang |
| 2005/0110416 A1 | 5/2005 | Veskovic |
| 2005/0125275 A1 | 6/2005 | Wright |
| 2005/0142524 A1 | 6/2005 | Simon |
| 2005/0151489 A1 | 7/2005 | Lys |
| 2005/0177957 A1 | 8/2005 | Long |
| 2005/0191505 A1 | 9/2005 | Akarsu |
| 2005/0200578 A1 | 9/2005 | Lee |
| 2005/0213353 A1 | 9/2005 | Lys |
| 2005/0214533 A1 | 9/2005 | Shimosaki |
| 2005/0218870 A1 | 10/2005 | Lys |
| 2005/0225976 A1 | 10/2005 | Zampini |
| 2005/0231133 A1 | 10/2005 | Lys |
| 2005/0236998 A1 | 10/2005 | Mueller |
| 2005/0253533 A1 | 11/2005 | Lys |
| 2005/0281531 A1 | 12/2005 | Unmehopa |
| 2006/0000257 A1 | 1/2006 | Samadpour |
| 2006/0002110 A1 | 1/2006 | Dowling |
| 2006/0017928 A1 | 1/2006 | Crowther |
| 2006/0018118 A1 | 1/2006 | Lee |
| 2006/0018428 A1 | 1/2006 | Li |
| 2006/0026972 A1 | 2/2006 | Masui |
| 2006/0074340 A1 | 4/2006 | Murata |
| 2006/0092520 A1 | 5/2006 | Buchsbaum |
| 2006/0103728 A1 | 5/2006 | Ishigami |
| 2006/0106437 A1 | 5/2006 | Czeisler |
| 2006/0111944 A1 | 5/2006 | Sirmans |
| 2006/0154596 A1 | 7/2006 | Meneely |
| 2006/0162552 A1 | 7/2006 | Yost |
| 2006/0172579 A1 | 8/2006 | Murphy |
| 2006/0173580 A1 | 8/2006 | Desrochers |
| 2006/0184283 A1 | 8/2006 | Lee |
| 2006/0207730 A1 | 9/2006 | Berman |
| 2006/0246149 A1 | 11/2006 | Buchholz |
| 2006/0252014 A1 | 11/2006 | Simon |
| 2007/0001617 A1 | 1/2007 | Pogodayev |
| 2007/0019815 A1 | 1/2007 | Asada |
| 2007/0024210 A1 | 2/2007 | Zwanenburg |
| 2007/0053527 A1 | 3/2007 | Barbieri |
| 2007/0084937 A1 | 4/2007 | Ahmed |
| 2007/0112598 A1 | 5/2007 | Heckerman |
| 2007/0115665 A1 | 5/2007 | Mueller |
| 2007/0162858 A1 | 7/2007 | Hurley |
| 2007/0166676 A1 | 7/2007 | Bird |
| 2007/0198226 A1 | 8/2007 | Lee |
| 2007/0240437 A1 | 10/2007 | Yonezawa |
| 2007/0276270 A1 | 11/2007 | Tran |
| 2007/0288247 A1 | 12/2007 | Mackay |
| 2008/0031832 A1 | 2/2008 | Wakefield |
| 2008/0103561 A1 | 5/2008 | Moscovici |
| 2008/0116780 A1 | 5/2008 | Kupper |
| 2008/0129174 A1 | 6/2008 | Schafer |
| 2008/0146892 A1 | 6/2008 | LeBoeuf |
| 2008/0182506 A1 | 7/2008 | Jackson |
| 2008/0187894 A1 | 8/2008 | Cady |
| 2008/0224121 A1 | 9/2008 | Bose |
| 2008/0225021 A1 | 9/2008 | Hekstra |
| 2008/0246629 A1 | 10/2008 | Tsui |
| 2008/0277486 A1 | 11/2008 | Seem |
| 2008/0294012 A1 | 11/2008 | Kurtz |
| 2008/0297027 A1 | 12/2008 | Miller |
| 2009/0015403 A1 | 1/2009 | Kuris |
| 2009/0053989 A1 | 2/2009 | Lunde |
| 2009/0065596 A1 | 3/2009 | Seem |
| 2009/0068089 A1 | 3/2009 | Hussain |
| 2009/0104086 A1 | 4/2009 | Zax |
| 2009/0115597 A1 | 5/2009 | Giacalone |
| 2009/0126382 A1 | 5/2009 | Rubino |
| 2009/0128044 A1 | 5/2009 | Nevins |
| 2009/0169425 A1 | 7/2009 | Park |
| 2009/0177613 A1 | 7/2009 | Martinez |
| 2009/0223126 A1 | 9/2009 | Garner |
| 2009/0241496 A1 | 10/2009 | Pintault |
| 2009/0242485 A1 | 10/2009 | Cabados |
| 2009/0243517 A1 | 10/2009 | Verfuerth |
| 2009/0273470 A1 | 11/2009 | Sinkevicius |
| 2009/0278464 A1 | 11/2009 | Chung |
| 2009/0287064 A1 | 11/2009 | Dougherty, Jr. |
| 2009/0292180 A1 | 11/2009 | Mirow |
| 2009/0300673 A1 | 12/2009 | Bachet |
| 2009/0306798 A1 | 12/2009 | Moeller |
| 2010/0021710 A1 | 1/2010 | Hunt |
| 2010/0084996 A1 | 4/2010 | Van De Sluis |
| 2010/0119461 A1 | 5/2010 | Bicard-Benhamou |
| 2010/0146855 A1 | 6/2010 | Ma |
| 2010/0169108 A1 | 7/2010 | Karkanias |
| 2010/0185064 A1 | 7/2010 | Bandic |
| 2010/0197495 A1 | 8/2010 | Filippini |
| 2010/0217099 A1 | 8/2010 | Leboeuf |
| 2010/0265803 A1 | 10/2010 | Lee |
| 2010/0277106 A1 | 11/2010 | Baaijens |
| 2010/0289643 A1 | 11/2010 | Trundle |
| 2010/0295244 A1 | 11/2010 | Stut |
| 2010/0298981 A1 | 11/2010 | Chamorro |
| 2010/0301776 A1 | 12/2010 | Feri |
| 2011/0010014 A1 | 1/2011 | Oexman |
| 2011/0066465 A1 | 3/2011 | Orfield |
| 2011/0084614 A1 | 4/2011 | Eisele |
| 2011/0178977 A1 | 7/2011 | Drees |
| 2011/0186644 A1 | 8/2011 | Yoshii |
| 2011/0190913 A1 | 8/2011 | Van De Sluis |
| 2011/0190945 A1 | 8/2011 | Yoshii |
| 2011/0237905 A1 | 9/2011 | Kutzik |
| 2011/0270446 A1 | 11/2011 | Scharf |
| 2011/0307112 A1* | 12/2011 | Barrilleaux .......... H05B 47/105 700/291 |
| 2012/0003198 A1 | 1/2012 | Barker |
| 2012/0011033 A1 | 1/2012 | Salgia |
| 2012/0019386 A1 | 1/2012 | Doraiswami |
| 2012/0031984 A1 | 2/2012 | Feldmeier |
| 2012/0064818 A1 | 3/2012 | Kurelowech |
| 2012/0072032 A1 | 3/2012 | Powell |
| 2012/0139720 A1 | 6/2012 | Mazar |
| 2012/0158203 A1 | 6/2012 | Feldstein |
| 2012/0176041 A1 | 7/2012 | Birru |
| 2012/0190001 A1 | 7/2012 | Knight |
| 2012/0206726 A1 | 8/2012 | Pervez |
| 2012/0214143 A1 | 8/2012 | Severson |
| 2012/0235579 A1 | 9/2012 | Chemel |
| 2012/0241633 A1 | 9/2012 | Smith |
| 2012/0279120 A1 | 11/2012 | Prescott |
| 2012/0298599 A1 | 11/2012 | Sichello |
| 2013/0027637 A1 | 1/2013 | Hosoki |
| 2013/0035208 A1 | 2/2013 | Dalebout |
| 2013/0065098 A1 | 3/2013 | Ohkawa |
| 2013/0073093 A1 | 3/2013 | Songkakul |
| 2013/0081541 A1 | 4/2013 | Hasenoehrl |
| 2013/0090562 A1 | 4/2013 | Ryan |
| 2013/0102852 A1 | 4/2013 | Kozloski |
| 2013/0119891 A1* | 5/2013 | Herremans ............ H05B 47/16 315/293 |
| 2013/0134962 A1 | 5/2013 | Kamel |
| 2013/0141235 A1 | 6/2013 | Utter, II |
| 2013/0144537 A1 | 6/2013 | Schalk |

(56) References Cited

U.S. PATENT DOCUMENTS

| | | |
|---|---|---|
| 2013/0208576 A1 | 8/2013 | Loree, IV |
| 2013/0229114 A1 | 9/2013 | Eisele |
| 2013/0262357 A1 | 10/2013 | Amarasingham |
| 2013/0276371 A1 | 10/2013 | Birru |
| 2013/0331727 A1 | 12/2013 | Zhang |
| 2013/0339074 A1 | 12/2013 | Nagy |
| 2013/0342111 A1 | 12/2013 | Mohan |
| 2014/0039685 A1 | 2/2014 | Blount |
| 2014/0046193 A1 | 2/2014 | Stack |
| 2014/0052220 A1 | 2/2014 | Pedersen |
| 2014/0058566 A1 | 2/2014 | Rains, Jr. |
| 2014/0067130 A1 | 3/2014 | Pillai |
| 2014/0089836 A1 | 3/2014 | Damani |
| 2014/0093551 A1 | 4/2014 | Averett |
| 2014/0099348 A1 | 4/2014 | Averett |
| 2014/0107846 A1 | 4/2014 | Li |
| 2014/0114889 A1 | 4/2014 | Dagum |
| 2014/0125225 A1 | 5/2014 | Calame |
| 2014/0142760 A1 | 5/2014 | Drees |
| 2014/0155705 A1 | 6/2014 | Papadopoulos |
| 2014/0168636 A1 | 6/2014 | Funamoto |
| 2014/0222210 A1 | 8/2014 | Agarwal |
| 2014/0222241 A1 | 8/2014 | Ols |
| 2014/0243935 A1 | 8/2014 | Brainard |
| 2014/0249447 A1 | 9/2014 | Sereno |
| 2014/0249760 A1 | 9/2014 | Proud |
| 2014/0266669 A1 | 9/2014 | Fadell |
| 2014/0277757 A1 | 9/2014 | Wang |
| 2014/0283450 A1 | 9/2014 | Darlington |
| 2014/0298719 A1 | 10/2014 | Mackin |
| 2014/0318011 A1 | 10/2014 | Järvinen |
| 2014/0343380 A1 | 11/2014 | Carter |
| 2014/0368643 A1 | 12/2014 | Siegel |
| 2014/0375230 A1 | 12/2014 | Liu |
| 2015/0015152 A1 | 1/2015 | Aboulnaga |
| 2015/0027879 A1 | 1/2015 | Myre |
| 2015/0048742 A1 | 2/2015 | Wingren |
| 2015/0052975 A1 | 2/2015 | Martin |
| 2015/0063579 A1 | 3/2015 | Bao |
| 2015/0066578 A1 | 3/2015 | Manocchia |
| 2015/0088786 A1 | 3/2015 | Anandhakrishnan |
| 2015/0102730 A1 | 4/2015 | Eisele |
| 2015/0119731 A1 | 4/2015 | Yasumura |
| 2015/0126806 A1 | 5/2015 | Barroso |
| 2015/0134123 A1 | 5/2015 | Obinelo |
| 2015/0154523 A1 | 6/2015 | Oobayashi |
| 2015/0174361 A1 | 6/2015 | Baaijens |
| 2015/0196232 A1 | 7/2015 | Mitsi |
| 2015/0204551 A1 | 7/2015 | Nair |
| 2015/0204561 A1 | 7/2015 | Sadwick |
| 2015/0212057 A1 | 7/2015 | Darveau |
| 2015/0221233 A1 | 8/2015 | Couriol |
| 2015/0227870 A1 | 8/2015 | Noboa |
| 2015/0234369 A1 | 8/2015 | Wen |
| 2015/0289347 A1 | 10/2015 | Baaijens |
| 2015/0309484 A1 | 10/2015 | Lyman |
| 2015/0312696 A1 | 10/2015 | Ribbich |
| 2015/0317592 A1 | 11/2015 | Oobayashi |
| 2015/0338117 A1 | 11/2015 | Henneberger |
| 2015/0365762 A1 | 12/2015 | Truon |
| 2015/0382427 A1 | 12/2015 | Eisele |
| 2016/0007905 A1 | 1/2016 | Milner |
| 2016/0019813 A1 | 1/2016 | Mullen |
| 2016/0125758 A1 | 5/2016 | Hong |
| 2016/0139576 A1 | 5/2016 | Aiken |
| 2016/0151603 A1 | 6/2016 | Shouldice |
| 2016/0163302 A1 | 6/2016 | Klabunde |
| 2016/0203700 A1 | 7/2016 | Bruhn |
| 2016/0206898 A1 | 7/2016 | Brainard |
| 2016/0213946 A1 | 7/2016 | Brainard |
| 2016/0231014 A1 | 8/2016 | Ro |
| 2016/0253802 A1 | 9/2016 | Venetianer |
| 2016/0284172 A1 | 9/2016 | Weast |
| 2016/0313245 A1 | 10/2016 | Sato |
| 2016/0316543 A1 | 10/2016 | Liu |
| 2016/0339203 A1 | 11/2016 | Krames |
| 2016/0341436 A1 | 11/2016 | Parker |
| 2016/0377305 A1 | 12/2016 | Kwa |
| 2017/0023225 A1 | 1/2017 | Chen |
| 2017/0023269 A1 | 1/2017 | Gevelber |
| 2017/0038787 A1 | 2/2017 | Baker |
| 2017/0050561 A1 | 2/2017 | Lickfelt |
| 2017/0053068 A1 | 2/2017 | Pillai |
| 2017/0065792 A1 | 3/2017 | Bonvallet |
| 2017/0068782 A1 | 3/2017 | Pillai |
| 2017/0080373 A1 | 3/2017 | Engelhard |
| 2017/0099556 A1 | 4/2017 | Cierna |
| 2017/0105666 A1 | 4/2017 | Lee |
| 2017/0123440 A1 | 5/2017 | Mangsuli |
| 2017/0136206 A1 | 5/2017 | Pillai |
| 2017/0139386 A1 | 5/2017 | Pillai |
| 2017/0162548 A1 | 6/2017 | Roth |
| 2017/0181685 A1 | 6/2017 | Lee |
| 2017/0188926 A1 | 7/2017 | Oobayashi |
| 2017/0189640 A1 | 7/2017 | Sadwick |
| 2017/0191695 A1 | 7/2017 | Bruhn |
| 2017/0196510 A1 | 7/2017 | Ouwerkerk |
| 2017/0200389 A1 | 7/2017 | Yigal |
| 2017/0208021 A1 | 7/2017 | Ingram |
| 2017/0232225 A1 | 8/2017 | Pedersen |
| 2017/0238401 A1 | 8/2017 | Sadwick |
| 2017/0259079 A1 | 9/2017 | Grajcar |
| 2017/0299210 A1 | 10/2017 | Nyamjav |
| 2017/0300647 A1 | 10/2017 | Goldberg |
| 2017/0300651 A1 | 10/2017 | Strobridge |
| 2017/0300655 A1 | 10/2017 | Lane |
| 2017/0301255 A1 | 10/2017 | Lee |
| 2017/0307243 A1 | 10/2017 | Burt |
| 2017/0319816 A1 | 11/2017 | Sokol |
| 2017/0321923 A1 | 11/2017 | Wiens-Kind |
| 2017/0325310 A1 | 11/2017 | Chen |
| 2017/0326380 A1 | 11/2017 | Moore-Ede |
| 2017/0347907 A1 | 12/2017 | Le |
| 2017/0348506 A1 | 12/2017 | Berman |
| 2017/0350610 A1 | 12/2017 | Michielsen |
| 2017/0356602 A1 | 12/2017 | Lin |
| 2017/0356670 A1 | 12/2017 | Zhang |
| 2017/0359697 A1 | 12/2017 | Bhatti |
| 2017/0359879 A1 | 12/2017 | Eisele |
| 2017/0363314 A1 | 12/2017 | Barber |
| 2018/0011978 A1 | 1/2018 | Reeckmann |
| 2018/0012242 A1 | 1/2018 | Phan |
| 2018/0025125 A1 | 1/2018 | Crane |
| 2018/0025126 A1 | 1/2018 | Barnard |
| 2018/0042077 A1 | 2/2018 | Riley |
| 2018/0043130 A1 | 2/2018 | Martin |
| 2018/0077767 A1 | 3/2018 | Soler |
| 2018/0082261 A1 | 3/2018 | Hendriks |
| 2018/0082393 A1 | 3/2018 | Ahrens |
| 2018/0107962 A1 | 4/2018 | Lundin |
| 2018/0108442 A1 | 4/2018 | Börve |
| 2018/0119973 A1 | 5/2018 | Rothman |
| 2018/0120161 A1 | 5/2018 | Qiu |
| 2018/0120162 A1 | 5/2018 | Qiu |
| 2018/0132037 A1 | 5/2018 | Mcgibney |
| 2018/0149802 A1 | 5/2018 | Krames |
| 2018/0154297 A1 | 6/2018 | Maletich |
| 2018/0157864 A1 | 6/2018 | Tribble |
| 2018/0160944 A1 | 6/2018 | Aubert |
| 2018/0165588 A1 | 6/2018 | Saxena |
| 2018/0166171 A1 | 6/2018 | Pulitzer |
| 2018/0178063 A1 | 6/2018 | Silver |
| 2018/0182472 A1 | 6/2018 | Preston |
| 2018/0188701 A1* | 7/2018 | Billings ............ G05B 13/0265 |
| 2018/0193589 A1 | 7/2018 | Mclaughlin |
| 2018/0196925 A1 | 7/2018 | Mukherjee |
| 2018/0197625 A1 | 7/2018 | Lobach |
| 2018/0197637 A1 | 7/2018 | Chowdhury |
| 2018/0197638 A1 | 7/2018 | Blanshard |
| 2018/0206783 A1 | 7/2018 | Yoon |
| 2018/0207445 A1 | 7/2018 | Maxik |
| 2018/0209683 A1 | 7/2018 | Cho |
| 2018/0216843 A1 | 8/2018 | Zhou |
| 2018/0218289 A1 | 8/2018 | Albrecht |

(56) References Cited

U.S. PATENT DOCUMENTS

| | | |
|---|---|---|
| 2018/0226158 A1 | 8/2018 | Fish |
| 2018/0240274 A1 | 8/2018 | Cronin |
| 2018/0247029 A1 | 8/2018 | Fish |
| 2018/0250430 A1 | 9/2018 | Machovina |
| 2018/0264224 A1 | 9/2018 | Gronfier |
| 2018/0266718 A1 | 9/2018 | Gillette |
| 2018/0285934 A1 | 10/2018 | Baughman |
| 2018/0295696 A1 | 10/2018 | Li |
| 2018/0295704 A1 | 10/2018 | Haverlag |
| 2018/0308390 A1 | 10/2018 | Moser |
| 2018/0311464 A1 | 11/2018 | Krames |
| 2018/0318602 A1 | 11/2018 | Ciccarelli |
| 2018/0320919 A1 | 11/2018 | Tang |
| 2018/0322240 A1 | 11/2018 | Goyal |
| 2018/0322253 A1 | 11/2018 | Goyal |
| 2018/0322255 A1 | 11/2018 | Connell, II |
| 2018/0330626 A1 | 11/2018 | Donadio |
| 2018/0331845 A1 | 11/2018 | Warren |
| 2018/0336500 A1 | 11/2018 | Pinho |
| 2018/0336530 A1 | 11/2018 | Johnson |
| 2018/0339127 A1 | 11/2018 | Van Reen |
| 2018/0342327 A1 | 11/2018 | Madan |
| 2018/0349689 A1 | 12/2018 | Lee |
| 2018/0349945 A1 | 12/2018 | Jayaraman |
| 2018/0350455 A1 | 12/2018 | Rosen |
| 2018/0350456 A1 | 12/2018 | Kendrick |
| 2018/0351758 A1 | 12/2018 | Becker |
| 2018/0351761 A1 | 12/2018 | Li |
| 2018/0353073 A1 | 12/2018 | Boucher |
| 2018/0353108 A1 | 12/2018 | Prate |
| 2018/0358117 A1 | 12/2018 | Neagle |
| 2018/0358129 A1 | 12/2018 | Gorzelniak |
| 2018/0358130 A1 | 12/2018 | Schmidt |
| 2018/0369637 A1 | 12/2018 | Hoang |
| 2018/0373843 A1 | 12/2018 | Baughman |
| 2018/0374053 A1 | 12/2018 | Willamowski |
| 2018/0374572 A1 | 12/2018 | Ackerman |
| 2018/0374586 A1 | 12/2018 | Baughman |
| 2019/0001059 A1 | 1/2019 | Handler |
| 2019/0005844 A1 | 1/2019 | Dragicevic |
| 2019/0007424 A1 | 1/2019 | Ford |
| 2019/0007927 A1 | 1/2019 | Blahnik |
| 2019/0010603 A1 | 1/2019 | Boughton |
| 2019/0011146 A1 | 1/2019 | Seo |
| 2019/0013960 A1 | 1/2019 | Sadwick |
| 2019/0014643 A1 | 1/2019 | Gharabegian |
| 2019/0024926 A1 | 1/2019 | Kim |
| 2019/0028549 A1 | 1/2019 | Ledvina |
| 2019/0041080 A1 | 2/2019 | Higuchi |
| 2019/0046109 A1 | 2/2019 | Lewis |
| 2019/0056126 A1 | 2/2019 | Law |
| 2019/0057615 A1 | 2/2019 | Mullen |
| 2019/0075687 A1 | 3/2019 | Brunstetter |
| 2019/0091700 A1 | 3/2019 | Hilbig |
| 2019/0107267 A1 | 4/2019 | Luo |
| 2019/0193508 A1 | 6/2019 | Ganem |
| 2019/0209806 A1 | 7/2019 | Allen |
| 2019/0215184 A1 | 7/2019 | Emigh |
| 2019/0224445 A1 | 7/2019 | Fernandes |
| 2019/0268999 A1 | 8/2019 | Oobayashi |
| 2019/0281681 A1 | 9/2019 | De Bries |
| 2019/0297700 A1 | 9/2019 | Gal |
| 2019/0309975 A1 | 10/2019 | Salem |
| 2019/0320516 A1 | 10/2019 | Parker |
| 2019/0350066 A1 | 11/2019 | Herf |
| 2019/0366032 A1 | 12/2019 | Lockley |
| 2020/0011563 A1 | 1/2020 | Jeong |
| 2020/0101893 A1 | 4/2020 | Studeny |
| 2020/0103841 A1 | 4/2020 | Pillai |
| 2020/0182495 A1 | 6/2020 | Park |
| 2020/0224915 A1 | 7/2020 | Nourbakhsh |
| 2020/0229289 A1 | 7/2020 | Cahill |
| 2020/0298168 A1 | 9/2020 | Lee |
| 2020/0340700 A1 | 10/2020 | Park |
| 2021/0116144 A1 | 4/2021 | Morgan |
| 2021/0207833 A1 | 7/2021 | Dameno |
| 2021/0239339 A1 | 8/2021 | Morgan |
| 2021/0379524 A1 | 12/2021 | Prigge |

FOREIGN PATENT DOCUMENTS

| | | |
|---|---|---|
| CN | 1150882 | 5/1997 |
| CN | 1544222 | 11/2004 |
| CN | 1971268 | 5/2007 |
| CN | 101421558 | 4/2009 |
| CN | 201414191 Y | 2/2010 |
| CN | 101963607 | 2/2011 |
| CN | 101976063 | 2/2011 |
| CN | 102073935 | 5/2011 |
| CN | 102262710 | 11/2011 |
| CN | 202075431 | 12/2011 |
| CN | 102305451 | 1/2012 |
| CN | 202551821 | 11/2012 |
| CN | 103040443 A | 4/2013 |
| CN | 103197659 A | 7/2013 |
| CN | 103277870 | 9/2013 |
| CN | 203175090 U | 9/2013 |
| CN | 103531174 A | 1/2014 |
| CN | 103604198 A | 2/2014 |
| CN | 203454309 U | 2/2014 |
| CN | 204759076 | 11/2015 |
| EP | 0710804 | 5/1996 |
| EP | 1067825 | 1/2001 |
| EP | 1271442 | 1/2003 |
| EP | 1511218 | 3/2005 |
| EP | 1821582 | 8/2007 |
| EP | 2016879 | 1/2009 |
| EP | 2132960 | 12/2009 |
| EP | 2296448 | 3/2011 |
| EP | 2431541 | 3/2012 |
| EP | 2488912 | 8/2012 |
| EP | 3297218 | 10/2020 |
| JP | S60110520 A | 6/1985 |
| JP | H04341243 | 11/1992 |
| JP | H0552361 A | 3/1993 |
| JP | H0658593 | 3/1994 |
| JP | H0658593 A | 3/1994 |
| JP | H06159763 A | 6/1994 |
| JP | H06225858 A | 8/1994 |
| JP | H09303842 A | 11/1997 |
| JP | H10238089 A | 9/1998 |
| JP | 2000130828 | 5/2000 |
| JP | 2000294388 | 10/2000 |
| JP | 2001224078 | 8/2001 |
| JP | 2001286226 | 10/2001 |
| JP | 2001314882 | 11/2001 |
| JP | 2002042546 A | 2/2002 |
| JP | 2002059152 A | 2/2002 |
| JP | 2003042507 | 2/2003 |
| JP | 2003042509 | 2/2003 |
| JP | 2003083590 | 3/2003 |
| JP | 2003232559 | 8/2003 |
| JP | 2004005313 A | 1/2004 |
| JP | 2004053130 A | 2/2004 |
| JP | 2005040769 A | 2/2005 |
| JP | 2005177726 | 7/2005 |
| JP | 2005211319 | 8/2005 |
| JP | 2005235634 | 9/2005 |
| JP | 2006210045 | 8/2006 |
| JP | 2006522699 | 10/2006 |
| JP | 2006321721 | 11/2006 |
| JP | 2006348600 | 12/2006 |
| JP | 2007170761 | 7/2007 |
| JP | 2007184436 | 7/2007 |
| JP | 2008125541 | 6/2008 |
| JP | 2008157548 | 7/2008 |
| JP | 2008204640 | 9/2008 |
| JP | 2010119563 | 6/2010 |
| JP | 2010182661 | 8/2010 |
| JP | 2010239878 | 10/2010 |
| JP | 2011146137 | 7/2011 |
| JP | 2012001931 | 1/2012 |
| JP | 2012149839 A | 8/2012 |
| JP | 2013140523 A | 7/2013 |

(56) References Cited

FOREIGN PATENT DOCUMENTS

| | | | | |
|---|---|---|---|---|
| KR | 20000009824 A | 2/2000 | | |
| KR | 20010048235 | 6/2001 | | |
| KR | 20030074107 A | 9/2003 | | |
| KR | 20050003899 | 1/2005 | | |
| KR | 100771486 | 10/2007 | | |
| KR | 100804892 | 2/2008 | | |
| KR | 101102733 | 1/2012 | | |
| KR | 20120004243 | 1/2012 | | |
| KR | 101135926 | 4/2012 | | |
| KR | 20120039359 A | 4/2012 | | |
| KR | 20130108709 | 10/2013 | | |
| KR | 20130124184 | 11/2013 | | |
| WO | 0039964 | 7/2000 | | |
| WO | 2000058873 | 10/2000 | | |
| WO | 2004037301 | 5/2004 | | |
| WO | 2007026387 | 3/2007 | | |
| WO | 2008043396 | 4/2008 | | |
| WO | 2008051222 | 5/2008 | | |
| WO | 2008102308 | 8/2008 | | |
| WO | 2008120127 | 10/2008 | | |
| WO | 2008135093 | 11/2008 | | |
| WO | 2009030641 | 3/2009 | | |
| WO | 2009044330 | 4/2009 | | |
| WO | 2009044330 A1 | 4/2009 | | |
| WO | 2010046875 | 4/2010 | | |
| WO | 2010087386 | 8/2010 | | |
| WO | 2010115720 | 10/2010 | | |
| WO | 2011033377 | 3/2011 | | |
| WO | 2011046875 | 4/2011 | | |
| WO | 2012104773 | 8/2012 | | |
| WO | 2012151407 | 11/2012 | | |
| WO | 2013014337 | 1/2013 | | |
| WO | 2013049297 | 4/2013 | | |
| WO | 2013175348 | 11/2013 | | |
| WO | 2014013376 | 1/2014 | | |
| WO | 2014036133 | 3/2014 | | |
| WO | 2014071046 | 5/2014 | | |
| WO | 2015130786 | 9/2015 | | |
| WO | 2015200730 A1 | 12/2015 | | |
| WO | 2016019005 A1 | 2/2016 | | |
| WO | 2016115230 | 7/2016 | | |
| WO | 2016154320 | 9/2016 | | |
| WO | 2017008321 | 1/2017 | | |
| WO | 2018039433 | 3/2018 | | |
| WO | WO-2018039433 A1 * | 3/2018 | ........ | A61M 21/0094 |
| WO | 2018157063 | 8/2018 | | |
| WO | WO-2018157063 A1 * | 8/2018 | .......... | F21V 23/0464 |
| WO | 2019046580 | 3/2019 | | |
| WO | 2019151684 | 8/2019 | | |
| WO | 2019204779 | 10/2019 | | |
| WO | 2020014688 | 1/2020 | | |
| WO | 2020073723 | 4/2020 | | |
| WO | 2020075189 | 4/2020 | | |
| WO | 2020104878 | 5/2020 | | |
| WO | 2020146315 | 7/2020 | | |
| WO | 2020189819 | 9/2020 | | |
| WO | 2021011822 | 1/2021 | | |
| WO | 2021249653 | 12/2021 | | |
| WO | 2021252439 | 12/2021 | | |

OTHER PUBLICATIONS

Centers for Disease Control and Prevention, "Summary Health Statistics for U.S. Adults: National Health Interview Survey, 2012", Vital and Health Statistics Report, Series 10, No. 260, Feb. 2014, 171 pp., Retrieved from https://www.cdc.gov/nchs/data/series/sr_10/sr10_260.pdf.

General Services Administrations (GSA), "Sound Matters: How to Achieve Acoustic Comfort in the Contemporary Office", Jan. 2012, 42 pp., Retrieved from https://www.wbdg.org/FFC/GSA/gsa_soundmatters.pdf.

Glorig, A., "The problem of noise in industry", American Journal of Public Health and the Nation's Health, 51(9), 1961, pp. 1338-1346, 9 pp.

Hellman, R. P. et al., "Monaural Loudness Function at 1000 cps and Interaural Summation", Journal of Acoustical Society of America 35(6), 1963, pp. 856-865, 11 pp., https://doi.org/10.1121/1.1918619.

International Electrotechnical Commission, International Standard, "Electroacoustics—Sound level meters—Part 1: Specifications", Edition 2.0, Sep. 2013, 16 pp.

International Organization for Standardization, "Normal equal-loudness-level-contours", Acoustics, ISO 2nd Edition, 226:2003, 1 p.

International Organization for Standardization, "Acoustics—Measurement of room acoustics parameters—Part 1: Performance Spaces", ISO First Edition, 3382-1, Jun. 15, 2009, 11 pp.

Kim, J. et al., "Workspace satisfaction: The privacy-communication trade-off in open-plan offices", Journal of Environmental Psychology 36, (2013), pp. 18-26, 9 pp.

Majidi, F. et al., "Study of Noise Map and its Features in an Indoor Work Environment through GIS-Based Software", Journal of Human, Environment and Health Promotion, 2016; 1(3), pp. 138-142, 6 pp.

MBI Products Company, "Room Acoustics", 1992, 2 pp., Retrieved from http://mbiproducts.com/static/mbi_1/media/misc/RoomAcoustics.pdf.

Miedema, H. et al., "Annoyance from transportation noise: Relationships with Exposure Metrics DNL and DENL and Their Confidence Intervals", Environmental Health Perspectives, 109(4), Apr. 2001, pp. 409-416, 8 pp., https://doi.org/10.1289/ehp.01109409.

Muzet, A., "Environmental noise, sleep and health", Sleep Medicine Reviews (2007) 11, pp. 135-142, 8 pp., https://doi.org/10.1016/j.smrv.2006.09.001.

Sørensen, M. et al., "Road traffic noise and incident myocardial infarction: A prospective cohort study", PLoS ONE, www.plosone.org, Jun. 2012, 7(6), 7 pp. https://doi.org/10.1371/journal.pone.0039283.

Stansfeld, S. A et al., "Noise pollution: Non-auditory effects on health", British Medical Bulletin 2003, vol. 68, pp. 243-257, 16 pp., https://doi.org/10.1093/bmb/ldg033.

Stout, J., "Speech Privacy Standards", Cambridge Sound Management, Inc., 2015, 7 pp., Retrieved from http://cambridgesound.com/wp-content/uploads/2015/10/Speech-Privacy-Standards.pdf.

"Active Design Guidelines: Promoting Physical Activity and Health in Design," New York City Departments of Design and Construction, 2010.

"Adolescent Psychology Around the World", Edited by Jeffrey Jensen Arnett, Ph.D., Clark University, Worcester, MA, 2012, (30 pages).

"ANSI/ASA S12.60-2010/Part 1 American National Standard Acoustical Performance Criteria, Design Requirements, and Guidelines for Schools, Part 1: Permanent Schools", Acoustical Society of America, 2010, 44 pgs.

"Assembly: Civic Design Guidelines," Center for Active Design, 2018.

"Cochrane Handbook for Systematic Reviews of Interventions", Cochrane Book Series, Edited by Julian PT Higgins and Sally Green, 2008, 17 pgs.

"Daylight Metrics: PIER Daylighting Plus Research Program", Public Interest Energy Research (PIER) Program Final Project Report, Feb. 2012, 387 pgs.

"Depression and Other Common Mental Disorders", Global Health Estimates, World Health Organization, 2017, 24 pgs.

"Depression: A Global CrisisWorld Mental Health Day, Oct. 10, 2012", World Federation for Mental Health, (2012), (32 pages).

"Ergonomics of the thermal environment—Analytical determination and interpretation of thermal comfort using calculation of the PMV and PPD indices and local thermal comfort criteria", International Standard, Third edition, Nov. 15, 2005, 11 pgs.

"Evidence-based methodologies for public health—How to assess the best available evidence when time is limited and there is lack of sound evidence", European Centre for Disease Prevention and Control, Stockholm: ECDC; 2011, 67 pgs.

(56) References Cited

OTHER PUBLICATIONS

"Global Burden of Disease Study 2015 provides GPS for global health 2030", www.thelancet.com, vol. 388, Oct. 8, 2016, pp. 1448-1449.
"Global status report on alcohol and health 2014", World Health Organization, 2014, 392 pgs.
"Global, regional, and national age-sex specific all-cause and cause-specific mortality for 240 causes of death, 1990-2013: a systematic analysis for the Global Burden of Disease Study 2013", www.thelancet.com, vol. 385, Jan. 10, 2015, pp. 117-171.
"Global, regional, and national life expectancy, all-cause mortality, and cause-specific mortality for 249 causes of death, 1980-2015: a systematic analysis for the Global Burden of Disease Study 2015", www.thelancet.com, vol. 388, Oct. 8, 2016, pp. 1459-1544.
"Haemoglobin concentrations for the diagnosis of anaemia and assessment of severity", Vitamin and Mineral Nutrition Information System. Geneva, World Health Organization, 2011, pp. 1-6.
"Hazard Prevention and Control in the Work Environment: Airborne Dust", Occupational and Environmental Health Series, Department of Protection of the Human Environment, World Health Organization, Geneva, Dec. 1999, 224 pgs.
"IARC Monographs on the Evaluation of Carcinogenic Risks to Humans" vol. 90 Human papillomaviruses, World Health Organization International Agency for Research on Cancer, Lyon, France, 2007, 690 pgs.
"LEED Reference Guide for Building Design and Construction," U.S. Green Building Council, 2013, (67 pages).
"Light and Lighting—Basic terms and criteria for specifying lighting requirements", The National Standards Authority of Ireland. (2011), (7 pages).
"My Plate My Wins, Make half your grains whole grains", Center for Nutrition Policy and Promotion. United States Department of Agriculture, Oct. 2016, (1 page).
"Policy recommendations on protection from exposure to second-hand tobacco smoke," World Health Organization, 2007, pp. 1-50 (56 pages).
"Preventing Diarrhoea Through Better Water, Sanitation and Hygiene: Exposures and impacts in low- and middle-income countries," World Health Organization, 2014, pp. 1-33 (48 pages).
"Proceedings: vol. 1—Indoor Air Quality (IAQ), building related diseases and human response," Healthy Buildings, 2006 (361 pages).
"Progress on Drinking Water, Sanitation and Hygiene, 2017, Update and SDG Baselines", World Health Organization (WHO) and the United Nations Children's Fund (UNICEF), 2017, 116 pgs.
"Social determinants of mental health," World Health Organization and Calouste Gulbenkian Foundation, 2014, pp. 1-52 (54 pages).
"Sodium in Your Diet Use the Nutrition Facts Label and Reduce Your Intake", U.S. Food and Drug Administration. Mar. 2020, (4 pages).
"State Council Air Pollution Prevention and Control Action Plan, China Clean Air Updates", Clean Air Alliance of China, Issue II, 2013, English Translation, 20 pgs.
"WHO Framework Convention on Tobacco Control," World Health Organization 2003, updated reprint 2004, 2005, (44 pages).
Abrahamsson et al., "Impairment of Contrast Sensitivity Function (CSF) as a Measure of Disability Glare," Investigative Ophthalmology & Visual Science, 1986, vol. 27, pp. 1131-1136.
Abt et al., "Characterization of Indoor Particle Sources: A Study Conducted in the Metropolitan Boston Area," Environmental Health Perspectives, 2000, vol. 108, No. 1, pp. 35-44.
Advances in Building Energy Research, 2007, vol. 1 (263 pages).
Ahmed, Tahmeed, et al.; "Global Burden of Maternal and Child Undernutrition and Micronutrient Deficiencies", Ann Nutr Metab 2012;61 (suppl 1):8-17.
Ahn, "Synthesis and Characterization of Nanostructured ZnO and SnOx for VOC Sensor Devices," 2011 (204 pages).
Ajzen, I. "Nature and operation of attitudes", Annual review of psychology vol. 52: 27-58 (2001).

Akacem et al., "Bedtime and evening light exposure influence circadian timing in preschoolage children: A field study," Neurobiology of Sleep and Circadian Rhythms, 2016, vol. 1, pp. 27-31.
Akacem et al., "Sensitivity of the circadian system to evening bright light in preschool-age children," Physiological Reports, 2018, vol. 6, No. 5, pp. 1-10.
Al Horr et al., "Occupant productivity and office indoor environment quality: A review of the literature," Building and Environment, 2016, vol. 105, pp. 369-389.
Alfano, Francesca Romana d'Ambrosio et al. "On the measurement of the mean radiant temperature and its influence on the indoor thermal environment assessment", Building and Environment 63: 79-88, (2013).
Allen, Michele L. et al., "Effective Parenting Interventions to Reduce Youth Substance Use: A Systematic Review," Pediatrics, 2016, vol. 138, No. 2 (19 pages).
Allergy Buyers Club, "Philips Wake Up Light Dawn Simulators Alarm Clocks," retrieved from http://www.allergybuyersclub.com/philips-wake-up-light-dawn-simulator-alarm-clocks.html, retrieved on Aug. 13, 2012, 2 pages.
Alonso-Coello, Pablo, et al. .; "GRADE Evidence to Decision (EtD) frameworks: a systematic and transparent approach to making well informed healthcare choices. 1: Introduction"; BMJ 2016; 353:i2016, http://dx.doi.org/10.1136/bmj.i2016, 10 pgs.
Amaral et al., "An Overview of Particulate Matter Measurement Instruments," Atmosphere, 2015, vol. 6, pp. 1327-1345.
Amendment, filed Jan. 25, 2018, for U.S. Appl. No. 15/421,046, Eisele et al., "LED Lighting System," 6 pages.
American Diabetes Association, "Standards of Medical Care in Diabetes—2017 Abridged for Primary Care Providers," Clinical Diabetes, 2017, vol. 35, No. 1, pp. 5-26 (22 pages).
American Society of Heating, Refrigerating and Air-Conditioning Engineers (ASHRAE), "Indoor Air Quality Guide, Best Practices for Design, Construction and Commissioning", ASHRAE Philadelphia Chapter, May 14, 2009, http://ashraephilly.org/images/downloads/Presentation_Archives/0509.pdf, Accessed Nov. 27, 2017 (19 pages).
American Society of Heating, Refrigerating and Air-Conditioning Engineers et al., "Indoor Air Quality Guide: Best Practices for Design, Construction and Commissioning," 2009 (198 pages).
American Society of Heating, Refrigerating and Air-Conditioning Engineers, "Indoor Air Quality Guide: Best Practices for Design, Construction and Commissioning," 2009 (19 pages).
American Society of Heating, Refrigerating and Air-Conditioning Engineers, Inc., ASHRAE Standard 55-2010: Thermal Environmental Conditions for Human Occupancy (44 pages).
American Ultraviolet, "Handheld Germicidal Fixtures," retrieved from http://americanultraviolet.com/germicidal_solutions/commercial_products/handheld . . . , retrieved on Aug. 13, 2012, 1 page.
American Ultraviolet, "In Room Germicidal Solutions," HVAC MRS (0810/2.5M), retrieved from http://www.americanultraviolet.com, 2 pages.
Anderson et al., "Clearing the Air: A Review of the Effects of Particulate Matter Air Pollution on Human Health," Journal of Medical Toxicology, 2012, vol. 8, pp. 166-175.
Apaydin, Erica A. et al., "A systematic review of St. John's wort for major depressive disorder," Systematic Reviews, 2016, vol. 5, No. 148 (25 pages).
Aries et al., "Daylight and health: A review of the evidence and consequences for the built environment," Lighting Research & Technology, 2015, vol. 47, pp. 6-27.
Aries et al., "Windows, view, and office characteristics predict physical and psychological discomfort," Journal of Environmental Psychology, 2010, vol. 30, pp. 533-541.
Aries, "Human lighting demands: healthy lighting in an office environment," thesis, 2005 (159 pages).
Arnett, Jeffrey J. "The neglected 95%: why American psychology needs to become less American." The American psychologist vol. 63,7 : 602-14, (2008).
Arrington et al., "Voluntary Task Switching: Chasing the Elusive Homunculus," Journal of Experimental Psychology: Learning, Memory, and Cognition, 2005, vol. 31, No. 4, pp. 683-702.

(56) References Cited

OTHER PUBLICATIONS

Arundel et al., "Indirect Health Effects of Relative Humidity in Indoor Environments," Environmental Health Perspectives, 1986, vol. 65, pp. 351-361.
Arundel, Anthongy V., et al.; "Indirect Health Effects of Relative Humidity in Indoor Environments", Environmental Health Perspectives vol. 65, pp. 351-361, 1986.
Astolfi et al., "Subjective and objective assessment of acoustical and overall environmental quality in secondary school classrooms," The Journal of the Acoustical Society of America, 2008, vol. 123, No. 1, pp. 163-173.
Astolfi, Arianna, and Franco Pellerey. "Subjective and objective assessment of acoustical and overall environmental quality in secondary school classrooms." The Journal of the Acoustical Society of America vol. 123,1: 163-73, (2008).
Atmaca et al., "Effects of radiant temperature on thermal comfort," Building and Environment, 2007, vol. 42, pp. 3210-3220.
Atmaca et al., "Predicting the effect of relative humidity on skin temperature and skin wettedness," Journal of Thermal Biology, 2006, vol. 31, pp. 442-452.
Atmaca, Ibrahim, et al.; "Effects of radiant temperature on thermal comfort", Building and Environment 42 (2007) 3210-3220.
Australian Examination report No. 1, dated Dec. 13, 2017, for Australian Application No. 2017200995, 6 pages.
Australian Patent Examination Report, dated Sep. 14, 2016, for Australian Application No. 2013308871, 5 pages.
Averett et al., "Titanium Dioxide Photocatalytic Compositions and Uses Thereof," U.S. Appl. No. 61/482,393, filed May 4, 2011, 26 pages.
Babyak, Richard J., "Ready to roll," Appliance Manufacturer, 2000, vol. 48, No. 9, pp. 40-42.
Bakker et al., "User satisfaction and interaction with automated dynamic facades: a pilot study," Building and Environment, 2014, vol. 78, pp. 44-52.
Bandura, A. "Self-efficacy", In V. S. Ramachaudran (Ed.), Encyclopedia of human behavior (vol. 4, pp. 71-81) (1994). New York: Academic Press. (Reprinted in H. Friedman [Ed.], Encyclopedia of mental health. San Diego: Academic Press, (1998).
Barclay, Laurie, J., et al.; "Healing the Wounds of Organizational Injustice: Examining the Benefits of Expressive Writing", Journal of Applied Psychology 2009, vol. 94, No. 2, 511-523.
Beauchemin et al., "Sunny hospital rooms expedite recovery from severe and refractory depressions," Journal of Affective Disorders, 1996, vol. 40, pp. 49-51.
Beaven et al., "A Comparison of Blue Light and Caffeine Effects on Cognitive Function and Alertness in Humans," PLoS One, 2013, vol. 8, No. 10 (7 pages).
Bekö et al., Ventilation rates in the bedrooms of 500 Danish children, Building and Environment, 2010, vol. 45, pp. 2289-2295.
Bell et al., "The Exposure-Response Curve for Ozone and Risk of Mortality and the Adequacy of Current Ozone Regulations," Environmental Health Perspectives, 2006, vol. 114, No. 4, pp. 532-536.
Bellicha, Alice et al., "A multistage controlled intervention to increase stair climbing at work: effectiveness and process evaluation," International Journal of Behavioral Nutrition and Physical Activity, 2016, vol. 13, No. 47, pp. 1-9 (9 pages).
Benedetti, "Morning sunlight reduces length of hospitalization in bipolar depression," Journal of Affective Disorders, 2001, vol. 62, pp. 221-223.
Berman et al., "The Cognitive Benefits of Interacting With Nature," Psychological Science, 2008, vol. 19, No. 12, pp. 1207-1212.
Berto, "Exposure to restorative environments helps restore attentional capacity," Journal of Environmental Psychology, 2005, vol. 25, pp. 249-259.
Berto, "The Role of Nature in Coping with Psycho-Physiological Stress: A Literature Review on Restorativeness," Behavioral Sciences, 2014, vol. 4, pp. 394-409.
Besner et al., "The Stroop effect and the myth of automaticity," Psychonomic Bulletin & Review, 1997, vol. 4, No. 2, pp. 221-225.

Bhutta, Zulfiqar A. et al., "Evidence-based interventions for improvement of maternal and child nutrition: what can be done and at what cost?," The Lancet, 2013, vol. 382, pp. 452-447.
Bidonde, J. et al., "Aerobic exercise training for adults with fibromyalgia (Review)," Cochrane Database of Systematic Reviews, 2017, Issue 6 (130 pages).
Bierman et al., "Characterizing Daylight Photosensor System Performance to Help Overcome Market Barriers," Journal of the Illuminating Engineering Society, 2000, vol. 29, No. 1, pp. 101-115.
Bohn, Hendrik et al., "SIRENA—Service Infrastructure for Real-time Embedded Networked Devices: A service oriented framework for different domains," 2006 (7 pages).
Borisuit et al., "Effects of realistic office daylighting and electric lighting conditions on visual comfort, alertness and mood," Lighting Research and Technology, 2015, vol. 47, pp. 192-209.
Bornehag, C. G., et al. .; "Dampness in Buildings and Health: Nordic Interdisciplinary Review of the Scientific Evidence on Associations between Exposure to "Dampness" in Buildings and Health Effects (NORDDAMP)", Indoor Air 2001; 11: 72-86.
Boubekri et al., "Impact of Windows and Daylight Exposure on Overall Health and Sleep Quality of Office Workers: A Case-Control Pilot Study," Journal of Clinical Sleep Medicine, 2014, vol. 10, No. 6, pp. 603-611.
Boubekri et al., "The Impact of Optimized Daylight and Views on the Sleep Duration and Cognitive Performance of Office Workers," International Journal of Environmental Research and Public Health, 2020, vol. 17, No. 3219, pp. 1-16.
Boubekri et al., "Windows and Environmental Satisfaction: A Survey Study of an Office Building," Indoor Environment, 1993, vol. 2, pp. 164-172.
Bourcier, Johann et al., "A Dynamic-SOA Home Control Gateway," 2006 (9 pages).
Bradley, J. S., et al. .; "Describing Levels of Speech Privacy in Open-Plan Offices", NRC Publications Archive, National Research Council of Canada, Sep. 12, 2003, 29 pgs.
Brager, Gail S., et al., "Thermal adaptation in the built environment: a literature review," Energy and Buildings, 1998, vol. 27, pp. 83-96 (15 pages).
Braniš et al., "The effect of outdoor air and indoor human activity on mass concentrations of PM10, PM2.5, and PM1 in a classroom," Environmental Research, 2005, vol. 99, pp. 143-149.
Brook et al., "Particulate Matter Air Pollution and Cardiovascular Disease: An Update to the Scientific Statement From the American Heart Association," Circulation: Journal of the American Heart Association, 2010, vol. 121, pp., 2331-2378.
Brookstone, "Tranquil Moments® Advanced Sleep Sounds," 2012, retrieved from http://www.brookstone.com/tranquil-moments-advanced-sleep-sound . . . , retrieved on Apr. 28, 2014, 3 pages.
Brown et al., "Interventions to Reduce Harm from Smoking with Families in Infancy and Early Childhood: A Systematic Review," International Journal of Environmental Research and Public Health, 2015, vol. 12, pp. 3091-3119 (29 pages).
Brown et al., "Recommendations for healthy daytime, evening, and night-time indoor light exposure," Preprints, 2020 (21 pages).
Brown, Nicola et al., "Interventions to Reduce Harm from Smoking with Families in Infancy and Early Childhood: A Systematic Review ," International Journal of Environmental Research and Public Health, 2015, vol. 12, pp. 3091-3119, (29 pages).
Buchanan et al., "Air filter materials, outdoor ozone and building-related symptoms in the BASE study," Indoor Air, 2008, vol. 18, pp. 144-155.
Burge et al., "Sick Building Syndrome: A Study of 4373 Office Workers," Annals of Occupational Hygiene, 1987, vol. 31, No. 4A, pp. 493-504.
Bussières, André E., et al., "The Treatment of Neck Pain-Associated Disorders and Whiplash-Associated Disorders: A Clinical Practice Guideline,"Journal of Manipulative and Physiological Therapeutics, 2016, vol. 39, No. 8, pp. 523-564.e27 (69 pages).
Butler et al., "Effects of Setting On Window Preferences and Factors Associated With Those Preferences," Environment and Behavior, 1989, vol. 21, No. 1, pp. 17-31.
Byrne, Daniel W et al., "Seven-Year Trends in Employee Health Habits From a Comprehensive Workplace Health Promotion Pro-

(56) References Cited

OTHER PUBLICATIONS gram at Vanderbilt University," Journal of Occupational and Environmental Medicine, Dec. 2011, vol. 53, No. 12, pp. 1372-1381 (10 pages).
Cairncross, Sandy, et al., "Water, sanitation and hygiene for the prevention of diarrhoea," International Journal of Epidemiology, 2010, vol. 39, pp. i193-i205 (14 pages).
California Energy Commission, 2013 Building Energy Efficiency Standards for Residential and Nonresidential Buildings, CEC☐400☐2012☐004-CMF-REV2 (268 pages).
Campanella et al., "Well Living Lab: A New Tool for Measuring the Human Experience in the Built Environment," Conscious Cities Journal No. 2, Conscious Cities Anthology 2017: Bridging Neuroscience, Architecture and Technology, 2017 (5 pages).
Canadian Office Action, dated Jul. 18, 2017, for Canadian Application No. 2,946,367, 3 pages.
Canadian Office Action, dated Jul. 25, 2017, for Canadian Application No. 2,940,766, 6 pages.
Cao, Chunmei et al., "Effect of Active Workstation on Energy Expenditure and Job Performance: A Systematic Review and Meta-analysis," Journal of Physical Activity and Health, 2016, vol. 13, No. 5, pp. 562-571.
Carlucci, Salvatore et al., "A review of indices for assessing visual comfort with a view to their use in optimization processes to support building integrated design," Renewable and Sustainable Energy Reviews, 2015, vol. 47, pp. 1016-1033.
Carr et al., "Interventions for tobacco cessation in the dental setting (Review)," Cochrane Database of Systematic Reviews, 2012, Issue 6, pp. 1-38 (40 pages).
Carrer et al., "Assessment through Environmental and Biological Measurements of Total Daily Exposure to Volatile Organic Compounds of Office Workers in Milan, Italy," Indoor Air, 2000, vol. 10, pp. 258-268.
Cavanaugh, William J. et al. "Speech Privacy in Buildings." Journal of the Acoustical Society of America 34: 475-492, (1962).
Center for Disease Control and Prevention, "Steps to Wellness: A Guide to Implementing the 2008 Physical Activity Guidelines for Americans in the Workplace" U.S. Department of Health Services, 2012, (120 pages).
Centers for Disease Control and Prevention, "Strategies to Prevent Obesity and Other Chronic Diseases: The CDC Guide to Strategies to Increase the Consumption of Fruits and Vegetables.," U.S. Department of Health and Human Services, 2011, pp. 1-60 (68 pages).
Chellappa et al., "Can light make US bright? Effects of light on cognition and sleep," Progress in Brain Research, 2011, vol. 190, 119-133.
Chellappa et al., "Non-Visual Effects of Light on Melatonin, Alertness and Cognitive Performance: Can Blue-Enriched Light Keep US Alert?," PLoS One, 2011, vol. 6, No. 1 (11 pages).
Chellappa et al., "Sex differences in light sensitivity impact on brightness perception, vigilant attention and sleep in humans," Scientific Reports, 2017, vol. 7, No. 14215, pp. 1-9.
Chellappa, "Individual differences in light sensitivity affect sleep and circadian rhythms," Sleep, 2021, vol. 44, No. 2, pp. 1-10.
Chen et al., "The Effect of Blue-Enriched Lighting on Medical Error Rate in a University Hospital ICU," The Joint Commission Journal on Quality and Patient Safety, 2021, vol. 47, No. 3, pp. 165-175.
Chen, Chun-Yuan, "A MOM-based Home Automation Platform in Heterogeneous Environments," A Thesis Submitted to Institute of Computer Science and Engineering College of Computer Science National Chiao Tung University, 2006 (93 pages).
Chinese Office Action, dated May 5, 2016, for Chinese Application No. 201380051774.0, 10 pages.
Cho et al., "Effects of artificial light at night on human health: A literature review of observational and experimental studies applied to exposure assessment," Chronobiology International: The Journal of Biological and Medical Rhythm Research, 2015, pp. 1-17.

Choi et al., "Impacts of indoor daylight environments on patient average length of stay (ALOS) in a healthcare facility," Building and Environment, 2012, vol. 50, pp. 65-75.
Chou, "A Practical Guide to Hazardous Gas Monitors" Occupational Hazards, 2000, vol. 62, No. 9, pp. 61-66.
Christoffersen et al., "Windows and Daylight—A post-occupancy evaluation of Danish offices," 2000 (9 pages).
Chun et al., "Thermal diary: Connecting temperature history to indoor comfort," Building and Environment, 2008, vol. 43, pp. 877-885.
Clasen et al., "Interventions to improve water quality for preventing diarrhoea (Review)," Cochrane Database of Systematic Reviews, 2015, Issue 10, pp. 1-175 (178 pages).
Clements-Croome, "Work performance, productivity and indoor air," Scandinavian Journal of Work Environment & Health, 2008, pp. 69-78.
Communication pursuant to Article 94(3) EPC issued in EP Application No. 20191237.5 dated Jun. 14, 2021 (13 pages).
Communication pursuant to Article 94(3) EPC, dated Mar. 15, 2018, for European Application No. 15 754 628.4-1222, 9 pages.
Communication pursuant to Article 94(3) EPC, dated Nov. 23, 2016, for European Application No. 13833105.3, 8 pages.
Communication pursuant to Rule 164(1) EPC, dated Mar. 30, 2016, for European Application No. 13833105.3-1853 / 2891019, 9 pages.
Corbijn Van Willenswaard, Kyrsten et al., "Music interventions to reduce stress and anxiety in pregnancy: a systematic review and meta-analysis," BMC Psychiatry, 2017, vol. 17, No. 271, pp. 1-9 (9 pages).
Corrected Notice of Allowance, dated Jun. 26, 2017, for U.S. Appl. No. 14/012,444, Pillai et al., "Systems, Methods and Articles for Enhancing Wellness Associated With Habitable Environments," 2 pages.
Corrected Notice of Allowance, dated Jun. 6, 2017, for U.S. Appl. No. 14/012,444, Pillai et al., "Systems, Methods and Articles for Enhancing Wellness Associated With Habitable Environments," 2 pages.
Coury, Helenice J.C.G. et al., "Evaluation of the effectiveness of workplace exercise in controlling neck, shoulder and low back pain: a systematic review," Brazilian Journal of Physical Therapy, 2009, vo. 13, No. 6, pp. 461-479.
D. A. McIntyre, "Response To Atmospheric Humidity At Comfortable Air Temperature: a Comparison of Three Experiments", The Annals of Occupational Hygiene, vol. 21, Issue 2, Aug. 1978, pp. 177-190.
D'Ambrosio Alfano et al., "On the measurement of the mean radiant temperature and its influence on the indoor thermal environment assessment," Building and Environment, 2013, vol. 63, pp. 79-88.
Dalager et al., "Implementing intelligent physical exercise training at the workplace: health effects among office workers—a randomized controlled trial," European Journal of Applied Physiology, 2016, vol. 116, pp. 1433-1442 (10 pages).
Dalal, Reeshad S., "Job Attitudes: Cognition and Affect," Handbook of Psychology, Second Edition, 2013, pp. 341-366 (26 pages).
Darvesh, Nazia, et al., "Water, sanitation and hygiene interventions for acute childhood diarrhea: a systematic review to provide estimates for the Lives Saved Tool," BMC Public Health, 2017, vol. 17(Suppl 4), Article 776, pp. 101-111 (11 pages).
De Dear et al., "Developing an Adaptive Model of Thermal Comfort and Preference," ASHRAE Transactions, 1998, vol. 104, part 1 (19 pages).
Delos, "Delos and MGM Grand Las Vegas Introduce First-Ever Stay Well Rooms," Sep. 20, 2012, retrieved from http://delosliving.com/staywell/delos-mgm-grand-las-vegas-introduce-first-ever-stay-well - . . . retrieved on May 14, 2014, 4 pages.
Delos, "Delos Announces First-Ever WELL™ Certified Office at CBRE Headquarters in Los Angeles," Nov. 19, 2013, retrieved from http://delosliving.com/press-release/delos-the-pioneer-of-wellness-real-estate-announces-fi . . . , retrieved on May 14, 2014, 4 pages.
Delos, "MGM Grand and Delos Complete Expansion of Stay Well Experience and Introduce New Stay Well Lounge," Feb. 26, 2014, retrieved from http://delosliving.com/press-release/mgm-grand-and-delos-complete-expansion-of-stay-we . . . , retrieved on May 14, 2014, 4 pages.

(56) References Cited

OTHER PUBLICATIONS

Delos, "World's First Well® Certified Restaurants Introduced by Delos and LYFE Kitchen," Dec. 4, 2013, retrieved from http://delosliving.com/press-release/worlds-first-well-certified-restaurants-introduced-by-d . . . retrieved on May 14, 2014, 4 pages.
Delos, "World's First Wellness-Infused Student Housing Model In Philadelphia For St. Joseph's University Introduced By Delos and Cross Properties," Nov. 25, 2013, retrieved from http://delosliving.com/press-release/delos-the-pioneer-of-wellness-real-estate-and-cross-pr . . . , retrieved on May 14, 2014, 4 pages.
Delos, "Introducing Wellness Real Estate-Can Your Home Actually Improve Your Health?," May 1, 2012, retrieved from http://delosliving.com/press-release/can-your-home-actually-improve-your-health/, retrieved on May 14, 2014, 3 pages.
Destaillats et al., "Indoor pollutants emitted by office equipment: A review of reported data and information needs," Atmospheric Environment, 2008, vol. 42, pp. 1371-1388.
Diamond, "Executive Functions," Annual Review of Psychology, 2013, vol. 64, pp. 135-168.
Dijk et al., "Light, Sleep, and Circadian Rhythms: Together Again," PLoS Biology, 2009, vol. 7, No. 6, pp. 1-4.
Dingle et al., "Formaldehyde Levels and the Factors Affecting These Levels in Homes in Perth, Western Australia," Indoor Built Environment, 2002, vol. 11, pp. 111-116.
Domanico et al., "Documenting the NICU design dilemma: comparative patient progress in open-ward and single family room units," Journal of Perinatology, 2011, vol. 31, pp. 281-288.
Dong et al., "A review of smart building sensing system for better indoor environment control," Energy and Buildings, 2019, vol. 199, pp. 29-46.
Dounis et al., "Design of a fuzzy system for living space thermal-comfort regulation," Applied Energy, 2001, vol. 69, pp. 119-144.
Duckitt, Kirsten et al., "Menorrhagia," BMJ Clinical Evidence, 2012, pp. 1-69 (69 pages).
Dueñas, Juan C. et al., "An End-to-End Service Provisioning Scenario for the Residential Environment," IEEE Communications Magazine, 2005, pp. 94-100.
Dussault et al., "Office buildings with electrochromic windows: A sensitivity analysis of design parameters on energy performance, and thermal and visual comfort," Energy and Building, 2017, vol. 153, pp. 50-62.
Ebbert et al., "Interventions for smokeless tobacco use cessation (Review)," Cochrane Database of Systematic Reviews, 2015, No. 10 (56 pages).
Edgerton, V. R., et al.; "Elevation of Hemoglobin and Work Tolerance in Iron-Deficient Subjects", J. Nutr. Sci. Vitaminol., 27, 77-86, 1981.
Eisele et al., "LED Lighting System," Notice of Allowance, dated Apr. 21, 2015, for U.S. Appl. No. 14/486,753, 9 pages.
Eisele et al., "LED Lighting System," Notice of Allowance, dated Mar. 14, 2016, for U.S. Appl. No. 14/805,243, 6 pages.
Eisele et al., "LED Lighting System," Notice of Allowance, dated May 13, 2014, for U.S. Appl. No. 13/863,589, 6 pages.
Eisele et al., "LED Lighting System," Office Action dated Oct. 22, 2015, for U.S. Appl. No. 14/805,243, 14 pages.
Eisele et al., "LED Lighting System," Office Action, dated Feb. 4, 2015, for U.S. Appl. No. 14/486,753, 7 pages.
Eisele et al., "LED Lighting System," Office Action, dated Jul. 26, 2012, for U.S. Appl. No. 12/900,158, 13 pages.
Eisele et al., "LED Lighting System," Office Action, dated Jun. 5, 2013, for U.S. Appl. No. 13/863,589, 5 pages.
Eisele et al., "LED Lighting System," Office Action, dated Nov. 1, 2013, for U.S. Appl. No. 13/863,589, 6 pages.
Eisele et al., "LED Lighting System," Office Action, dated Oct. 22, 2015, for U.S. Appl. No. 14/805,243, 18 pages.
Eisele et al., "LED Lighting System," Preliminary Amendment, filed Dec. 30, 2014, for U.S. Appl. No. 14/486,753.
Eisele et al., "LED Lighting System," Preliminary Amendment, filed Sep. 15, 2015, for U.S. Appl. No. 14/805,243, 9 pages.
Eisele et al., "LED Lighting System," Preliminary Amendment, filed Sep. 8, 2016, for U.S. Appl. No. 15/187,317, 9 pages.
Eisele et al., "LED Lighting System," Response, filed Jan. 27, 2014, for U.S. Appl. No. 13/863,589, 3 pages.
Eisele et al., "LED Lighting System," Response, filed Jan. 5, 2016, for U.S. Appl. No. 14/805,243, 3 pages.
Eisele et al., "LED Lighting System," Response, filed Mar. 6, 2015, for U.S. Appl. No. 14/486,753, 3 pages.
Eisele et al., "LED Lighting System," Response, filed Sep. 4, 2013, for U.S. Appl. No. 13/863,589, 3 pages.
Eisele et al., "LED Lighting System," Amendment, filed Oct. 24, 2012, for U.S. Appl. No. 12/900,158, 12 pages.
Eisele et al., "LED Lighting System," Second Preliminary Amendment filed Dec. 30, 2014, for U.S. Appl. No. 14/486,753, 9 pages.
Eisele et al., "LED Lighting System," U.S. Appl. No. 61/249,858, filed Oct. 8, 2009, 58 pages.
Eisele et al., "LED Lighting System," Notice of Allowance dated Jan. 9, 2013, for U.S. Appl. No. 12/900,158, 9 pages.
Engvall et al., "Sick building syndrome in relation to building dampness in multi-family residential buildings in Stockholm," International Archives of Occupational and Environmental Health, 2001, vol. 74, pp. 270-278.
Epstein et al., "Thermal Comfort and the Heat Stress Indices," Industrial Health, 2006, vol. 44, pp. 388-398.
European Agency for Safety and Health at Work, et al., "Work-related musculoskeletal disorders: back to work report," Luxembourg: Office for Official Publications of the European Communities, 2007. pp. 3-100 (100 pages).
European Search Report for EP Application No. 15160578.9, dated Aug. 11, 2015, 8 pages.
Evans, G W, and D Johnson. "Stress and open-office noise." The Journal of applied psychology vol. 85,5: 779-83, (2000).
Examination Report issued in AU Application No. 2016202287 dated May 8, 2020.
Examiner's Report issued in CA Application No. 2,940,766 dated Jan. 11, 2019.
Exelmans et al., "Bedtime mobile phone use and sleep in adults," Social Science & Medicine, 2016, vol. 148, pp. 93-101.
Extended European Search Report and Lack of Unity of Invention Sheet B, dated Jul. 28, 2016, for European Application No. 13833105.3, 17 pages.
Extended European Search Report issued in EP Application No. 17844397.4 dated Jun. 17, 2020 (8 pages).
Extended European Search report issued in EP Application No. 20152815.5 dated Aug. 4, 2020.
Extended European Search Report issued in EP Application No. 20191237.5 dated Sep. 21, 2020.
Extended European Search Report, dated Feb. 1, 2018, for European Application No. 17167920.2-1213, 10 pages.
Extended European Search Report, dated Jul. 12, 2017, for European Application No. 15754628.4-1958, 11 pages.
Extended European Search Report, dated May 28, 2018, for European Application No. 16737803.3-1222/3245631, 7 pages.
Extended European Search Report, dated Nov. 5, 2014, for European Application No. 12779504.5-1352, 6 pages.
Fabrictech International, "PureCare™ Antibacterial Silver," retrieved from http://www.fabrictech.com/shop/purecaresilver.html, retrieved on Aug. 13, 2012, 1 page.
Fabrictech International, "Total Health & Wellness Protection Package-Save 25%," retrieved from http://www.fabrictech.com/shop/custom-package/total-healthawellness-protection.html, retrieved on Aug. 13, 2012, 3 pages.
Fanger, P. O.; "Assessment of man's thermal comfort in practice", British Journal of Industrial Medicine, 1973, 30, 313-324.
Fanger, P. O., "Introduction of the olf and the decipol units to quantify air pollution perceived by humans indoors and outdoors", Building Serv. Eng. Res. Technol. 9(4), 1988, pp. 155-157 (3 pages).
Fanger, PO; "Olf and decipol: New units for perceived air quality," Building Serv. Eng. Res. Technol. 9(4) 155-157 (1988), (3 pages).
Fanger, PO; "Local Discomfort To the Human Body Caused By Non-Uniform Thermal Environments", Annals of Occupational Hygiene 20: 285-291 (1977).

(56) References Cited

OTHER PUBLICATIONS

Farzaneh et al., "Controlling automobile thermal comfort using optimized fuzzy controller," Applied Thermal Engineering, 2008, vol. 28, pp. 1906-1917.
Felleman et al., "Distributed Hierarchical Processing in the Primate Cerebral Cortex," Cerebral Corte, 1991, vol. 1, No. 1, pp. 1-47.
Ferguson MA et al., "Hearing aids for mild to moderate hearing loss in adults (Review)," Cochrane Database of Systematic Reviews, 2017, Issue 9, pp. 1-46 (48 pages).
Fewtrell, Lorna, et al., "Water, sanitation, and hygiene interventions to reduce diarrhoea in less developed countries: a systematic review and meta-analysis," The Lancet Infect Diseases, 2005, vol. 5, pp. 42-52 (11 pages).
Figueiro et al., "Daylight and Productivity—A Field Study," Panel 8. Human and Social Dimensions of Energy Use: Understanding Markets and Demand, 2002 (10 pages).
Finnegan et al., "Work Attitudes in Windowed vs. Windowless Environments," The Journal of Social Psychology, 1981, vol. 115, pp. 291-292.
First Examination Report issued in IN Application No. 201617032677 dated Jul. 30, 2020.
Fisk et al., "Age-Related Impairment in Executive Functioning: Updating, Inhibition, Shifting, and Access," Journal of Clinical and Experimental Neuropsychology, 2004, vol. 26, No. 7, pp. 874-890.
Fisk, "Estimates of Potential Nationwide Productivity and Health Benefits From Better Indoor Environments: An Update," Indoor Air Quality Handbook, 1999 (38 pages).
Fisk, William J. et al., "Estimates of Potential Nationwide Productivity and Health Benefits From Better Indoor Environments: An Update," 1999 (38 pages).
Fisk, William, "How IEQ Affects Health, Productivity," ASHRAE Journal, 2002, vol. 44, No. 5, pp. 56-60 (4 pages).
Fitzgerald, Sarah, et al.; "A cost-analysis of complex workplace nutrition education and environmental dietary modification interventions", BMC Public Health (2017) 17:49, 10 pgs.
Földváry et al., "Effect of energy renovation on indoor air quality in multifamily residential buildings in Slovakia," Building and Environment, 2017, vol. 122, pp. 363-372.
Fonken et al., "Dim Light at Night Disrupts Molecular Circadian Rhythms and Affects Metabolism," Journal of Biological Rhythms, Author Manuscript, 2013, vol. 28, No. 4 (15 pages).
Food Service Guidelines Federal Workgroup, "Food Service Guidelines for Federal Facilities," 2017, U.S. Department of Health and Human Services, Washington, DC (30 pages).
Fossum et al., "The Association Between Use of Electronic Media in Bed Before Going to Sleep and Insomnia Symptoms, Daytime Sleepiness, Morningness, and Chronotype," Behavioral Sleep Medicine, 2014, vol. 12, pp. 343-357.
Foster et al., "Shortened complex span tasks can reliably measure working memory capacity," Memory & Cognition, 2015, vol. 43, pp. 226-236.
Foster, "Fundamentals of circadian entrainment by light," Lighting Research & Technology, 2021, vol. 53, pp. 377-393.
Fox, Marilyn L., et al.; "Effects of Stressful Job Demands and Control on Physiological and Attitudinal Outcomes in a Hospital Setting", The Academy of Management Journal, Apr. 1993, vol. 36, No. 2 (Apr. 1993), pp. 289-318.
Frazer K et al., "Impact of institutional smoking bans on reducing harms and secondhand smoke exposure (Review)," Cochrane Database of Systematic Reviews, 2016, Issue 5, pp. 1-85 (87 pages).
Frazer, K et al., "Legislative smoking bans for reducing harms from secondhand smoke exposure, smoking prevalence and tobacco consumption (Review)," Cochrane Database of Systematic Reviews, 2016, Issue 2, pp. 1-192 (194 pages).
Frontczak et al., "Literature survey on how different factors influence human comfort in indoor environments," Building and Environment, 2011, vol. 46, pp. 922-937.
Frontczak, Monika et al., "Literature survey on how different factors influence human comfort in indoor environments," Building and Environment, vol. 46, 2011, pp. 922-937 (16 pages).

Galasiu et al., "Occupant preferences and satisfaction with the luminous environment and control systems in daylit offices: a literature review," Energy and Buildings, 2006, vol. 38, pp. 728-742.
Garn, Joshua V., et al., "The impact of sanitation interventions on latrine coverage and latrine use: A systematic review and meta-analysis," International Journal of Hygiene and Environmental Health, 2017, vol. 220, pp. 329-340 (12 pages).
GBD 2013 Risk Factors Collaborators, "Global, regional, and national comparative risk assessment of 79 behavioural, environmental and occupational, and metabolic risks or clusters of risks in 188 countries, 1990-2013: a systematic analysis for the Global Burden of Disease Study 2013," The Lancet, 2015, vol. 386, pp. 2287-2323.
GBD 2015 Tobacco Collaborators. "Smoking prevalence and attributable disease burden in 195 countries and territories, 1990-2015: a systematic analysis from the Global Burden of Disease Study 2015." Lancet (London, England) vol. 389,10082: 1885-1906, (2017).
GBD 2016 Risk Factors Collaborators, "Global, regional, and national comparative risk assessment of 84 behavioural, environmental and occupational, and metabolic risks or clusters of risks, 1990- 2016: a systematic analysis for the Global Burden of Disease Study 2016," The Lancet, 2017, vol. 390, pp. 1345-1422 (78 pages).
Geaney, F., et al., "The effectiveness of workplace dietary modification interventions: A systematic review," Preventive Medicine, 2013, vol. 57, pp. 438-447, 10 pages.
General Services Administration, "Sound Matters: How to achieve accoustic comfort in the contemporary office," 2011, pp. 1-42 (42 pages).
Global, regional, and national disability-adjusted life-years (DALYs) for 315 diseases and injuries and healthy life expectancy (HALE), 1990-2015: a systematic analysis for the Global Burden of Disease Study 2015, www.thelancet.com, vol. 388, Oct. 8, 2016, pp. 1603-1658.
Goodman, "Measurement and specification of lighting: A look at the future," Lighting Research and Technology, 2009, vol. 41, pp. 229-243.
Goodman, "Green Wall Frame," Amendment After Allowance, filed May 11, 2016, for U.S. Appl. No. 29/528,147, 8 pages.
Goodman, "Green Wall Frame," Notice of Allowance, dated Feb. 11, 2016, for U.S. Appl. No. 29/528,147, 11 pages.
Goodnough, L.T et al., "Detection, evaluation, and management of preoperative anaemia in the elective orthopaedic surgical patient: NATA guidelines," British Journal of Anaesthesia, 2011, vol. 106, No. 1, pp. 13-22.
Grant et al., "Daytime Exposure to Short Wavelength-Enriched Light Improves Cognitive Performance in Sleep-Restricted College-Aged Adults," Frontier in Neurology, 2021, vol. 12, pp. 1-10.
Graves, Lee E.F et al., "Evaluation of sit-stand workstations in an office setting: a randomised controlled trial," BMC Public Health, 2015, vol. 15, No. 1145 (14 pages).
Greenwald, Anthony G et al. "Understanding and using the Implicit Association Test: III. Meta-analysis of predictive validity." Journal of personality and social psychology vol. 97,1: 17-41, (2009), (25 pages).
Grønli et al., "Reading from an iPad or from a book in bed: the impact on human sleep. A randomized controlled crossover trial," Sleep Medicine, 2016, vol. 21, pp. 86-92.
GSky Plant Systems, Inc., "Smart Wall Cabinet," 2012, retrieved from http://gsky.com/green-walls/ smartwall/, retrieved on Apr. 29, 2015, 3 pages.
Gueymard, "Turbidity Determination from Broadband Irradiance Measurements: A Detailed Multicoefficient Approach," Journal of Applied Meteorology, 1998, vol. 37, pp. 414-435.
Guirao, "Average Optical Performance of the Human Eye as a Function of Age in a Normal Population," Investigative Ophthalmology & Visual Science, 1999, vol. 40, No. 1, pp. 203-213.
Gunnar, Megan, and Karina Quevedo. "The neurobiology of stress and development." Annual review of psychology vol. 58: 145-73, (2007), (33 pages).

(56) References Cited

OTHER PUBLICATIONS

Guyatt et al., "GRADE: an emerging consensus on rating quality of evidence and strength of recommendations," BMJ, Apr. 26, 2008, vol. 336, pp. 924-926 (3 pages).

Hafner et al., Why sleep matters—the economic costs of insufficient sleep: A cross-country comparative analysis, 2016 (101 pages).

Haider, B.A et al., "Anaemia, prenatal iron use, and risk of adverse pregnancy outcomes: systematic review and meta-analysis," BMJ, 2013, pp. 1-19.

Haider, BA et al., "Multiple-micronutrient supplementation for women during pregnancy (Review)," Cochrane Database of Systematic Reviews, 2015, Issue 11, pp. 1-100 (103 pages).

Hajdukiewicz, Magdalena et al., "Calibrated CFD simulation to evaluate thermal comfort in a highly-glazed naturally ventilated room," Building and Environment, 2013, vol. 70, pp. 73-89.

Hajdukiewicz, Magdalena et al., "Formal calibration methodology for CFD models of naturally ventilated indoor environments," Building and Environment, 2012, vol. 59 (28 pages).

Hannibal et al., "Melanopsin Is Expressed in PACAP-Containing Retinal Ganglion Cells of the Human Retinohypothalamic Tract," Investigative Ophthalmology & Visual Science, 2004, vol. 45, No. 11, pp. 4202-4209.

Haq et al., "A review on lighting control technologies in commercial buildings, their performance and affecting factors," Renewable and Sustainable Energy Reviews, 2014, vol. 33, pp. 268-279.

Hasan et al., "Sensitivity study for the PMV thermal comfort model and the use of wearable devices biometric data for metabolic rate estimation," Building and Environment, 2016, vol. 110, pp. 173-183.

Hasan, Mohammad H., et al. "Sensitivity study for the PMV thermal comfort model and the use of wearable devices biometric data for metabolic rate estimation," Building and Environment, 2016, vol. 110, pp. 173-183 (11 pages).

Hastings, R., "Accommodating Seasonal Affective Disorder", https://www.shrm.org/resourcesandtools/hr-topics/employeerelations/pages/accommodatingsad.aspx. Dec. 21, 2009, Accessed Oct. 27, 2017 (3 pages).

Heijnen, Marieke et al., "Shared Sanitation versus Individual Household Latrines: A Systematic Review of Health Outcomes," PLoS ONE, 2014, vol. 9, Issue 4, pp. 1-9 (9 pages).

Henrich, J., Heine, S. & Norenzayan, A. "Most people are not WEIRD", Nature 466, 29 (2010), (1 page).

Hensen, "Literature Review on Thermal Comfort in Transient Conditions," Building and Environment, 1990, vol. 25, No. 4, pp. 309-316.

Hertenstein, Matthew J et al. "The communication of emotion via touch." Emotion (Washington, D.C.) vol. 9,4: 566-73, (2009), (8 pages).

Higuchi et al., "Influence of eye colors of Caucasians and Asians on suppression of melatonin secretion by light," American Journal of Physiology: Regulatory, Integrative and Comparative Physiology, 2007, vol. 292, pp. R2352-R2356.

Hiscocks, "Measuring Light," 2008 (9 pages).

Hiscocks, "Measuring Luminance with a Digital Camera: Case History," 2013 (10 pages).

Hoffman, Steven J, and Charlie Tan. "Overview of systematic reviews on the health-related effects of government tobacco control policies", BMC public health vol. 15 744. Aug. 5, 2015, (11 pages).

Hoisington et al., "Ten questions concerning the built environment and mental health," Building and Environment, 2019, vol. 155, pp. 58-69.

Horne et al., "A Self-Assessment Questionnaire to Determine Morningness-Eveningness in Human Circadian Rhythms," International Journal of Chronobiology, 1976, vol. 4, pp. 97-110.

Hossain, Muttaquina et al., "Evidence-based approaches to childhood stunting in low and middle income countries: a systematic review," Archives of Disease in Childhood, 2017, vol. 102, pp. 903-909.

Hou, Can et al., "Do Mobile Phone Applications Improve Glycemic Control (HbA1c) in the Self-management of Diabetes? A Systematic Review, Meta-analysis, and GRADE of 14 Randomized Trials," Diabetes Care, 2016, vol. 39, pp. 2089-2095.

Howieson et al., "Building tight—ventilating right? How are new air tightness standards affecting indoor air quality in dwellings?" Journal of Building Services Engineering Research & Technology, 2014, vol. 35, No. 5, pp. 475-487.

Hu, Yi-meng et al., "Effects of probiotics supplement in patients with type 2 diabetes mellitus: A meta-analysis of randomized trials", Medicina Clínica (English Edition), vol. 148, Issue 8, Apr. 21, 2017, pp. 362-370 (6 pages).

Huang et al., "A study about the demand for air movement in warm environment," Building and Environment, 2013, vol. 61, pp. 27-33.

Huizenga et al., "Air Quality and Thermal Comfort in Office Buildings: Results of a Large Indoor Environmental Quality Survey," Proceedings of Healthy Buildings, 2006, vol. 3, pp. 393-397.

Huizenga, C. et al., "Air Quality and Thermal Comfort in Office Buildings: Results of a Large Indoor Environmental Quality Survey," Proceeding of Healthy Buildings, 2006, vol. 3 (6 pages).

Humphreys, "Quantifying occupant comfort: are combined indices of the indoor environment practicable?" Building Research & Information, 2005, vol. 33, No. 4, pp. 317-325.

Humphreys, Michael A., "Quantifying occupant comfort: are combined indices of the indoor environment practicable?", Building Research & Information, 33:4, 317-325, (2005), (10 pages).

Huo, Jun Sheng et al., "Effect of NaFeEDTA-Fortified Soy Sauce on Anemia Prevalence in China: A Systematic Review and Meta-analysis of Randomized Controlled Trials," Biomedical and Environmental Science, 2015, vol. 28, No. 11, pp. 788-798.

Hutchinson, et al. "Improving nutrition and physical activity in the workplace: a meta-analysis of intervention studies," Health Promotion International, 2012, vol. 27, No. 2, pp. 238-249 (12 pages).

Hysing et al., "Sleep and use of electronic devices in adolescence: results from a large population-based study," BMJ Open, 2015, vol. 5, pp. 1-7.

International Commission on Illumination, Technical Report: Guide on the Limitation of the Effects of Obtrusive Light From outdoor Lighting Installations, 2003 (46 pages).

International Organization for Standardization, "Ergonomics of the thermal environment—Instruments for measuring physical quantities," BS EN ISO 7726, 2nd Edition, 2001 (62 pages).

International Organization for Standardization, "Ergonomics of the thermal environment—Analytical determination and interpretation of thermal comfort using calculation of the PMV and PPD indices and local thermal comfort criteria," ISO 7730, 3rd Edition, 2005 (11 pages).

International Search Report and the Written Opinion of the International Searching Authority, dated Jun. 8, 2015, for International Application No. PCT/US2015/017528, 20 pages.

International Search Report and Written Opinion for PCT/US2022/020903, dated Jul. 12, 2022 (17 pages).

International Search Report and Written Opinion of the International Searching Authority, dated Aug. 29, 2016, for International Application No. PCT/US2016/034416, 22 pages.

International Search Report for International Application No. PCT/US2019/050339, dated Nov. 27, 2019 (2 pages).

International Search Report for PCT/US2017/048382 dated Jan. 4, 2018 (4 pages).

International Search Report for PCT/US2018/048853 dated Nov. 21, 2018.

International Search Report issued in International Application No. PCT/US2019/50416, Nov. 27, 2019, 1 pages.

International Search Report, dated Apr. 28, 2016, for International Application No. PCT/US2016/013215, 5 pages.

International Search Report, dated Dec. 26, 2013, for International Application No. PCT/ US2013/057070, 4 pages.

International Search Report, dated Feb. 4, 2011, for International Application No. PCT/US2010/051791, 2 pages.

International Well Building Institute, "The WELL Building Standard: Version 1.0," 2015 (220 pages).

Ishihara et al., "Metabolic responses to polychromatic LED and OLED light at night," Scientific Reports, 2021, vol. 11, pp. 1-11.

Jammes, François et al., "Service-Oriented Device Communications Using the Devices Profile for Web Services," 2005 (8 pages).

(56) References Cited

OTHER PUBLICATIONS

Jamrozik et al., "A novel methodology to realistically monitor office occupant reactions and environmental conditions using a living lab," Building and Environment, 2018, vol. 130, pp. 190-199.
Japanese Office Action dated Apr. 25, 2017 for JP Application No. 2015-529995, with English summary, 14 pages.
Jenkins et al., "A practical approach to glare assessment for train cabs," Applied Ergonomics, 2015, vol. 47, pp. 170-180.
Jensen, Kl, et al.; "Acoustical Quality In Office Workstations, As Assessed By Occupant Surveys", Proceedings: Indoor Air (2002) UC Berkeley Indoor Environmental Quality (IEQ), Sep. 4, 2005, 6 pgs.
Jernigan, "Light studies focus on circadian rhythms," BioPhotonics, Jul. 2009, retrieved from http://www.photonics.com/Article.aspx?PID=I&VID=43&IID=396&AID=38995, retrieved on Nov. 3, 2014, 2 pages.
Jernigan, R., "Light Studies Focus on Circadian Rhythms," Photonics Showcase, Nov. 2009, p. 12.
Job Accommodation Network, "Accommodation and Compliance Series: Employees with Hearing Loss," available at https://askjan.org/media/Hearing.html, accessed Oct. 31, 2017 (25 pages).
Jones, "Chapter 4—Acoustical Treatment for Indoor Areas," in Handbook for Sound Engineers, Ballou (ed.), Burlington, MA, Focal Press, 2008, 65-94.
Jonsson, Ulf et al., "Psychological Treatment of Depression in People Aged 65 Years and Over: A Systematic Review of Efficacy, Safety, and Cost Effectiveness," PLoS ONE, 2016, vol. 11, No. 8, pp. 1-20 (20 pages).
Joshi et al., "The importance of temperature and thermoregulation for optimal human sleep," Energy and Buildings, 2016, vol. 131, pp. 153-157.
Kahn-Marshall, Jennifer L. et al., "Making Healthy Behaviors the Easy Choice for Employees: A Review of the Literature on Environmental and Policy Changes in Worksite Health Promotion," Health Education & Behavior, 2012, vol. 39, No. 6, pp. 752-776, (25 pages).
Kakde, S. et al., "A systematic review on the social context of smokeless tobacco use in the South Asian population: Implications for public health," Public Health, 2012, vol. 126, No. 8, pp. 635-645.
Kaplan et al., "Directed Attention as a Common Resource for Executive Functioning and Self-Regulation," Perspectives on Psychological Science, 2010, vol. 5, No. 1, pp. 43-57.
Kaplan, "The Restorative Benefits of Nature: Toward an Integrative Framework," Journal of Environmental Psychology, 1995, vol. 15, pp. 169-182.
Kaplan, Seth, et al. "Measurement of Emotions." Research Methods in Occupational Health Psychology: Measurement, Design, and Data Analysis, 1st ed., Routledge, New York, New York, 2012, pp. 61-75.
Karjalainen et al., "User problems with individual temperature control in offices," Building and Environment, 2007, vol. 42, pp. 2880-2887.
Karjalainen, "Thermal comfort and gender: a literature review," Indoor Air, 2012, vol. 22, pp. 96-109.
Kastner, Wolfgang et al., "Communication Systems for Building Automation and Control," Proceedings of the IEEE, 2005, vol. 93, No. 6, pp. 1178-1203.
Kennedy et al., "Smoke-Free Policies in U.S. Prisons and Jails: A Review of the Literature," (Author Manuscript) Nicotine & Tobacco Research, 2015, vol. 17, No. 6 (14 pages).
Khunti, Kamlesh et al., "Association Between Adherence to Pharmacotherapy and Outcomes in Type 2 Diabetes: A Meta-analysis," Diabetes Care, 2017, vol. 40, pp. 1588-1596.
Kinney, "Climate Change, Air Quality, and Human Health," American Journal of Preventive Medicine, 2008, vol. 35, No. 5, pp. 459-467.
Klein, Laura et al., "Coordinating occupant behavior for building energy and comfort management using multi-agent systems," Automation In Construction, vol. 22, Mar. 2012, pp. 525-536.
Klepeis et al., "The National Human Activity Pattern Survey (NHAPS): a resource for assessing exposure to environmental pollutants," Journal of Exposure Analysis and Environmental Epidemiology, 2001, vol. 11, No. 3, pp. 231-252.
Knai, Cécile C. et al., "Are the Public Health Responsibility Deal alcohol pledges likely to improve public health? An evidence synthesis," Addiction, 2015, vol. 110, No. 8 (29 pages).
Knudsen et al., "Sensory and chemical characterization of VOC emissions from building products: impact of concentration and air velocity," Atmospheric Environment, 1999, vol. 33, pp. 1217-1230.
Kong et al., "The impact of interior design on visual discomfort reduction: A field study integrating lighting environments with POE survey," Building and Environment, 2018, vol. 138, pp. 135-148.
Konstantzos et al., "The effect of lighting environment on task performance in buildings—A review," Energy & Buildings, 2020, vol. 226, pp. 1-14.
Kool et al., "Decision Making and the Avoidance of Cognitive Demand," Journal of Experimental Psychology: General, 2010, vol. 139, No. 4, pp. 665-682.
Korotcenkov et al., "$In_2O_3$- and $SnO_2$-Based Thin Film Ozone Sensors: Fundamentals," Journal of Sensors, 2016, vol. 2016 (32 pages).
Kota, Sandeep et al., "Historical Survey of Daylighting Calculations Methods and Their Use in Energy Performance Simulations," Proceedings of the Ninth International Conference for Enhanced Building Operations, Nov. 17-19, 2009, Austin, Texas (9 pages).
LaCaille et al., "Go !: results from a quasi-experimental obesity prevention trial with hospital employees," BMC Public Health, 2016, vol. 17, No. 171, pp. 1-16 (16 pages).
Lai et al., "An evaluation model for indoor environmental quality (IEQ) acceptance in residential buildings," Energy and Buildings, 2009, vol. 41, pp. 930-936.
Lai et al., "Perceived Importance of the Quality of the Indoor Environment in Commercial Buildings," Indoor and Built Environment, 2007, vol. 16, No. 4, pp. 311-321.
Lai et al., "Perception of importance and performance of the indoor environmental quality of high-rise residential buildings," Building and Environment, 2009, vol. 44, pp. 352-360.
Lai et al., "An evaluation model for indoor environmental quality (IEQ) acceptance in residential buildings," 2009, vol. 41, pp. 930-9636.
Lai, A.C.K, et al.; "An evaluation model for indoor environmental quality (IEQ) acceptance in residential buildings", Energy and Buildings 41 (2009) 930-936.
Lai, H. K., and Yik, F. W. H., "Perception of importance and performance of the indoor environmental quality of high-rise residential buildings", Building and Environment, 44(2), 352-360 (2009).
Lai, Joseph H. K. and Francis W.H. Yik. "Perceived Importance of the Quality of the Indoor Environment in Commercial Buildings." Indoor and Built Environment 16: 311-321, (2007).
Lal, Avtar, et al., "The Effect of Physical Exercise After a Concussion: A Systematic Review and Meta-analysis," The American Journal of Sports Medicine, 2018, vol. 43, Issue 3, pp. 743-752 (10 pages).
Lan et al., "Ten questions concerning thermal environment and sleep quality," Building and Environment, 2016, vol. 99, pp. 252-259.
Land, "Using Vitamin C To Neutralize Chlorine in Water Systems," Recreation Management Tech Tips, Apr. 2005, retrieved from http://www.fs.fed.us/t-d/pubs/html/05231301/05231301.html, retrieved on Mar. 1, 2016, 6 pages.
Landrigan, Phillip J., "Air pollution and health," The Lancet Public Health, 2017, vol. 2, No. 1, pp. e4-e5.
Larson, Nicole et al., "A Review of Environmental Influences on Food Choices," Annals of Behavioral Medicine : A Publication of the Society of Behavioral Medicine, 2009, vol. 38 Suppl 1, pp. S56-S73.
Lassi et al., "Impact of education and provision of complementary feeding on growth and morbidity in children less than 2 years of age in developing countries: a systematic review," BMC Public Health, 2013, vol. 13, pp. 1-10 (10 pages).

(56) References Cited

OTHER PUBLICATIONS

Leather et al., "Windows in the Workplace: Sunlight, View, and Occupational Stress," Environment and Behavior, 1998, vol. 30, No. 6, pp. 739-762.
Leavitt, Keith, et al.; "Asking about well-being gets you half an answer: Intra-individual processes of implicit and explicit job attitudes", Journal of Organizational Behavior, J. Organiz. Behav. 32, 672-687 (2011).
Leder et al., "Effects of office environment on employee satisfaction: a new analysis," Building Research and Information, 2015 (22 pages).
Lee, Courtney, et al., "The effectiveness of acupuncture research across components of the trauma spectrum response (tsr): a systematic review of reviews," Systematic Reviews, 2012, vol. 1, Article 46, pp. 1-18 (18 pages).
Leech et al., "It's about time: A comparison of Canadian and American time-activity patterns," Journal of Exposure Analysis and Environmental Epidemiology, 2002, vol. 12, No. 6, pp. 427-432.
Leidinger et al., "Selective detection of hazardous VOCs for indoor air quality applications using a virtual gas sensor array," Journal of Sensors and Sensor Systems, 2014, vol. 3, pp. 253-263.
Levy et al., "Ozone Exposure and Mortality: An Empiric Bayes Metaregression Analysis," Epidemiology, 2005, vol. 16, No. 4, pp. 458-468.
Lewtas, "Air pollution combustion emissions: Characterization of causative agents and mechanisms associated with cancer, reproductive, and cardiovascular effects," Reviews in Mutation Research, 2007, vol. 636, pp. 95-133.
Li et al., "Health promotion interventions and policies addressing excessive alcohol use: A systematic review of national and global evidence as a guide to health-care reform in China," HHS Public Access, Author Manuscript, 2015, vol. 110, No. 1, pp. 1-18 (18 pages).
Li, Danny H. W., et al.; "A simplified procedure for determining indoor daylight illuminance using daylight coefficient concept", Building and Environment 41 (2006) 578-589.
Licht.wissen 19: Impact of Light on Human Beings, licht.de, Mar. 2014 (56 pages).
Licina et al., "Concentrations and Sources of Airborne Particles in a Neonatal Intensive Care Unit," PLOS One, 2016 (17 pages).
Licina et al., "Emission rates and the personal cloud effect associated with particle release from the perihuman environment," Indoor Air, 2017, vol. 27, pp. 791-802.
Liu et al., " Human thermal adaptive behaviour in naturally ventilated offices for different outdoor air temperatures: A case study in Changsha China," Building and Environment, 2012, vol. 50, pp. 76-89.
Liu et al., "A Survey on Gas Sensing Technology," Sensors, 2012, vol. 12, pp. 9635-9665.
Löndahl et al., "A set-up for field studies of respiratory tract deposition of fine and ultrafine particles in humans," Journal of Aerosol Science, 2006, vol. 37, pp. 1152-1163.
Luedtke, Kerstin et al., "Efficacy of interventions used by physiotherapists for patients with headache and migraine—Systematic review and meta-analysis," Cephalalgia, 2015 (20 pages).
Luke, "Evaluating significance in linear mixed-effects models in R," Behavior Research Methods, 2017, vol. 49, pp. 1494-1502.
Luttmann, Alwin et al., "Preventing Musculoskeletal Disorders in the Workplace," World Health Organization, Protecting Workers' Health Series No. 5, 2003 (40 pages).
Macarthur, Georgie J. et al., "Peer-led interventions to prevent tobacco, alcohol and/or drug use among young people aged 11-21 years: a systematic review and meta-analysis," 2016, Addiction, vol. 111, pp. 391-407 (17 pages).
Macary et al., "Systems, Methods and Articles for Monitoring and Enhancing Human Wellness," U.S. Appl. No. 15/543,114, filed Jul. 12, 2017, 113 pages.
Maes, Lea et al., "Effectiveness of workplace interventions in Europe promoting healthy eating: a systematic review," European Journal of Public Health, 2012, vol. 22, No. 5, pp. 677-683.

Mahyuddin et al., "The spatial distribution of carbon dioxide in rooms with particular application to classrooms," Indoor and Built Environment, 2014, vol. 23, No. 3, pp. 433-448.
Mardaljevic, J., et al.; "Daylighting Metrics: Is There A Relation Between Useful Daylight Illuminance and Daylight Glare Probability?", First Building Simulation and Optimization Conference Loughborough, UK, Sep. 10-11, 2012, 189-196.
Marinelli et al., "Hours of Television Viewing and Sleep Duration in Children: A Multicenter Birth Cohort Study," JAMA Pediatrics, 2014, vol. 168, No. 5, pp. 458-464.
Markus, "The Function of Windows—A Reappraisal," Building Science, 1967, vol. 2, pp. 97-121.
Massey et al., "Emission and Formation of Fine Particles from Hardcopy Devices: the Cause of Indoor Air Pollution," Monitoring, Control and Effects of Air Pollution, 2001, pp. 121-134.
McCullough et al., "Determining temperature ratings for children's cold weather clothing," Applied Ergonomics, 2009, vol. 40, pp. 870-877.
McIntyre, "Response to Atmospheric Humidity at Comfortable Air Temperature: A Comparison of Three Experiments," Annals of Occupational Hygiene, 1978, vol. 21, pp. 177-190.
McKay, Alisa J. et al,, "Strategies for Tobacco Control in India: A Systematic Review," PLOS One, 2015, vol. 4. pp. 1-34 (34 pages).
Meerbeek et al., "Impact of blinds usage on energy consumption: automatic versus manual control," conference paper, 2014 (17 pages).
Meister et al., "Low-Level Visual Processing: The Retina," Chapter 26, Principles of Neural Science, 2014, pp. 577-601.
Mendell et al., "Improving the Health of Workers in Indoor Environments: Priority Research Needs for a National Occupational Research Agenda," American Journal of Public Health, 2002, vol. 92, No. 9, pp. 1430-1440.
Mendell, et al. "Improving the Health of Workers in Indoor Environments: Priority Research Needs for a National Occupational Research Agenda," American Journal of Public Health, 2002, vol. 92, No. 9, pp. 1430-1440 (11 pages).
Merz, Victoire et al., "Brief interventions to prevent recurrence and alcohol-related problems in young adults admitted to the emergency ward following an alcohol-related event: a systematic review," Journal of Epidemiology and Community Health, 2015, vol. 69, No. 9, pp. 912-917.
Messer, Alan et al., "InterPlay: A Middleware for Seamless Device Integration and Task Orchestration in a Networked Home," Proceedings of the Fourth Annual IEEE International Conference on Pervasive Computing and Communications, 2006 (10 pages).
Mingkhwan, A. et al., "Dynamic service composition in home appliance networks," Multimedia Tools and Applications, 2006, vol. 29, pp. 257-284.
Minichiello, Alexa et al., "Effective strategies to reduce commercial tobacco use in Indigenous communities globally: A systematic review," BMC Public Health, 2016, vol. 16, No. 21 (25 pages).
Mitchell, Lana J. et al., "Effectiveness of dietetic consultations in primary health care: A systematic review of randomized controlled trials," Journal of the Academy of Nutrition and Dietetics, 2017 (41 pages).
Miyake et al., "The Unity and Diversity of Executive Functions and Their Contributions to Complex "Frontal Lobe" Tasks: A Latent Variable Analysis," Cognitive Psychology, 2000, vol. 41, pp. 49-100.
Mold Inspection California, "Killing Mold With Ozone & Thermal Heat," retrieved from http://moldinspectioncalifornia.com/kill_mold_with_ozone.html, 3 pages.
Monson, Eva et al., "Effects of Enactment of Legislative (Public) Smoking Bans on Voluntary Home Smoking Restrictions: A Review," Nicotine & Tobacco Research, 2017, vol. 19, No. 2, pp. 141-148.
Moore-Ede et al., "Circadian Potency Spectrum with Extended Exposure to Polychromatic White LED Light under Workplace Conditions," Journal of Biological Rhythms, 2020, vol. 35, No. 4, pp. 405-415.
Moore-Ede et al., "LEDs must spectrally balance illumination, circadian health, productivity, and energy efficiency," LEDs Magazine, available at least as early as Aug. 2021 at https://www.ledsmagazine.com/lighting-health-wellbeing/article/14199941/ideal-led-lighting-must-balance-multiple-objectives-magazine (14 pages).

(56) References Cited

OTHER PUBLICATIONS

Moya-Albiol, Luis et al. "Job satisfaction and cortisol awakening response in teachers scoring high and low on burnout." The Spanish journal of psychology vol. 13,2: 629-36, (2010).

Myhren, Jonn Are et al., "Flow patterns and thermal comfort in a room with panel, floor and wall heating," Energy and Buildings, 2008, vol. 40, 524-536.

Nabil et al., "Useful daylight illuminances: A replacement for daylight factors," Energy and Buildings, 2006, vol. 38, pp. 905-913.

Nabil, A. and Mardaljevic, John, "Useful daylight illuminance: A new paradigm for assessing daylight in buildings", Lighting Research & Technology—Lighting Res Technol. 37. 41-59, (2005).

Nabil, Azza and John Mardaljevic. "Useful daylight illuminances: A replacement for daylight factors." Energy and Buildings 38: 905-913, (2006).

Nair, Natasha K. et al., "A Systematic Review of Digital and Computer-Based Alcohol Intervention Programs in Primary Care," Current Drug Abuse Reviews, 2015, vol. 8, No. 2, pp. 1-8.

National Center for Chronic Disease Prevention and Health Promotion, Division for Heart Disease and Stroke Prevention, "Under Pressure: Strategies for Sodium Reduction in Worksites ," Centers for Disease Control and Prevention, 2012, pp. 1-9 (12 pages).

National Center for Health Statistics (CDC), National Health Interview Survey (Adult Physical Activity Information; Glossary), https://www.cdc.gov/nchs/nhis/physical_activity/pa_glossary.htm, 2017 (2 pages).

National Lighting Product Information Program, "Photosensors: Dimming and Switching Systems for Daylight Harvesting," Specifier Reports, 2007, vol. 11, No. 1 (54 pages).

Naturvention, "Science," URL=https://www.naturvention.com/technology-and-science/science/, download date Apr. 5, 2016, 4 pages.

Naturvention, "Technology," URL=https://www.naturvention.com/technology-and-science/, download date Apr. 5, 2016, 6 pages.

Ne'eman et al., "Office Worker Response to Lighting and Daylighting Issues in Workspace Environments: A Pilot Survey," Energy and Buildings, 1984, vol. 6, pp. 159-171.

Newsham, "Clothing as a thermal comfort moderator and the effect on energy consumption," Energy and Buildings, 1997, vol. 26, pp. 283-291.

Newsham, Guy R.; "Clothing as a thermal comfort moderator and the effect on energy consumption", Energy and Buildings 26 (1997) 283-291.

Ni Mhurchu, Cliona et al., "Effects of worksite health promotion interventions on employee diets: a systematic review," BMC Public Health, 2010, vol. 10, No. 62, (7 pages).

Nicol et al., "A critique of European Standard EN 15251: strengths, weaknesses and lessons for future standards," Building Research & Information, 2011, vol. 39, No. 2, pp. 183-193.

Nie et al., "The effects of dynamic daylight☐ likeght on the rhythm, cognition, and mood of irregular shift workers in closed environment," Scientific Reports, 2021, vol. 11, No. 13059, pp. 1-11.

Nieuwenhuijsen, K. et al., "Interventions to improve return to work in depressed people (Review)," The Cochrane Library, 2014, Issue 12, pp. 1-140 (143 pages).

Ning, Mao et al., "Experimental and numerical studies on the performance evaluation of a bed-based task/ambient air conditioning (TAC) system," Applied Sciences, 2014, vol. 136, pp. 956-967.

Novoselac et al., "A critical review on the performance and design of combined cooled ceiling and displacement ventilation systems," Energy and Buildings, 2002, vol. 34, pp. 497-509.

O'Brien et al., "Manually-operated window shade patterns in office buildings: A critical review," Building and Environment, 2013, vol. 60, pp. 319-338.

Oberg, Mattias et al. "Worldwide burden of disease from exposure to second-hand smoke: a retrospective analysis of data from 192 countries." Lancet (London, England) vol. 377,9760: 139-46, (2011).

Obiltschnig, Günter, "Automatic Configuration and Service Discovery for Networked Smart Devices," Electronica Embedded Conference Munich, 2006 (8 pages).

Office Action issued in CN Application No. 201580021358.5 dated Feb. 2, 2019.

Office Action issued in CN Application No. 201680009629.X dated Jul. 23, 2020.

Office Action issued in MX Application No. MX/a/2016/011107.

Office Action, dated May 21, 2018, for U.S. Appl. No. 15/121,953, Pillai et al., "Systems and Articles for Enhancing Wellness Associated With Habitable Environments," 38 pages.

Office Action, dated May 31, 2018, for United States U.S. Appl. No. 15/421,046, Eisele et al., "LED Lighting System," 9 pages.

Office Action, dated Oct. 27, 2017, for U.S. Appl. No. 15/421,046, Eisele et al., "LED Lighting System," 8 pages.

Ormandy et al., "Health and thermal comfort: From WHO guidance to housing strategies," Energy Policy, 2012, vol. 49, pp. 116-121 (6 pages).

Osilla, Karen Chan, et al., "Systematic review of the Impact of Worksite Wellness Programs," The American Journal of Managed Care, 2012, vol. 18, No. 2, pp. e68-e81, (14 pages).

Oxititan, "Light Powered Protection," retrieved from http://www.oxititan.com, retrieved on Aug. 13, 2012, 2 pages.

Oxizidis, S., et al.; "Typical Weather Years and the Effect of Urban Microclimate on the Energy Behaviour of Buildings and HVAC Systems", Advances in Building Energy Research, 2007, vol. 1, 26 pages.

Pachón, Helena et al., "Evidence of the effectiveness of flour fortification programs on iron status and anemia: a systematic review," Nutrition Reviews, 2015, vol. 73, No. 11, pp. 780-795.

Painter et al., "Practical application of a sensor overlay system for building monitoring and commissioning," Energy and Buildings, 2012, vol. 48, pp. 29-39.

Panda et al., "Coordinated Transcription of Key Pathways in the Mouse by the Circadian Clock," Cell, 2002, vol. 109, pp. 307-320.

Park et al., "Variations of formaldehyde and VOC levels during 3 years in new and older homes," Indoor Air, 2006, vol. 16, pp. 129-135.

Park, "Are Humans Good Sensors? Using Occupants as Sensors for Indoor Environmental Quality Assessment and for Developing Thresholds that Matter," thesis, 2015 (274 pages).

Pasricha, Sant-Ryan et al., "Effect of daily iron supplementation on health in children aged 4-23 months: a systematic review and meta-analysis of randomised controlled trials," The Lancet Global Health, 2013, vol. 1, pp. e77-e86.

Passey, Megan E. et al., "Smoke-free homes: what are the barriers, motivators and enablers? A qualitative systematic review and thematic synthesis," BMJ Open, 2016, vol. 6, pp. 1-16 (16 pages).

Pasut, Wilmer et al., "Energy-efficient comfort with a heated/cooled chair: Results from human subject tests," Building and Environment, 2015, vol. 84, pp. 10-21.

Pattakos, Alex, et al.; "Discovering Meaning Through the Lens of Work", Journal of Constructivist Psychology, 30:1, 42-49 (2017), (9 pages).

Peña-Rosas et al. "Intermittent oral iron supplementation during pregnancy (Review)," Cochrane Database of Systematic Reviews, 2015, Issue 10, pp. 1-186 (193 pages).

Pennebaker, James W. "Writing about Emotional Experiences as a Therapeutic Process." Psychological Science 8, No. 3: 162-66, (1997).

Pennebaker, James W., et al.; "Accelarating the Coping Process", Journal of Personality and Social Psychology, 1990, vol. 58, No. 3, 528-537.

Perez et al., "All-Weather Model For Sky Luminance Distribution—Preliminary Configuration and Validation," Solar Energy, 1993 , vol. 50, No. 3, pp. 235-245.

Persily, "Evaluating Building IAQ and Ventilation with Indoor Carbon Dioxide," ASHRAE Transactions, 1997, vol. 103 (12 pages).

Pervez et al., "Photonic Crystal Spectrometer," U.S. Appl. No. 61/278,773, filed Oct. 12, 2009, 78 pages.

Pervez et al., "Photonic Crystal Spectrometer," U.S. Appl. No. 61/349,570, filed May 28, 2010, 52 pages.

Peuhkuri et al., "Diet promotes sleep duration and quality," Nutrition Research, 2012, vol. 32, pp. 309-319.

Phillips et al., "High sensitivity and interindividual variability in the response of the human circadian system to evening light," Proceed-

(56) References Cited

OTHER PUBLICATIONS ings of the National Academy of Sciences of the United States of America, 2019, vol. 116, No. 24, pp. 12019-12024.
Phipps-Nelson et al., "Daytime Exposure to Bright Light, as Compared to Dim Light, Decreases Sleepiness and Improves Psychomotor Vigilance Performance," Sleep, 2003, vol. 26, No. 6, pp. 695-700.
Piccolo et al., "Effect of switchable glazing on discomfort glare from windows," Building and Environment, 2009, vol. 44, pp. 1171-1180.
Pillai et al., "Systems, Methods and Articles for Enhancing Wellness Associated With Habitable Environments," Amendment, filed Jul. 21, 2016, for U.S. Appl. No. 14/012,444, 25 pages.
Pillai et al., "Systems, Methods and Articles for Enhancing Wellness Associated With Habitable Environments," Office Action, dated Mar. 22, 2016, for U.S. Appl. No. 14/012,444, 29 pages.
Pillai et al., "Systems, Methods and Articles for Enhancing Wellness Associated With Habitable Environments," Preliminary Amendment, filed Mar. 25, 2015, for U.S. Appl. No. 14/012,444, 149 pages.
Pillai et al., "Systems, Methods and Articles for Enhancing Wellness Associated With Habitable Environments," U.S. Appl. No. 15/409,233, filed Jan. 18, 2017, 84 pages.
Pillai et al., "Systems, Methods and Articles for Enhancing Wellness Associated With Habitable Environments," U.S. Appl. No. 15/421,022, filed Jan. 31, 2017, 84 pages.
Plotnikoff, Ronald et al., "Effectiveness of Interventions Targeting Health Behaviors in University and College Staff: A Systematic Review," American Journal of Health Promotion, 2015, vol. 29, No. 5 (20 pages).
Potter et al., "Circadian Rhythm and Sleep Disruption: Causes, Metabolic Consequences, and Countermeasures," Endocrine Reviews, 2016, vol. 37, No. 6, pp. 584-608.
Preliminary Amendment, filed Jul. 12, 2017, for U.S. Appl. No. 15/543,114, Macary et al., "Systems, Methods and Articles for Monitoring and Enhancing Human Wellness," 10 pages.
Preto et al., "Lighting in the Workplace: Recommended Illuminance (lux) at Workplace Environs," Advances in Design for Inclusion, 2019, pp. 180-191.
Provencio et al., "A Novel Human Opsin in the Inner Retina," The Journal of Neuroscience, 2000, vol. 20, No. 2, pp. 600-605.
Prudhon, Claudine et al., "WHO, UNICEF, and SCN Informal Consultation on Community-Based Management of Severe Malnutrition in Children," SCN Nutrition Policy Paper No. 21, Food and Nutrition Bulletin, 2006, vol. 27, No. 3 (supplement), The United Nations University, pp. s3-s108 (108 pages).
Pruessner, Jens C., et al. .; "Burnout, Perceived Stress, and Cortisol Responses to Awakening", Psychosomatic Medicine 61:197-204 (1999).
Rabbie, Harold M., "Distributed Processing Using Local Operating Networks," Assembly Automation, 1992, vol. 12, No. 1 (7 pages).
Rea, "Window Blind Occlusion: a Pilot Study," Building and Environment, 1984, vol. 19, No. 2, pp. 133-137.
Reinhart et al., "Monitoring manual control of electric lighting and blinds," Lighting Research & Technology, 2003, vol. 35, No. 3, pp. 243-260.
Revel et al., "Integration of real-time metabolic rate measurement in a low-cost tool for the thermal comfort monitoring in AAL environments," Ambient Assisted Living , 2015 (11 pages).
Roberge et al., Operational Amplifiers: Theory and Practice, Second Edition, 2007 (104 pages).
Rocha, Maria C. et al., "Stress among nurses: An examination of salivary cortisol levels on work and day off", Revista da Escola de Enfermagem da U S P. 47. 1187-1194 (2013).
Romm et al., Greening the Building and the Bottom Line: Increasing Productivity Through Energy—Efficient Design, 1994 (17 pages).
Rosen, Laura J. et al., "Effectiveness of Interventions to Reduce Tobacco Smoke Pollution in Homes: A Systematic Review and Meta-Analysis," International Journal of Environmental Research and Public Health, 2015, vol. 12, p. 16043-16059.

Rubin et al., "Window Blinds as a Potential Energy Saver—A Case Study," National Bureau of Standards Building Science Series 112, 1978 (89 pages).
Safizadeh, M. Reza, et al.; "Evaluation of Radiant Ceiling Heating Systems for Renovated Buildings based on Thermal Comfort Criteria", Windsor Conference Rethinking comfort, Apr. 12-15, 2018, 16 pgs.
Saif, Umar, "Architectures for ubiquitous systems," University of Cambridge Computer Laboratory Technical Report No. 527, 2002 (271 pages).
Saini et al., "The Mammalian Circadian Timing System: Synchronization of Peripheral Clocks," Cold Spring Harbor Symposia on Quantitative Biology, 2011, vol. 76 (10 pages).
Salter, Charles M. etal.; "Case studies of a method for predicting speech privacy in the contemporary workplace", UC Berkeley Indoor Environmental Quality (IEQ), Center for the Build Environment, 2003, 48 pgs.
Salthammer et al. "Formaldehyde in the Indoor Environment," Chemical Reviews, 2010, vol. 110, No. 4, pp. 2536-2572.
Sandberg et al., "Experimental Methods in Ventilation," Advances in Building Energy Research, 2008, vol. 2, No. 1, pp. 159-210.
Sarigiannis et al., "Multi-objective optimization of air quality monitoring," Environmental Monitoring Assessment, 2008, vol. 136, pp. 87-99.
Satish et al., "Is $CO_2$ an Indoor Pollutant? Direct Effects of Low-to-Moderate $CO_2$ Concentrations on Human Decision-Making Performance," Environmental Health Perspectives, 2012, vol. 120, No. 12, pp. 1671-1677.
Sbar et al., "Electrochromic dynamic windows for office buildings," International Journal of Sustainable Built Environment, 2012, vol. 1, pp. 125-139.
Schellen et al., "Differences between young adults and elderly in thermal comfort, productivity, and thermal physiology in response to a moderate temperature drift and a steady-state condition," Indoor Air, 2010, vol. 20, pp. 273-283.
Schlegel, "The Relative Effects of Convection and Radiation Heat Transfer on the Thermal Sensations of Sedentary Subjects," 1968 (73 pages).
Schlegel, Jay C., "The Relative Effects of Convection and Radiation Heat Transfer on the Thermal Sensations of Sedentary Objects", Kansas State University, (1968), (73 pages).
Schröer, S. et al., "Evidence-based lifestyle interventions in the workplace-an overview," Occupational Medicine, 2014, vol. 64, pp. 8-12.
Schweizer et al., "Indoor time-microenvironment-activity patterns in seven regions of Europe," Journal of Exposure Analysis and Environmental Epidemiology, 2007, vol. 17, No. 2, pp. 170-181.
Semenova et al., "Association of the melatonin circadian rhythms with clock 3111T/C gene polymorphism in Caucasian and Asian menopausal women with insomnia," Chronobiology International, 2018 (12 pages).
Seppänen et al., "Association of Ventilation Rates and $CO_2$ Concentrations with Health and Other Responses in Commercial and Institutional Buildings," Indoor Air, 1999, vol. 9, pp. 226-252.
Seppänen et al., "Summary of human responses to ventilation," Indoor Air, 2004, vol. 14, pp. 102-118.
Seppänen, O.A., et al., "Summary of human responses to ventilation," Indoor Air, 2004, vol. 14, Suppl. 7, pp. 102-118 (17 pages).
Shea, Beverley J., et al. .; "Development of AMSTAR: a measurement tool to assess the methodological quality of systematic reviews", BMC Medical Research Methodology 2007, 7:10, 7 pgs.
Shearer, Jane et al., "Nutra-ergonomics: influence of nutrition on physical employment standards and the health of workers," Applied Physiology, Nutrition, and Metabolism, 2016, vol. 41, pp. S165-S174 (10 pages).
Siemens, "Demand-controlled ventilation: Control strategy and applications for energy-efficient operation," publicly available at least as early as May 21, 2018 (72 pages).
Smith-McLallen, Aaron et al., "Comparative Effectiveness of Two Walking Interventions on Participation, Step Counts, and Health," American Journal of Health Promotion, 2016 (9 pages).

(56) References Cited

OTHER PUBLICATIONS

Smith, Emma et al. "The global burden of other musculoskeletal disorders: estimates from the Global Burden of Disease 2010 study." Annals of the rheumatic diseases vol. 73,8: 1462-9, (2014).
Smith, GA et al., "Oral or parenteral iron supplementation to reduce deferral, iron deficiency and/or anaemia in blood donors (Review)," Cochrane Database of Systematic Reviews, 2014, Issue 7, pp. 1-120 (124 pages).
Song, "Could sperm quality be affected by a building environment? A literature review," Building and Environment, 2010, vol. 45, pp. 936-943.
Song, Gook-Sup; "Could sperm quality be affected by a building environment? A literature review", Building and Environment 45 (2010) 936-943.
Sorensen, Glorian, et al., "Worksite-based research and initiatives to increase fruit and vegetable consumption," Preventive Medicine, 2004, vol. 39, pp. S94-S100 (7 pages).
Spinellis, "The information furnace: consolidated home control," Personal and Ubiquitous Computing, 2003, vol. 7, pp. 53-69.
Steger, Michael, et al. "Measuring meaningful work: The Work as Meaning Inventory (WAMI)", Journal of Career Assessment—J Career Assessment. 20. 322-337,(2012).
Storch et al., "Extensive and divergent circadian gene expression in liver and heart," Nature, 2002, vol. 417 (8 pages).
Strauss et al., "Influence of Heat and Humidity on the Airway Obstruction Induced by Exercise in Asthma," The Journal of Clinical Investigation, 1978, vol. 61, pp. 433-440.
Strauss, Richard. H., et al.; "Influence of Heat and Humidity on the Airway Obstruction Induced by Exercise in Asthma", The Journal of Clinical Investigation, vol. 61, Feb. 1978, 433-440.
Strøm-Tejsen et al., "The effects of bedroom air quality on sleep and next-day performance," Indoor Air, 2016, vol. 26, pp. 679-686.
Summons to attend oral proceedings issued in EP Application No. 15754628.4 dated Sep. 10, 2018.
Sunde et al., "Blue-Enriched White Light Improves Performance but Not Subjective Alertness and Circadian Adaptation During Three Consecutive Simulated Night Shifts," Frontiers in Psychology, 2020, vol. 11, No. 2172, pp. 1-16.
Suryadevara, N.K. et al., "Sensor data fusion to determine wellness of an elderly in intelligent home monitoring environment", Instrumentation and Measurement Technology Conference, Graz: IEEE, (2012), ISSN 1091-5281, pp. 947-952, XP032451677.
Sutter et al., "The use of shading systems in VDU task offices: A pilot study," Energy and Buildings, 2006, vol. 38, pp. 780-789.
Swaminathan et al., "Are Individual Differences in Sleep and Circadian Timing Amplified by Use of Artificial Light Sources?," Journal of Biological Rhythms, 2017, vol. 32, No. 2, pp. 165-176.
Szigeti et al., "Spatial and temporal variation of particulate matter characteristics within office buildings—The OFFICAIR study," Science of the Total Environment, 2017, vol. 587-588, pp. 59-67.
Tähkämö et al., "Systematic review of light exposure impact on human circadian rhythm," Chronobiology International: The Journal of Biological and Medical Rhythm Research, 2019, vol. 36, No. 2, pp. 151-170.
Tan, Ai May et al., "Efficacy of a workplace osteoporosis prevention intervention: a cluster randomized trial," BMC Public Health, 2016, vol. 16, No. 859 (14 pages).
Tansil, Kristin A. et al., "Alcohol Electronic Screening and Brief Intervention: A Community Guide Systematic Review," American Journal of Preventative Medicine Author Manuscript, 2016 (19 pages).
Taylor et al., "Impact of Booster Breaks and Computer Prompts on Physical Activity and Sedentary Behavior Among Desk-Based Workers: A Cluster-Randomized Controlled Trial," Preventing Chonic Disease Public Health Research, Practice, and Policy, Centers for Disease Control and Prevention, Nov. 2016, vol. 13, E155, pp. 1-15 (16 pages).
Te Kulve et al., "Early evening light mitigates sleep compromising physiological and alerting responses to subsequent late evening light," Scientific Reports, 2019, vol. 9, No. 16064, pp. 1-12.
Tebb et al., "Use of theory in computer-based interventions to reduce alcohol use among adolescents and young adults: a systematic review," BMC Public Health, 2016, vol. 16, No. 517, pp. 1-33.
Techau, David et al. "Buildings, Brains and Behaviour: Towards an affective neuroscience of architecture: The Hedonic Impact of Sustainable Work Environments on Occupant Well-being," World Health Design, 2016, pp. 24-37.
Tennessen et al., "Views to Nature: Effects on Attention," Journal of Environmental Psychology, 1995, vol. 15, pp. 77-85.
Third Examination Report issued in AU Application No. 2016202287 dated Feb. 15, 2021.
Third Office Action issued in MX Application No. MX/a/2016/011107.
Thompson, J. et al., "Effects of daily iron supplementation in 2- to 5-year-old children: systematic review and meta-analysis", Pediatrics. 2013; vol. 131, No. 4, pp. 739-753 (16 pages).
Tong, Van T. et al., "Clinical interventions to reduce secondhand smoke exposure among pregnant women: a systematic review," Tobacco Control, Author Manuscript, 2015 (17 pages).
Tracy, Jessica L., and Richard W. Robins, "Show Your Pride: Evidence for a Discrete Emotion Expression", Psychological Science 15, No. 3: 194-97, (2004).
Trust for America's Health, "A healthier America 2013: strategies to move from sick care to health care in the next four years", Issue Report, Jan. 2013, http://healthyamericans.org/assets/files/TFAH2013HealthierAmericaFnIRv.pdf, Accessed Nov. 30, 2017 (100 pages).
U.S. Green Building Council, "Daylight and views—daylight," 2009, available at https://www.usgbc.org/credits/schools/v2009/ieqc81.
Uğrsal et al., "The effect of temperature, metabolic rate and dynamic localized airflow on thermal comfort," Applied Energy, 2013, vol. 111, pp. 64-73.
Uğursal, Ahmet, et al., "The effect of temperature, metabolic rate and dynamic localized airflow on thermal comfort," Applied Energy, 2013, vol. 111, pp. 64-73 (10 pages).
Ulrich, "View Through a Window May Influence Recovery from Surgery," Science, 1984, vol. 224, pp. 420-421.
Unsworth et al., "An automated version of the operation span task," Behavior Research Methods, 2005, vol. 37, No. 3, pp. 498-505.
US Department of Health and Human Services, 2008 Physical Activity Guidelines for Americans, Oct. 2008, available at https://health.gov/paguidelines/pdf/paguide.pdf (76 pages).
US Department of Justice Civil Rights Division, 2010 ADA Standards for Accessible Design, available at https://www.ada.gov/regs2010/2010ADAStandards/2010ADAStandards.pdf, accessed Oct. 31, 2017 (279 pages).
US Environmental Protection Agency, National Oceanic and Atmospheric Administration, National Park Service, et al., "Extremely high levels of PM2.5: steps to reduce your exposure", AirNow, https://airnow.gov/index.cfm?action=aqibasics.pmhilevels, Accessed Nov. 27, 2017 (4 pages).
Van Den Wymelenberg, "Patterns of occupant interaction with window blinds: A literature review," Energy and Buildings, 2012, vol. 51, pp. 165-176.
Van Der Scheer J.W., et al., "Effects of exercise on fitness and health of adults with spinal cord injury: A systematic review", Neurology, 2017 (34 pages).
Van Eerd, D. et al., "Effectiveness of workplace interventions in the prevention of upper extremity musculoskeletal disorders and symptoms: an update of the evidence," Occupational and Environmental Medicine, 2016, vol. 73, pp. 62-70.
Vandewalle et al., "Daytime Light Exposure Dynamically Enhances Brain Responses," Current Biology, 2006, vol. 16, pp. 1616-1621.
Vastamäki et al., "A behavioural model of temperature controller usage and energy saving," Personal and Ubiquitous Computing, 2005, vol. 9, pp. 250-259.
Veitch et al., "A model of satisfaction with open-plan office conditions: COPE field findings," Journal of Environmental Psychology, 2007, vol. 27, pp. 177-189.
Veitch et al., "Assessing Beliefs about Lighting Effects on Health, Performance, Mood, and Social Behavior," Environment and Behavior, 1996, vol. 28, No. 4, pp. 446-470.

(56) References Cited

OTHER PUBLICATIONS

Veitch et al., "Determinants of Lighting Quality II: Research and Recommendations," presented at the 104th Annual Convention of the American Psychological Association, 1996 (57 pages).
Verlarde et al., "Health effects of viewing landscapes—Landscape types in environmental psychology," Urban Forestry & Urban Greening, 2007, vol. 6, pp. 199-212.
Vining, R F et al. "Salivary cortisol: a better measure of adrenal cortical function than serum cortisol", Annals of clinical biochemistry vol. 20 (Pt 6): 329-35, (1983).
Viola et al., "Blue-enriched white light in the workplace improves self-reported alertness, performance and sleep quality," Scandinavian Journal of Work, Environment & Health, 2008, vol. 34, No. 4, pp. 294-306.
Vitashower Corp., "Products," retrieved from http://www.vitashowercorp.com/products.html, retrieved on May 13, 2014, 8 pages.
Vitashower Corporation, "Ascorbic Acid Reduction of Residual Active Chlorine in Potable Water Prior to Halocarboxylate Determination," from Urbansky et al., Journal of Environmental Monitoring 2(3):253-256, 2000, retrieved from http://www.vitashowercorp.com/research.html, retrieved on May 13, 2014, 2 pages.
Vitashower Corporation, "Frequently Asked Questions," 2003, retrieved from http://www.vitashowercorp.com/FAQs.html, retrieved on May 13, 2014, 3 pages.
Vitashower Corporation, "Vitamin C Shower Filter SF-2000," 2003, retrieved from http://www.vitashowercorp.com/products.html, retrieved on May 13, 2014, 8 pages.
Vitashower Corporation, "Welcome to Vitashower Corporation," 2003, retrieved from http://www.vitashowercorp.com/index.html, retrieved on May 13, 2014, 4 pages.
Wang, Jiandong et al. "Particulate matter pollution over China and the effects of control policies." The Science of the total environment vol. 584-585: 426-447, (2017).
Wargocki et al., "Ten questions concerning thermal and indoor air quality effects on the performance of office work and schoolwork," Building and Environment, 2017, vol. 112, pp. 359-366.
Wargocki et al., "The Effects of Outdoor Air Supply Rate in an Office on Perceived Air Quality, Sick Building Syndrome (SBS) Symptoms and Productivity," Indoor Air, 2000, vol. 10, pp. 222-236.
Watson et al., "Recommended Amount of Sleep for a Healthy Adult: A Joint Consensus Statement of the American Academy of Sleep Medicine and Sleep Research Society," Sleep, 2015, vol. 38, No. 6, pp. 843-844.
Weibel, Laurence et al. "Work-related stress in an emergency medical dispatch center." Annals of emergency medicine vol. 41,4: 500-506, (2003), (7 pages).
Wells et al., "Subjective Responses to the Lighting Installation in a Modern Office Building and their Design Implications," Building Science, 1965, vol. 1, pp. 57-68.
Weschler, "Ozone in Indoor Environments: Concentration and Chemistry," Indoor Air, 2000, vol. 10, pp. 269-288.
Weschler, "Ozone's Impact on Public Health: Contributions from Indoor Exposures to Ozone and Products of Ozone-Initiated Chemistry," Environmental Health Perspectives, 2006, vol. 114, No. 10, pp. 1489-1496.
West et al., "Blue light from light-emitting diodes elicits a dose-dependent suppression of melatonin in humans," Journal of Applied Physiology, 2011, vol. 110, pp. 619-626.
Wikipedia, "Home automation," Jan. 17, 2014, URL: https://en.wikipedia.org/w/index.php?title=Home_automation&oldid=591169195, retreived on Sep. 2, 2020 (11 pages).
Wikipedia, "Thermostat," as archived on Jan. 24, 2014, URL= https://en.wikipedia.org/w/index.php?title=Thermostat&oldid=592239648, download date Jun. 30, 2017, 10 pages.
Williams et al., Next Generation Air Monitor (NGAM) VOC Sensor Evaluation Report, EPA/600/R-15/122, 2015 (71 pages).

Wisthaler et al., "Reactions of ozone with human skin lipids: Sources of carbonyls, dicarbonyls, and hydroxycarbonyls in indoor air," Proceedings of the National Academy of Sciences, 2010, vol. 107, No. 15, pp. 6568-6575.
Wolkoff, "Impact of Air Velocity, Temperature, Humidity, and Air on Long-Term VOC Emissions From Building Products," Atmospheric Environment, 1998, vol. 32, No. 14/15, pp. 2659-2668.
Won et al., "The State-of-the-Art in Sensor Technology for Demand-Controlled Ventilation, Perd S5-42: Final Report," IRC-RR-243, Nrc Publications Archive, 2005 (89 pages).
Wong et al., "A multivariate-logistic model for acceptance of indoor environmental quality (IEQ) in offices," Building and Environment, 2008, vol. 48, pp. 1-6.
Wong et al., "A multivariate-logistic model for acceptance of indoor environmental quality (IEQ) in offices," 2007, Building and Environment, vol. 48, pp. 1-6.
Wong, L. T., et al.; "A multivariate-logistic model for acceptance of indoor environmental quality (IEQ) in offices", Building and Environment 43 (2008) 1-6.
World Health Organization, "Global Nutrition Targets 2025: Low Birth Weight policy Brief," 2014, Geneva (8 pages).
World Health Organization, "Guideline: Daily iron supplementation in adult women and adolescent girls," 2016, Geneva (34 pages).
World Health Organization, "Guideline: Daily iron supplementation in infants and children," 2016, Geneva (54 pages).
World Health Organization, "WHO Recommendations for the Prevention and Management of tobacco use and second-hand smoke exposure in pregnancy," 2013 (104 pages).
World Health Organization, "Nutritional Anaemias: Tools for Effective Prevention and Control", Geneva: World Health Organization; 2017, available online: http://apps.who.int/iris/ bitstream/10665/66914/1/WHO_NHD_01.3.pdf (96 pages).
World Health Organization. (2019). Nutrition Landscape Information System (NLiS) country profile indicators: interpretation guide, 2nd ed. World Health Organization. https://apps.who.int/iris/handle/10665/332223. License: CC BY-NC-SA 3.0 IGO.
Written Opinion of the International Searching Authority, dated Apr. 28, 2016, for International Application No. PCT/US2016/013215, 16 pages.
Written Opinion of the International Searching Authority, dated Dec. 26, 2013, for International Application No. PCT/US2013/057070, 5 pages.
Xiong et al., "Potential indicators for the effect of temperature steps on human health and thermal comfort," Energy and Buildings, 2016, vol. 113, pp. 87-98.
Yadlapalli et al., "Circadian clock neurons constantly monitor environmental temperature to set sleep timing," Nature, 2018, vol. 555 (21 pages).
Yetish et al., "Natural sleep and its seasonal variations in three pre-industrial societies," Current Biology, Author Manuscript, 2015, vol. 25, No. 21 (19 pages).
Yu et al., "People who live in a cold climate: thermal adaptation differences based on availability of heating," Indoor Air, 2013, vol. 23, pp. 303-310.
Zakowski, Sandra G et al. "Written emotional disclosure buffers the effects of social constraints on distress among cancer patients." Health psychology : official journal of the Division of Health Psychology, American Psychological Association vol. 23,6: 555-63, (2004).
Zhai et al., "Human comfort and perceived air quality in warm and humid environments with ceiling fans," Building and Environment, 2015, vol. 90, pp. 178-185 (8 pages).
Zhai, Yongchao et al., "Comfort under personally controlled air movement in warm and humid environments," Building and Environment, 2013 (16 pages).
Zhai, Yongchao, et al., "Using air movement for comfort during moderate exercise," Building and Environment, 2015, vol. 24, pp. 344-352 (9 pages).
Zhang et al., "Study on TVOCs concentration distribution and evaluation of inhaled air quality under a re-circulated ventilation system," Building and Environment, 2007, vol. 42, pp. 1110-1118.

(56) References Cited

OTHER PUBLICATIONS

Zhang et al., "Thermal comfort in naturally ventilated buildings in hot-humid area of China," Building and Environment, 2010, vol. 45, pp. 2562-2570.

Zhang, Hui, "Human Thermal Sensation and Comfort in Transient and Non-Uniform Thermal Environments," Dissertation, 2003, University of California, Berkeley (436 pages).

Zhang, Yu F., et al., "The influence of heated or cooled seats on the acceptable ambient temperature range," Ergonomics, 2007, vol. 50, No. 4, pp. 586-600 (16 pages).

Zhao et al., "Effect of particle spatial distribution on particle deposition in ventilation rooms," Journal of Hazardous Materials, 2009, vol. 170, pp. 449-456.

Zhou et al., "Experimental study of the influence of anticipated control on human thermal sensation and thermal comfort," Indoor Air, 2014, vol. 24, pp. 171-177.

Zhu, Hongmei et al., "Is self-monitoring of blood glucose effective in improving glycaemic control in type 2 diabetes without insulin treatment: a meta-analysis of randomised controlled trials," BMJ Open, 2016, vol. 6, pp. 1-9 (9 pages).

Zhuang et al., "Haze insights and mitigation in China: an overview," Journal of Environmental Sciences, 2014, vol. 26, pp. 2-12 (11 pages).

Zinzi, "Office worker preferences of electrochromic windows: a pilot study," Building and Environment, 2006, vol. 41, pp. 1262-1273.

\* cited by examiner

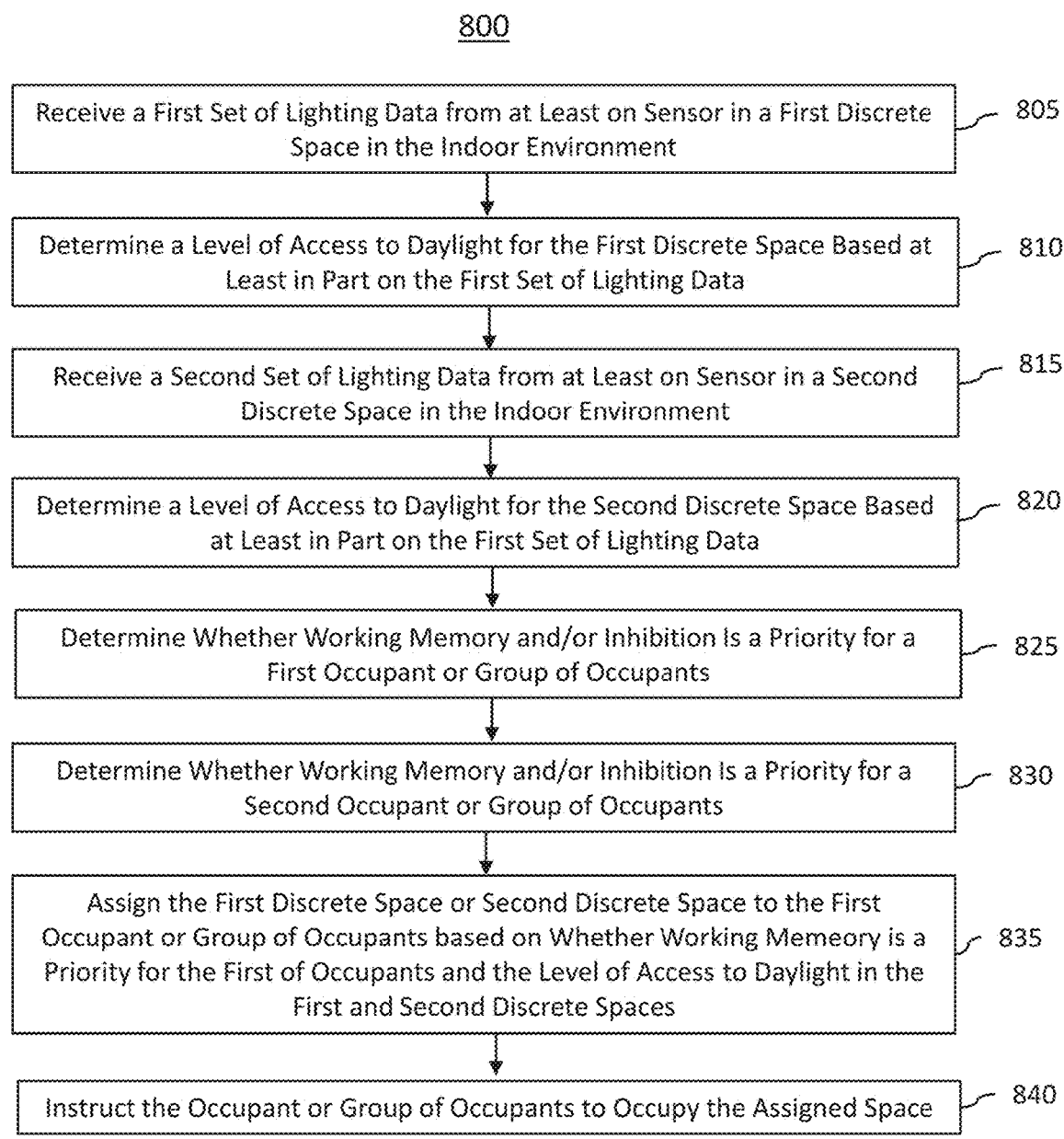

US 11,844,163 B2

METHOD AND APPARATUS FOR LIGHTING IN AN OFFICE ENVIRONMENT

CROSS-REFERENCE TO RELATED APPLICATIONS

This application is a U.S. national phase application filed under 35 U.S.C. § 371 of International Application No. PCT/US2020/019697, filed Feb. 25, 2020, designating the United States, which claims the benefit of U.S. Provisional Application No. 62/810,554, filed Feb. 26, 2019, which are incorporated herein by reference in their entirety.

TECHNICAL FIELD

This invention relates generally to operating an environmental control system in an indoor environment to increase, for example, occupant satisfaction with lighting and/or cognitive function for one or more occupants or groups of occupants.

BACKGROUND

Lighting impacts humans in a number of ways. Improving or adjusting lighting, even in small manners, can have an impact on a person's outcomes and well-being. Most people spend significant amounts of time in indoor environments, such as homes, apartments, condominium units, hotel suites or rooms, motel suites or rooms, spas, hospitals, offices, schools, work spaces, and other public and private facilities. In many instances, it may be necessary for a single indoor environment to support a variety of occupants and activities. Lighting in these indoor environments may enhance or detract from an occupant's satisfaction, performance, and/or sense of well-being. As such, new approaches for improving lighting in indoor environments are desirable.

BRIEF DESCRIPTION OF THE DRAWINGS

Disclosed herein are embodiments of systems, apparatuses and methods pertaining to lighting an indoor environment and/or discrete spaces therein. This description includes drawings, wherein:

FIG. 8 is a flow diagram for a method of operating the environmental control system to assign particular discrete spaces to occupants of the indoor environment.

Figure 1:
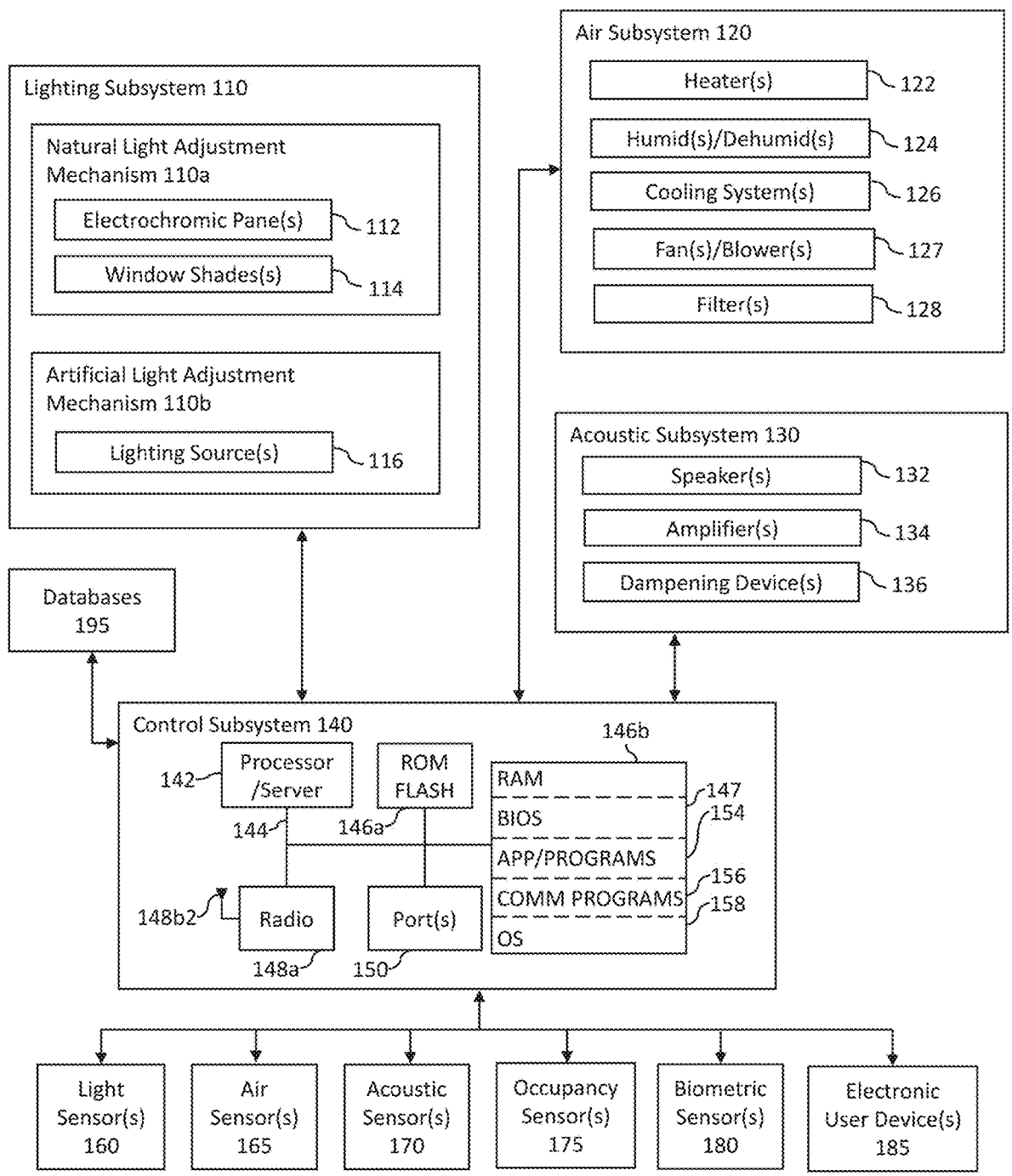
FIG. 1 is a block diagram of an environmental control system for lighting an indoor environment in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The devices, systems, and methods described herein enable a user to operate an environmental control system in order to improve environmental satisfaction and/or cognitive function for one or more occupants or groups of occupants of an indoor environment. Such indoor environments may include, for example, an office building, school, school room, apartment building, dormitory, single family home, multi-family dwelling or building, townhouse, public buildings, such as for example, a theatre, train or bus station, or library, restaurant, hotel, boat, gym, airplane, airport, automobile, train, hospital, and any of the other myriad of places or facilities where one or more people spend time. In addition, within such spaces, there may be one or more sub-spaces or habitable environments that may be used for single or multiple purposes.

Occupants, managers, or owners of such indoor environments may want to control or influence environmental parameters, such as lighting parameters in order to improve, for example, environmental satisfaction or cognitive function, among other outcomes. Lighting is one important aspect of an indoor environment that occupants of the indoor environment may seek to control and/or improve. Lighting may affect occupants of a habitable environment in various ways. For example, a well-designed system for controlling one or more lighting parameters in a space may positively affect an occupant's mood, sense of well-being, visual comfort, creative thinking ability, and productivity (e.g., by aiding in task performance). In particular, natural light may have significant benefits for occupants of an indoor environment. For example, access to natural light may improve satisfaction with lighting for occupants and may also reduce eyestrain. Additionally, access to natural light may improve cognitive function for occupants, for example, by improving an occupant's performance of various executive functions such as working memory, inhibition, and/or task switching. Thus, occupants, managers, and/or owners of such indoor environments may want to control or influence lighting parameters that are indicative of access to natural light in the indoor environment in order to improve or enhance environmental satisfaction (e.g., satisfaction with lighting) and/ or cognitive function (e.g., the performance of the executive functions of working memory, task switching, and/or inhibition). In some embodiments, the devices, systems, and methods described herein may be used to adjust various lighting parameters that are indicative of access to natural light in the indoor environment.

In some embodiments, the devices, systems, and methods described herein may be employed by occupants, managers or owners of indoor environments to improve satisfaction with lighting for one or more occupants of an indoor environment. By some approaches, satisfaction with lighting may to include for example the comfort of an occupant with respect to lighting conditions and/or the visual environment. By some approaches, the devices, systems, and methods described herein may also be employed to reduce eyestrain for one or more occupants of an indoor environment.

In some embodiments, the devices, systems, and methods described herein may be employed to improve cognitive function, more specifically for example, to improve the performance of various executive functions such as working memory, inhibition, and/or task switching for one or more occupants of an indoor environment. By some approaches, cognitive function may encompass various executive functions. Executive functions typically include the higher-level cognitive skills that are used to control and coordinate cognitive abilities and behaviors. Examples of executive functions may include working memory, inhibition, and task switching. Working memory may refer to an occupant's ability to hold information in mind and manipulate it. Tasks and/or activities that require working memory may include, for example, making sense of what is happening over time, understanding written or spoken language, math and reasoning, creating and modifying plans, comparing different solutions, brainstorming, seeing relations between different situations or ideas, and using the past and future to guide decision making. Inhibition may refer to an occupant's ability to control attention, behavior, thinking, and emotions to override habits or impulses. Tasks and/or activities that require inhibition may include, for example, screening out distraction or conflicting information, resisting temptation or unwanted thoughts or memories, not acting impulsively, staying on task, and delaying gratification for bigger payoffs. Task switching may refer to an occupant's ability to flexibly switch between tasks with different demands. Tasks and/or activities that require task switching may include, for example, flexibility in thinking such as changing perspectives (e.g., interpersonal or spatial), changing how we think about something, or changing our actions based on new opportunities, outcomes, or demands from superiors or colleagues. The importance of various executive functions may depend, for example, on the particular task or activity undertaken by an occupant. For example, working memory may be important for tasks or activities that involve brainstorming, while tasks or activities that involve multitasking or regaining focus after interruption (e.g., in emergency room departments) may require task switching.

In some embodiments, the devices, systems, and methods described herein may be employed to improve creative insight for one or more occupants of an indoor environment. By some approaches, creative insight may be construed as the difference between insight that is simply or primarily "actionable" and insight that may result in a creative epiphany intuitive perception, finding, solution or other output, problem solving, etc. Insight may include a mental restructuring that leads to a sudden gain of implicit knowledge allowing qualitatively changed behavior. Creativity may have a variety of definitions and constructs, but often central to its meaning is the ability of one or more people to take existing pieces of information and combine them in novel ways that may lead to greater understanding and that may suggest new behaviors, responses, or other outputs. An activity using creative insight may include, for example, one or more people coming up with fresh or new ideas for changing products, services, and processes so as to better achieve an organization's goals.

FIG. 1 illustrates a block diagram of an exemplary environmental control system 100 for controlling one or more parameters in an indoor environment. In some embodiments, the environmental control system 100 may be a standalone system for monitoring one or more environmental parameters (e.g., lighting, acoustic, or air quality parameters) in an indoor environment. In other approaches, the environmental control system 100 may form a part of, or otherwise incorporate, one or more existing environmental control systems within an indoor environment. In some embodiments, the environmental control system 100 may form part of a home or "smart home" system in an indoor environment.

In some embodiments, the indoor environment 100 described with reference to FIG. 1 may include a plurality of discrete spaces. In some embodiments, the indoor environment may include partitions and/or walls that subdivide the space into a plurality of discrete spaces. The discrete spaces may include, for example, areas bordered with walls, partial walls, and/or partitions or unused spaces therebetween. In some embodiments, the borders of a discrete space may include one or more windows or portions thereof, for example, to provide the discrete space with access to natural light.

In some embodiments, such as the exemplary embodiments in FIGS. 2 and 4, the indoor environment may be, for example, an office space that includes a plurality workspaces. The workspaces in an office space may be, for example, areas within an open office space, private space, and/or common area. Open office spaces may, for example, be office spaces without walls and/or partitions with walls and/or partitions extend only a partial distance from the floor to the ceiling. Private spaces, for example, may include breakout spaces, meeting rooms, media rooms, offices, and/ or conference rooms. Common areas, for example, may include kitchen and/or dining areas, lobbies. In other embodiments, the discrete spaces may be classrooms, meeting rooms, club rooms, activity rooms and/or study spaces in a school. In other embodiments the discrete spaces may be rooms in a hospital and/or clinic.

The environmental control system 100 includes a lighting subsystem 110, a control subsystem 140, one or more sensors 160, 165, 170, 175, 180, one or more user devices 185, and one or more databases 195. In some embodiments, the environmental control system may include additional subsystems. By some approaches, for example, the environmental control system 100 may further include an air subsystem 120 and/or an acoustic subsystem 130.

The environmental control system 100 may include a lighting subsystem 110 that is communicatively coupled, directly or indirectly, to the control subsystem 140. Controlled lighting is an important aspect of controlling the indoor environment to enhance satisfaction with lighting and/or cognitive function for occupants. The lighting subsystem 110 may be activated or employed by the environmental control system 100 to adjust and/or control one or more lighting parameters in the indoor environment in order to enhance, influence, and/or improve satisfaction with lighting and/or cognitive function for one or more occupants. In some embodiments, the lighting control system may include both natural light adjustment mechanisms 110a and artificial light adjustment mechanisms 110b which may be operated individually or in tandem to provide and/or control lighting within the built structure.

The natural light adjustment mechanisms 110a may include a number of components which are controlled to adjust natural lighting (e.g., sunlight) levels within the indoor environment. As used herein, natural light may include the light produced by the sun and diffused by sky and clouds. Natural light in an indoor space may include direct sunlight, or diffused or reflected light from the sky and clouds that are not directly from the sun. Natural light adjustment mechanisms may operate, for example, to control the amount of natural light that enters the indoor environment via one or more windows in the indoor environment. By one approach, the natural light adjustment mechanisms 110a may include one or more electrochromic panes 112 and/or one or more window shades 114 to control the amount of natural light that enters via windows in the indoor environment.

Figure 3:
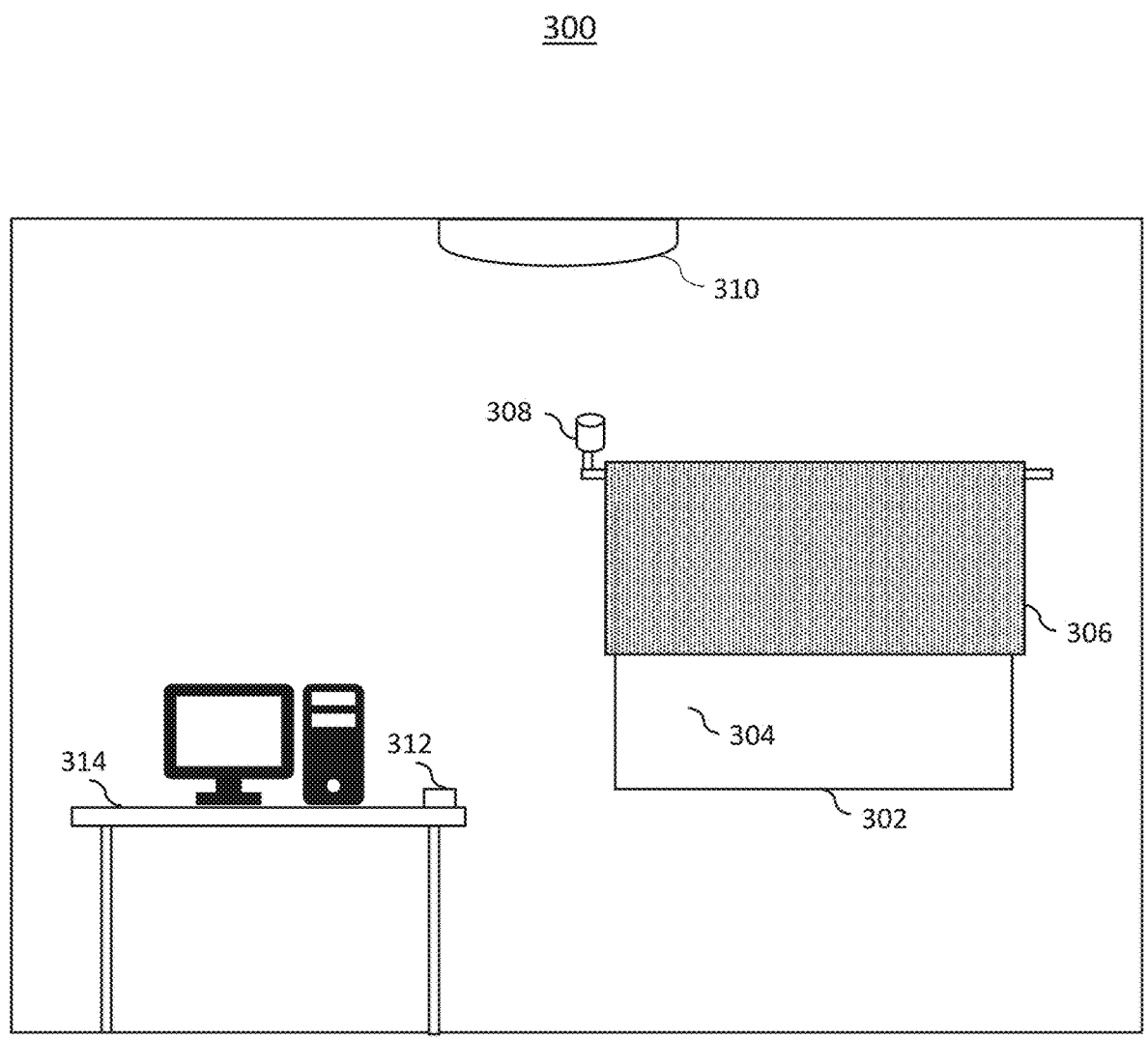
FIG. 3 is a schematic diagram of an exemplary discrete space in an indoor environment in accordance with some embodiments.

The electrochromic panes 112 may include panes or panels that include one or more thin-film coatings of electrochromic materials which are electronically controlled to achieve various levels of window tinting. Thin-film coatings may consist of, for example, metal oxides whose material properties like transmittance, can be changed when voltage is applied. Thus, the electrochromic panes 112, may be capable of dynamically manipulating light transmittance and/or solar heat gain coefficient to reduce glare and improve thermal control. The electrochromic panes 112 may capable of adjusting ranges of wavelengths passed or blocked and the intensity of the lighting passed or blocked. The electrochromic panes 112 may adjust window tinting based on predefined operation schedules or can tint automatically depending on the time of day and outdoor weather conditions. The electrochromic panes 112 may also be adjusted via the control subsystem 140. One or more actuators may be drivingly coupled to the one or more electrochromic panes 112 to control an amount of natural lighting that enters the indoor environment. Actuators may, for example, take the form of an electrical power source coupled to control the transmissivity of one or more electrochromic panes 112 or panels. An exemplary discrete space including a window having an electrochromic pane for controlling and/or adjusting natural lighting is depicted in FIG. 3.

The window shades 114 may include shades, blinds, or other coverings that are adjustable to control the level of natural light entering through a window. Window shades 114 may, for example, include mesh shades, drapes, curtains, blinds, blackout shades, and/or other window coverings. The window shades 114 may be adjustable up and/or may be tilted. The window shades 114 may have several different levels of control such as fully manual (e.g., operated by pulling a cord), motorized (e.g., operated by pushing a button), or automatically controlled (e.g., based on time of day and/or weather conditions). The window shades 114 may also be controlled via the control subsystem 140. The window shades 114 may include one or more actuators and/or motorized rollers that are drivingly coupled to the one or more window shades 114 to control an amount of natural lighting that enters the indoor environment. The actuators may, for example, take the form of an electric motor, solenoid, or other element drivingly coupled to control a position of one or more window coverings. An exemplary discrete space including a window having a window shade for controlling and/or adjusting natural lighting is depicted in FIG. 3.

The artificial light adjustment mechanisms 110b may include a wide variety of artificial lighting sources 116 such as incandescent, florescent, compact florescent, and/or LED lights. Further, the artificial illumination sources may be selectively controlled to produce a wide variety of artificial lighting conditions. For example, by one approach, the artificial illumination sources may include one or more LED lights or arrays of one or more LED lights that are capable of producing one or more ranges of wavelengths. Thus, the wavelength of the artificial emitted light may be adjusted by varying a drive current supplied to LEDs and light intensity may be adjusted by selectively operating more or less LEDs or by controlling the power supplied to one or more LEDs.

In addition to the lighting subsystem 110, the environmental control system may include various other subsystems to control aspects of the indoor environment that may enhance, influence, and/or support activities within the indoor environment. Additional subsystems may include, for example, an air subsystem 120 and an acoustic subsystem 130, among others.

The air subsystem 120 may comprise one or more heaters 122, humidifiers/dehumidifiers 124, cooling systems 126, fans/blowers 127, and/or filters 128. The air subsystem 120 may be activated or employed by the environmental control system 100 to adjust and/or control one or more air parameters in the habitable environment in order to enhance, influence, and/or support tasks or activities taking place within the indoor environment. By some approaches, the air subsystem 120 may control various air parameters in the indoor environment to enhance the satisfaction, performance, and/or sense of well-being of one or more occupants of the indoor environment. For example, relative humidity, the measure of water vapor in the air compared to the total amount that can be held at a given temperature, may contribute to the comfort of occupants and also be adjusted to suppress microbial growth.

The air subsystem 120 may include one or more heaters 122 to heat or provide heated air to the indoor environment. The heaters 122 may take the form of electric heaters that employ a resistive radiant element to heat air or forced air heaters which typically include burners that burn a fuel such as natural gas or propane. The heaters 122 may alternatively take the form of oil furnaces, gas furnaces, or the like. The heaters 122 may heat the air within the indoor environment to support a particular task or activity to be completed by an occupant of the indoor environment. For example, if an activity to be completed by an occupant of the indoor environment is highly physical, the air subsystem 120 may operate in conjunction with the control subsystem 140 to adjust the heaters 122 in order to lower the temperature of the indoor environment.

Similarly, the air subsystem 120 may include one or more cooling systems 126 which may form part of an air conditioner. The cooling systems 126 may be fluidly coupled to control pressure of a fluid, coupled with one or more coils or other heat exchangers, and may operate in a similar fashion to standard air condition units to remove heat from the air. In some embodiments, the cooling systems 126 may include chilled water supplied from a chilled water source.

The air subsystem 120 may also include one or more humidifiers and/or dehumidifiers 124 to control the humidity of at least a portion of the indoor environment. The humidifiers and/or dehumidifiers 124 may include a reservoir that retains water to either be added to the air in a humidification mode or removed from the air in a dehumidification mode. The humidifier and/or dehumidifier 124 may also include a compressor or other cooling system used, for example, to cool air as part of removing moisture from the air and may also optionally include a heating element to heat air as part of adding moisture to the air. The humidifiers/dehumidifiers 124 may increase the moisture or decrease the moisture in the air depending on a particular task or activity to be completed by an occupant of the indoor environment. For example, to enhance the comfort and performance of an occupant of the indoor environment, the air subsystem 120 may operate in conjunction with the control subsystem 140 to adjust the humidifiers/dehumidifiers 124 in order to decrease humidity in the indoor environment if a highly physical activity is scheduled to occur within the particular space.

In addition, the air subsystem 120 may further include one or more fans and/or blowers 127 coupled to one or more ducts and/or vents to facilitate air circulation and/or fresh air exchange in the indoor environment. The fans and/or blowers 127 may circulate air within the air subsystem 120 and/or within the indoor environment or spaces therein. Furthermore, the fans and/or blowers 127 may expel air from the indoor environment to an outdoor area and/or may draw fresh air into the indoor environment from an outdoor area. In order to further control air quality in the indoor environment to support human activity, one or more filters 128 may also be incorporated into the air subsystem 120. The filters 128 may control particulate matter, pollution, and/or other contaminants in the air of the indoor environment. The filters 128 may take various forms such as, for example, electrostatic filters, mechanical filters, and/or precipitators. Additionally, in some embodiments, the discrete space 300 may also include one or more occupancy sensors to detect or sense whether the discrete space is occupied.

By some approaches, the air subsystem may further include one or more occupancy sensors may to provide signals indicative of whether the built structure is occupied. In response, the air sensors may begin measuring. For example, it may be preferred to only collect data from the light sensors when the discrete space is occupied. By some approaches, occupancy sensors may also provide an indication of the level of occupancy, which in turn, may be used to make adjustments to air parameters of the indoor environment and/or assign occupants to particular discrete spaces. For example, an increase in the level of occupancy in a given space may impact air quality and, in response, components of the air subsystem 122, 124, 126, 127, 128 may be activated to adjust air quality.

The indoor environment may also include an acoustic subsystem 130. The acoustic subsystem may include or otherwise be associated with a sound dampening system or a sound producing system which may be operated alone or in tandem to remediate or otherwise control sound or noise in the indoor environment. The acoustic subsystem 130 may comprise one or more speakers 132, amplifiers 134, and/or dampening devices 136. The speakers 132 may be positioned throughout the indoor environment or a portion thereof and may provide sounds such as "white" noise, "pink" noise, music, or other ambient sounds. The acoustic subsystem 130 may, in conjunction with the control subsystem 120, may control sounds to support activities or tasks completed by occupants of the indoor environment. Sounds may, for example, be selected to promote relaxation or focus. The amplifiers 134 may be electrically, optically, or wirelessly coupled to provide signals to the speakers 132, causing the speakers 132 to reproduce sounds represented by the signals. In some embodiments, other suitable sound producing components may be employed to produce various sounds, music, etc. in the indoor environment. The dampening devices 136 may be any suitable dampening component that may be employed or activated by the acoustic subsystem 130 to dampen or otherwise reduce or remediate sound, noise, or other acoustic parameters in the indoor environment. The acoustic subsystem 130 may be activated or employed by the environmental control system 100 to adjust and/or control one or more acoustic parameters in the habitable environment in order to enhance, influence, and/or support tasks or activities taking place within the indoor environment.

By some approaches, the acoustic subsystem may further include one or more occupancy sensors may to provide signals indicative of whether the built structure is occupied. In response, the air sensors may begin measuring. For example, it may be preferred to only collect data from the acoustic sensors when the discrete space is occupied. By some approaches, occupancy sensors may also provide an indication of the level of occupancy, which in turn, may be used to make adjustments to acoustic parameters of the indoor environment and/or assign occupants to particular discrete spaces. For example, an increase in the level of occupancy in a given space may impact acoustics and, in response, components of the acoustic subsystem 132, 134, 136 may be activated to adjust acoustic parameters.

The environmental control system 100 may further include various system inputs such as sensors 160, 165, 170, 175, 180 that are communicatively coupled, either directly or indirectly, to the control subsystem 140. As is depicted in FIG. 1, the environmental control system, for example, may include one or more light sensors 160, air sensors 165, acoustic sensors 170, occupancy sensors 175, and/or biometric sensors 180. By some approaches, there may be one or more types of sensors. The sensors 160, 165, 170, 175, 180 may be individual sensors or sensor arrays comprising one or more sensors configured to measure at least one parameter in the indoor environment.

In some embodiments, the light sensors 160 may be configured to measure one or more of illuminance, correlated color temperature, luminous intensity, luminous flux, beam angle, color, or luminance.

In some embodiments, the sensors 160, 165, 170, 175 may be positioned throughout the indoor environment at any suitable location. By some approaches, at least one sensor may be positioned in each discrete space of the indoor environment. In other approaches, one sensor may cover more than one discrete space. In other approaches, the sensors 160, 165, 170, 175 may be positioned in locations where occupants of the indoor environment frequently occupy. In some approaches, the sensors 160, 165, 170, 175 may be positioned at a location where occupant activity frequently occurs. For example, in one illustrative embodiment the sensors may be placed on a desk or table within the indoor environment as is depicted in FIGS. 2 and 3.

In some embodiments, one or more biometric sensors 180 may be associated with an occupant of the indoor environment. Biometric sensors 180 may, for example, be configured to collect occupant-based biometrics. Relevant occupant-based biometrics may include, for example, heart rate, hear rate variability, weight, sleep phase, sleep rate, body-mass index, body weight, number of steps, respiration rate, etc. By some approaches, the biometric sensors 180 may be worn by an occupant. In other approaches, the biometric sensors 180 may be installed in furniture or in other devices within the indoor environment.

By some approaches, the sensors 160, 165, 170, 175, 180 may be configured to measure one or more parameters at defined frequency recording intervals, for example, but not limited to, every set number of milliseconds, seconds, minutes, hours, etc. In some approaches the frequency recording interval may be based on the lighting parameter(s) being measured. In some approaches, the frequency recording interval is about one second. In some approaches the acoustic sensor detection interval may be 0.5 minute, one minute, two minutes, three minutes, four minutes, five minutes, ten minutes or other time interval. Alternatively to a defined frequency, in some approaches an acoustic sensor may measure one or more light parameters only upon the occurrence of an event (e.g., the detection of an occupant in the discrete space, the detection of movement of an occupant within the discrete space, a minimum change in light level, or other environmental factor for a space or zone, etc.). Data collected by the sensors may be used to operate the environmental control system 100. For example, data collected by the sensors may be used to operate the environmental control system 100 in accordance with the methods described in FIGS. 6-8.

In addition, the environmental control system 100 may include various user devices 185 that are communicatively coupled to the control subsystem 140. The user devices 185 may include, for example, one or more devices through which an occupant, manager, or owner of the indoor environment may transmit data to the environmental control system 100. The electronic user devices 185 may be one or more of a smartphone, a telephone, a radio, a tablet, a laptop, a mobile phone, a personal digital assistant, a smartwatch, other wearable computer or smart devices, a personal computer device, or other mobile data network connected devices or portable electronic devices. The user devices 185 may include a graphical user interface (GUI) through which an occupant other user may enter data into the environmental control system 100 and may also receive data transmitted by the environmental control system. By some approaches, the electronic user devices may include one or more sensors 160, 165, 170, 175, 180.

In operation, information may be transmitted to an electronic user device 185 associated with an occupant of the indoor environment in the form of a text message, an email message, an SMS message, an MMS message, an electronic message, an electronic document, and/or a telephone call. For example, a survey or questionnaire may be sent to an occupant via an electronic user device 185. Further, an occupant may use the GUI of an electronic user device 185 to transmit information or data to the environmental control system 100. For example, the occupant may enter survey response or answers to a questionnaire via the GUI of an electronic device 185.

In addition, the environmental control system 100 may also include or have access to one or more local or remote databases 195 that are in communication with the control subsystem 140 and the sensors 160, 165, 170, 175, 180. The database 195 may be stored, for example, on a server. The databases 195 may include an environment database that stores data collected by the sensors 160, 165, 170, 175, 180 and the electronic user devices 185. An exemplary database structure is depicted in FIG. 4.

Further, the environmental control system 100 may include a control subsystem 140. The control subsystem 140 may take the form of a programmed computer or other processor-based system or device. For example, the control subsystem 140 may take the form of or incorporate a conventional mainframe computer, mini-computer, workstation computer, personal computer (e.g., desktop or laptop), or handheld computer.

The control subsystem 140 may include one or more processing units 142 (one illustrated), non-transitory system memories 146a-146b (collectively 146) and a system bus 144 that couples various system components including the system memory 146 to the processing unit(s) 142. The processing unit(s) 142 may be any logic processing unit, such as one or more central processing units (CPUs), digital signal processors (DSPs), application-specific integrated circuits (ASICs), field programmable gate arrays (FPGAs), programmable logic controllers (PLCs), etc. The system bus 144 can employ any known bus structures or architectures, including a memory bus with memory controller, a peripheral bus, and a local bus. The system memory 146 includes non-transitory Flash or read-only memory ("ROM") 146a and non-transitory random-access memory ("RAM") 146b. A basic input/output system ("BIOS") 147, which can form part of the ROM 146a or RAM 146b, contains basic routines that help transfer information between elements within the control subsystem 140, such as during start-up. The control subsystem 140 may further include a hard disk drive for reading from and writing to a hard disk, an optical disk drive for reading from and writing to removable optical disks, and/or a magnetic disk drive for reading from and writing to magnetic disks. The hard disk drive, optical disk drive, and magnetic disk drive may communicate with the processing unit 142 via the system bus 144.

The system memory may, for example, store instructions and data for controlling the environmental control system 100, as well as other for components of a home wellness and/or home automation system, for example, based on specific aspects or characteristics detected in one or more discrete spaces within the indoor environment, inputs by an occupant of the indoor environment, events expected or occurring in the indoor environment, or lighting parameters in one more discrete spaces therein to promote occupant environmental satisfaction and/or cognitive function.

Program engines can be stored in the system memory 146b, such as an operating system 158, one or more application programs 154, other programs or engines and program data. Application programs 154 may include instructions that cause the processor(s) 142 to automatically generate signals to control various of the other subsystems to achieve various environmental characteristics or scenes in the habitable environment, for example based on one or more aspects, characteristics or attributes of an occupant thereof. Application programs 154 may include instructions that cause the processor(s) 142 to automatically receive input and/or display output via various user operable input/output (I/O) devices such as, for example, panels installed in the habitable environment, handheld mobile devices, kiosks, and the like.

Other program engines (not specifically shown) may include instructions for handling security such as password or other access protection and communications encryption. The system memory 142 may also include communications programs 156, for example, a server for permitting the control subsystem 140 to provide services and exchange data with the environmental control system 100 and, optionally, other subsystems or computer systems or devices via the Internet, corporate intranets, extranets, or other networks (e.g., LANs, WANs), as well as other server applications on server computing systems such as those discussed further herein. The server in the depicted embodiment may be markup language based, such as Hypertext Markup Language (HTML), Extensible Markup Language (XML) or Wireless Markup Language (WML), and operates with markup languages that use syntactically delimited characters added to the data of a document to represent the structure of the document.

While shown in FIG. 1 as being stored in the system memory 146b, the operating system 158, application programs 154, other programs/engines, program data and communications applications (e.g., server, browser) 156 can be stored on hard disk, the optical disk and/or the magnetic disk.

An operator can enter commands and information (e.g., configuration information, data or specifications) via various user operable input/output (I/O) devices, such as, for example, panels installed in the habitable environment, handheld mobile devices, kiosks, and the like, or through other input devices such as a dedicated touch screen or keyboard and/or a pointing device such as a mouse and/or via a graphical user interface. Other input devices can include a microphone, joystick, game pad, tablet, scanner, touch pad, etc. These and other input devices may be connected to one or more of the processing units 142 through an interface such as a serial port interface 150 that couples to the system bus 144, although other interfaces such as a parallel port, a game port or a wireless interface or a universal serial bus ("USB") can be used. A monitor or other display device may be coupled to the system bus 144 via a video interface, such as a video adapter (not shown). The control subsystem 140 also may include other output devices, such as speakers, printers, visual displays or screens, fans, etc. Alternatively, or in addition, these and other input devices may be connected directly to the lighting subsystem 110, air subsystem 120, and/or acoustic subsystem 130 allowing a user to directly communicate with and/or control the various subsystems.

The control subsystem 140 can operate in a networked environment using logical connections to one or more remote computers and/or devices as described above with reference to FIG. 1. For example, the control subsystem 140 can operate in a networked environment using logical connections to one or more other subsystems, one or more server computer systems, associated non-transitory data storage device, or electronic user devices. The server computer system and associated non-transitory data storage device may, for example, be controlled and operated by a facility (e.g., hotel, spa, apartment building, condominium building, hospital, school, shared office) in which the habitable environment is located. Communications may be via wired and/or wireless network architectures, for instance, wired and wireless enterprise-wide computer networks, intranets, extranets, and the Internet. Thus, the control subsystem 140 may include wireless communications components, for example one or more transceivers or radios 148a and associated antenna(s) 148b for wireless (e.g., radio or microwave frequency communications, collected referred to herein as RF communications). Other embodiments may include other types of communication networks including telecommunications networks, cellular networks, paging networks, and other mobile networks.

In operation, in some embodiments, the environmental control system 100 may adjust one or more environmental parameters of the indoor environment to improve environmental satisfaction (e.g., satisfaction with lighting) of one or more occupants of an indoor environment. In some embodiments, the environmental control system 100 may also adjust environmental parameters of the indoor environment to improve the cognitive function (e.g., performance of the executive functions of working memory, inhibition, and/or task switching) of one or more occupants. In some embodiments, environmental control system 100 may also adjust one or more environmental parameters of the indoor environment to reduce the eyestrain of one or more occupants.

Figure 6:
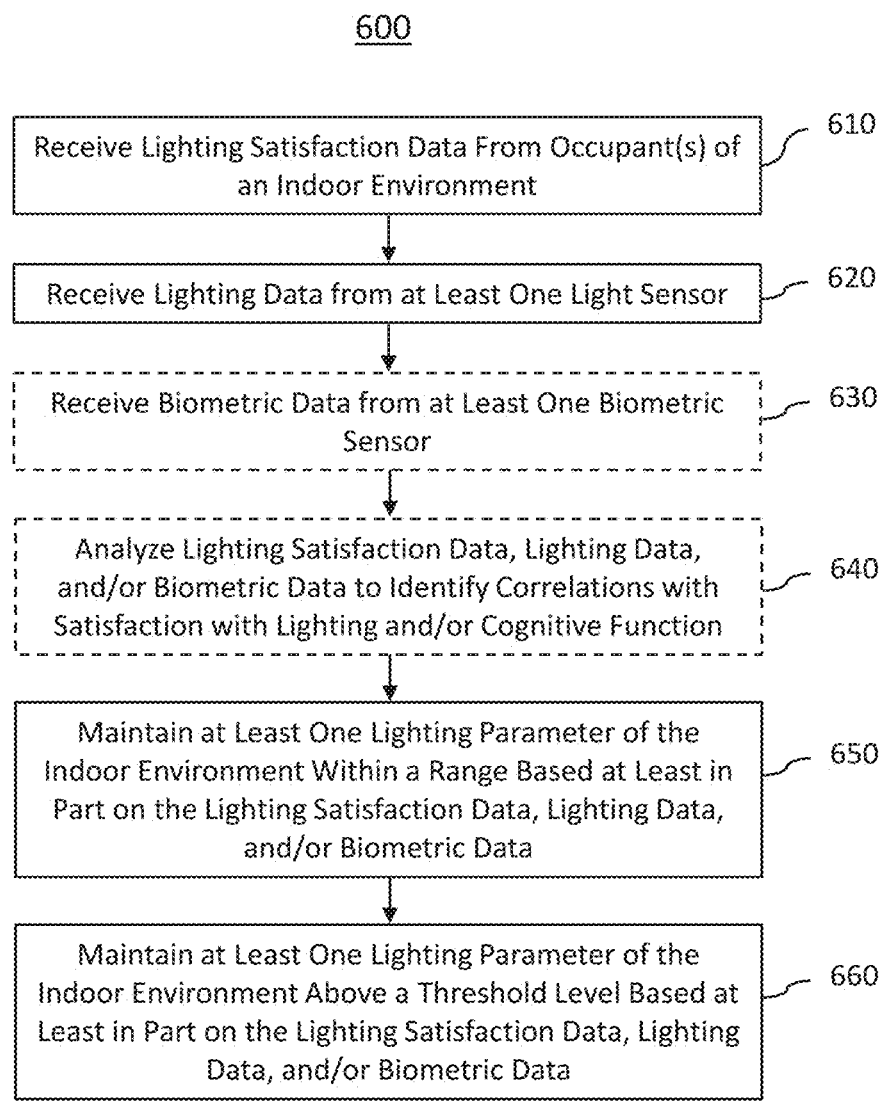
FIG. 6 is a flow diagram for a method of operating the environmental control system to improve satisfaction with lighting and/or cognitive function in accordance with some embodiments.

In one illustrative embodiment, the environmental control system 100 may adjust one or more lighting parameters or conditions in an indoor environmental that are indicative of access to natural light or are otherwise related to light, such as correlated color temperature of light and illuminance of light, in order to improve satisfaction with lighting and/or cognitive function for one or more occupants of the indoor environment. FIG. 6 details an exemplary method of operating the environmental control system to improve satisfaction with lighting and/or cognitive function for one or more occupants of the indoor environment.

Figure 7:
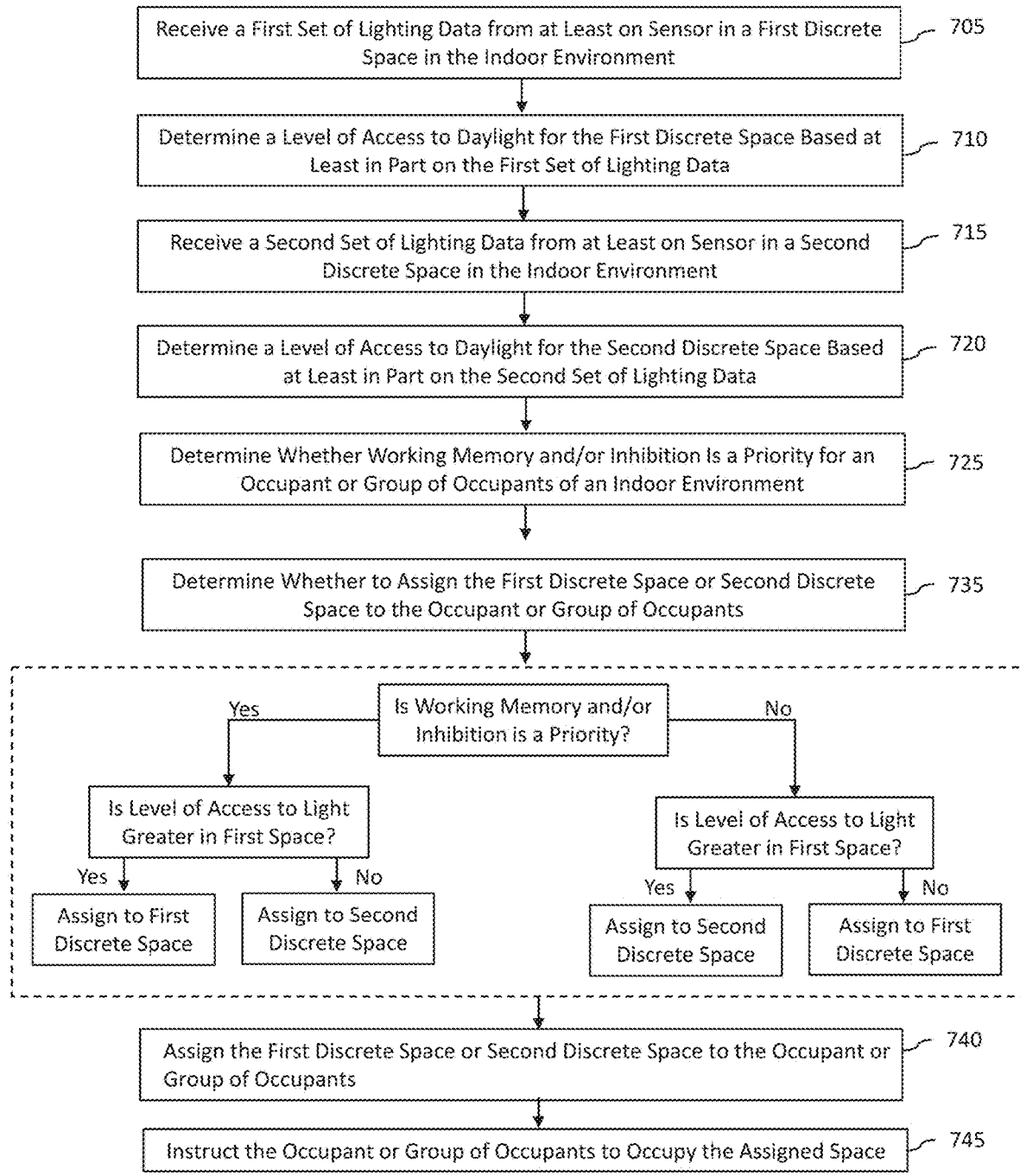
FIG. 7 is a flow diagram for a method of operating the environmental control system to assign a particular discrete space to an occupant or group of occupants of the indoor environment in accordance with some embodiments.

Further, in operation, the environmental control system 100 may assign or direct one or more occupants of the indoor environment to one or more discrete spaces in the indoor environment in order to improve satisfaction with lighting and/or cognitive function for the occupant(s). For example, the system 100 may direct to one or more occupants to be seated or otherwise positioned within a sub-space particularly well suited for the occupant or the activity that is associated with the occupant. FIGS. 7 and 8 detail exemplary methods of operating the environmental control system to assign one or more occupants of the indoor environment to one or more discrete spaces in the indoor environment. The control system 140 may send notifications, messages or other signals to the occupants, the occupants' devices, a display screen in the indoor environment, an audible message system, etc. to direct the occupant(s) to one or more specific spaces or otherwise make them aware of the identified spaces.

Figure 2A:
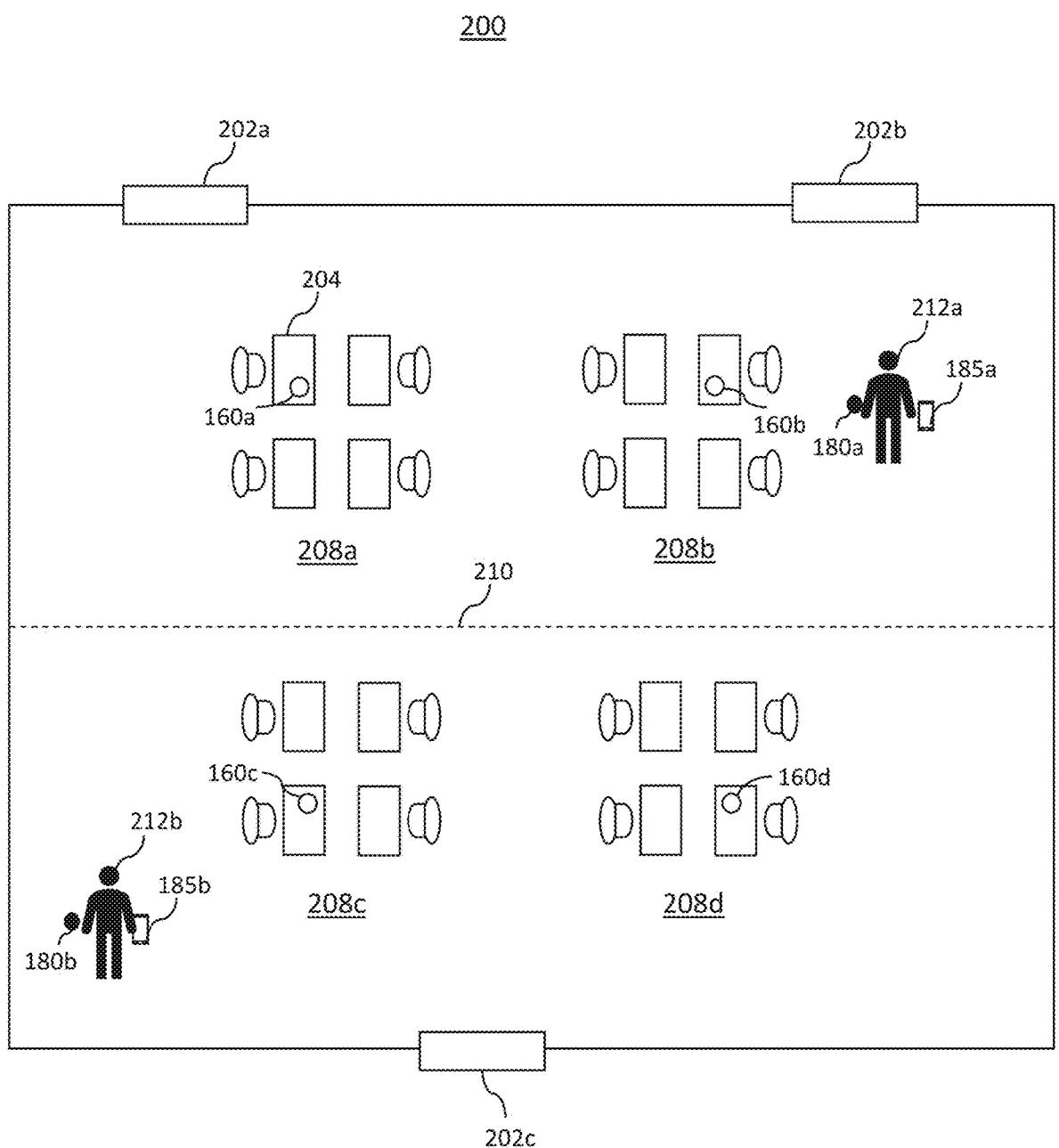
FIG. 2A is a schematic diagram of a plurality of discrete spaces in an exemplary indoor environment at a first period of time in accordance with some embodiments.
Figure 2B:
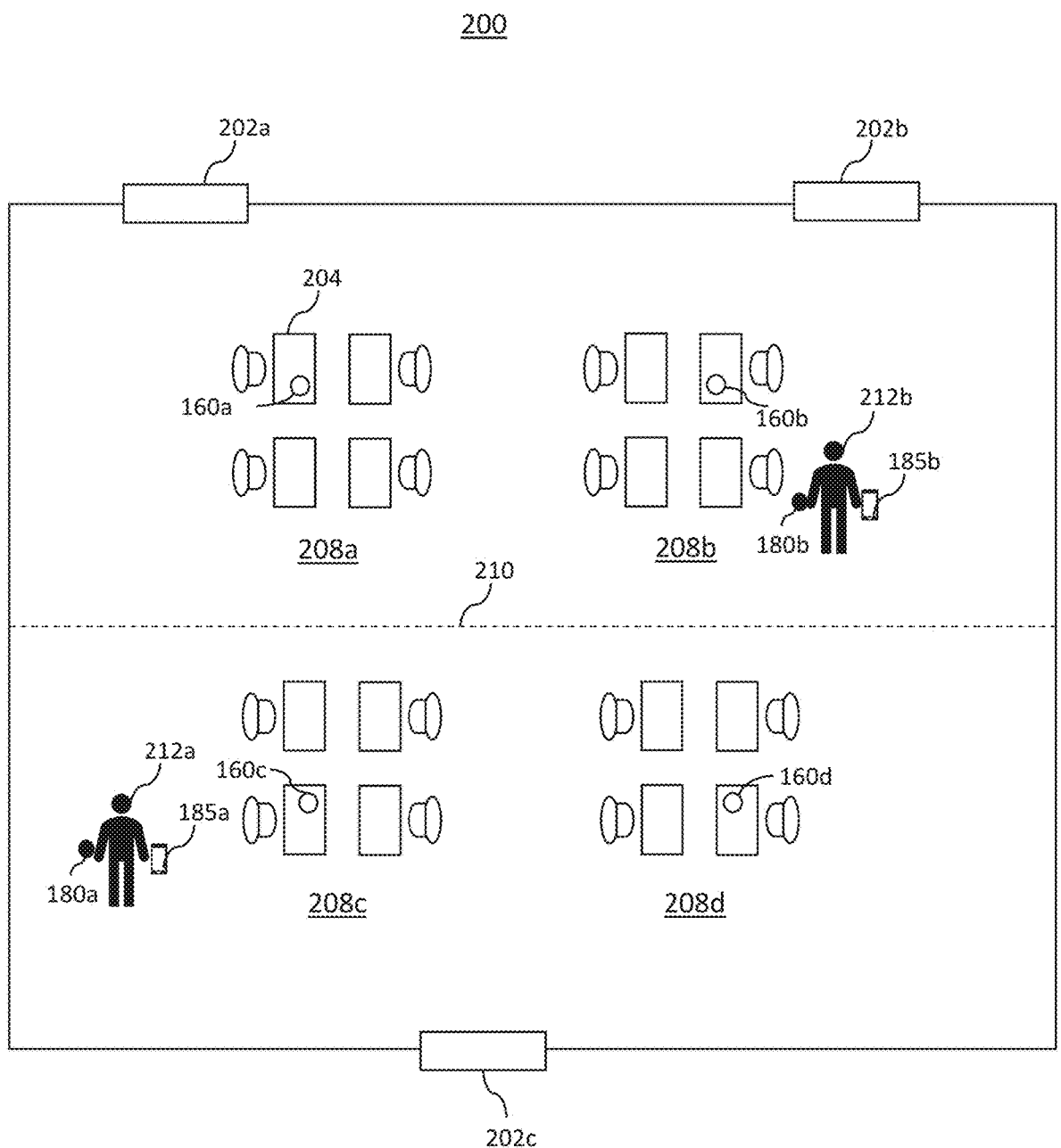
FIG. 2B is a schematic diagram of a plurality of discrete spaces in an exemplary indoor environment at a second period of time in accordance with some embodiments.

FIGS. 2A and 2B illustrate an exemplary indoor environment that includes a plurality of discrete spaces. In some embodiments, such discrete spaces may include one or more meeting rooms, conference rooms, media rooms, workstations, offices, work tables, dining areas, privacy rooms, changing rooms, or other types of spaces. In FIGS. 2A and 2B, the exemplary indoor environment is an office space 200 and the discrete spaces are workspaces 208a, 208b, 208c, 208d. Each workspace 208a, 208b, 208c, 208d includes one or more light sensors 160a, 160b, 160c, 160d capable of detecting at least one lighting parameter associated with the workspace. The exemplary office space 200 further includes windows 202a, 202b, 202c and, optionally, a wall or partition 210. In one embodiment, the environmental control system 100 may assign a first occupant 212a and a second occupant 212b to one of workspaces 208a, 208b, 208c, 208d via the method described in FIG. 7 or 8. In some embodiments, a light sensor may be associated with each workspace, or a single light sensor may be used with multiple workspaces. In some embodiments, a light sensor may be placed on the workstation or table, mounted on a ceiling, wall, partition or column, or in another location. In some embodiments, it may be particularly helpful to have the light sensor located such that it simulates an occupant's likely eye height or position, such as being positioned on a display screen the occupant may be using, on top of a desk, table or work station that the user might be using, or suspending from a ceiling.

A first electronic user device 185a is associated with the first occupant 212a. Additionally, at least one biometric sensor 180a may optionally be associated with the first occupant. A second electronic user device 185b is associated with the second occupant 185b. Additionally, at least one biometric sensor 180b may optionally be associated with the second occupant. By some approaches, the biometric sensors 180a, 180b may be part of the electronic user devices 185a, 185b.

In operation, the environmental control system 100 described with reference to FIG. 1 may transmit an electronic survey to occupants 212a, 212b via the electronic user devices 185a, 185b. The electronic survey, for example, may include questions regarding a priority level for working memory at a first period of time. In another example, the electronic surveys may receive information about scheduled activities and/or may be provide access to occupant calendars. In response to receiving the electronic survey, the occupants 212a, 212b may input responses to the electronic survey via the electronic user devices 185a, 185. Responses to the electronic survey may then be transmitted to an environmental control system, such as the environmental control system 100 described with reference to FIG. 1. In addition, the light sensors 160a, 160b, 160c, 160d and biometric sensors 180a, 180b may transmit data to the environmental control system.

The environmental control system may then analyze the data transmitted from one or more of the electronic user devices 185a, 185b, one or more of the light sensors 160a, 160b, 160c, 160d and one or more of the biometric sensors 180a, 180b to determine potential workspaces for the occupants 212a, 212b and further to assign the occupants 212a, 212b to a particular workspace 208a, 208b, 208c, 208d. In order to assign the occupants 212a, 212b to a workspace, the environmental control system may employ the methods described with reference to FIG. 7 or FIG. 8. For example, if responses to the electronic surveys indicated that working memory is a greater priority for occupant 212a than for occupant 212b at or during the first period of time and if one or more of the light sensors 160a, 160b, 160c, 160d indicated that workspaces 208a, 208b have a greater level to access to natural light than 208c, 208d, the system may assign occupant 212a to workspace 202a or 202b for the first period of time. Thus, as illustrated in the example in FIG. 2A, the first occupant 212a is assigned to workspace 208b and the second occupant is assigned to occupant 208c at the first period of time. In some embodiments, the first occupant 212a may receive a notification via the first electronic user device 185a, the notification including instructions to occupy workspace 208b at the first period of time or indicating that first occupant 212a should consider the workspace 208b to be a suitable and potential prioritized location. Similarly, the second occupant 212b may receive a notification via the second electronic user device 185b, the notification including instructions to occupy workspace 208c or indicating that second occupant 212b should consider the workspace 208c to be a suitable and potential prioritized location.

FIG. 2B illustrates occupants in the exemplary office space 200 at a second period of time. In FIG. 2B, the first occupant 212a is assigned to workspace 208c and the second occupant 212b is assigned 208b at the second period of time. Similar to the example in FIG. 2A, in order to assign the occupants 212a, 212b, the environmental control system may employ the methods described with reference to FIG. 7 or FIG. 8. In the example of FIG. 2B, the responses to the electronic surveys may have indicated that working memory is a greater priority for occupant 212b than for occupant 212a at the second period of time and light sensors 160a, 160b, 160c, 160d may have indicated that workspaces 208a, 208b had a greater level to access to natural light then 208c, 208d. As a result, the system assigns occupant 212a to workspace 202c or 202d.

In some embodiments, the first period of time and/or the second period of time described with reference to FIG. 2A and FIG. 2B may be a number of years, months, weeks, days, hours, minutes, or portions thereof. By some approaches, for example, the first period of time may be a block of time on a calendar or electronic schedule that is associated with an occupant. In one example, the environmental control system 100 may assign an occupant to a first workspace from 9 AM to noon and to a second workspace from noon to 5 PM. By other approaches, the environmental control system 100 may assign an occupant to a first workspace for a first full work day, such as from 8 AM to 5 PM, and to a second workspace for a second full work day.

FIG. 3 illustrates a schematic diagram of an exemplary discrete space 300 in an indoor environment. The discrete space 300 includes a window 302 and an electric light 310. The window 302 includes an electrochromic pane 304 that is communicatively coupled to the environmental control system 100. The opaqueness and transparency of the electrochromic pane 304 may be varied to control the amount of light that passes through the window 302. The window 302 also includes a window shade 306 that may optionally be coupled to an actuator 308 that is communicatively coupled to the environmental control system 100. The discrete space 300 may further include a table or desk 314. One or more light sensors 312 that are communicatively coupled to the environmental control system 100 may be positioned on or near the table or desk 314, or on a computer, screen or other device located on or near the table or desk 314.

In operation, the light sensors 312 may measure one or more lighting parameters in the discrete space. In some embodiments, the light sensors 312 may include one or more light sensors configured to measure illuminance and/or correlated color temperature of light in the discrete space. The light sensors may include, for example, an illuminance sensor (e.g., a Wovyn LLC Lux1000 sensor) or a correlated color temperature sensor (e.g., a Wovyn LLC ColorLux 1000). By some approaches, the light sensors 312 may be configured to measure the temporal variability or level of one or more lighting parameters. Data collected by the sensors 312, or a portion thereof may be stored in a local or remote environment database that is in communication with the environmental control system 100. In some embodiments, the environmental control system 100 may be configured to adjust the level of access to natural light in the discrete space 300. In some embodiments, the environmental control system 100 may be configured to adjust the level of access to natural light in the discrete space via at least one of the electrochromic pane 304 or the actuator 308 coupled to the window shade 306.

In some embodiments, the environmental control system 100 may be configured to adjust the level of access to natural light in the discrete space in order to improve the satisfaction with lighting and/or cognitive function of one or more occupants of the discrete space 300. For example, the environmental control system 100 may be configured to improve to improve the satisfaction with lighting or cognitive function of one or more occupants of the discrete space 300 via the method described with reference to FIG. 6.

In some embodiments, the discrete space 300 may also include one or more acoustic sensors or air sensors that are in communication with the environmental control system 100. For example, in addition to light sensors 312, the discrete space may also include one or more temperature sensors configured to measure temperature in the discrete space or one or more humidity sensors configured to measure relative humidity in the discrete space. Accordingly, in some embodiments, the environmental control system 100 may be further configured to adjust the acoustic or air parameters in order to improve environmental satisfaction for more occupants of the discrete space 300.

Additionally, in some embodiments, the discrete space 300 may also include one or more occupancy or motion sensors to detect or sense whether the discrete space is occupied by one or more people. An occupancy or motion sensor may be located on the ceiling, wall, table top, column or elsewhere in the space 300. The occupancy sensors may be communicatively coupled to the environmental control system 100 or other devices or databases to provide one or more signals indicative of whether the built structure is occupied. response, the light sensors 312 and/or other sensors may begin measuring. For example, it may be preferred to only collect data from the light sensors when the discrete space 300, or a portion of it, is occupied. By some approaches, occupancy or motion sensors may also provide an indication of the level of occupancy, which in turn, may be used to make adjustments to lighting parameters of the indoor environment and/or assign occupants to particular discrete spaces. For example, an increase in the level of occupancy in a given space may result in occupants blocking or impeding entry of natural light into a given space. Thus, in response to one or more occupancy sensors indicating an increase in the level of occupancy, natural light adjustment mechanisms may be activated to permit more light to enter the space.

By some approaches, the one or more light sensors 312 may be facing upwards from the surface on which the sensor(s) is placed. For example, in some approaches, the light sensors 312 may be positioned on a desk, table, or other horizontal surface in the discrete space. In some embodiments, the horizontal surface may have an adjustable height, for example, a desk that can raise and lower to enable the person to stand or sit while using the desk. In other approaches, the light sensor(s) 312 may be positioned on a window, wall, partition or other vertical surface in the discrete space. In some approaches, the position of the light sensor(s) 312 may be based on the lighting parameter(s) being measured. For example, if the light sensor(s) 312 is configured to measure horizontal illuminance, the light sensor(s) 312 may be placed on a desk, table, or other horizontal surface in the discrete space 300. Alternatively, if the light sensor(s) 312 is configured to measure vertical illuminance, the light sensor(s) 312 may be placed on a wall, partition, window, or other vertical surface in the discrete space 300.

Figure 4A:
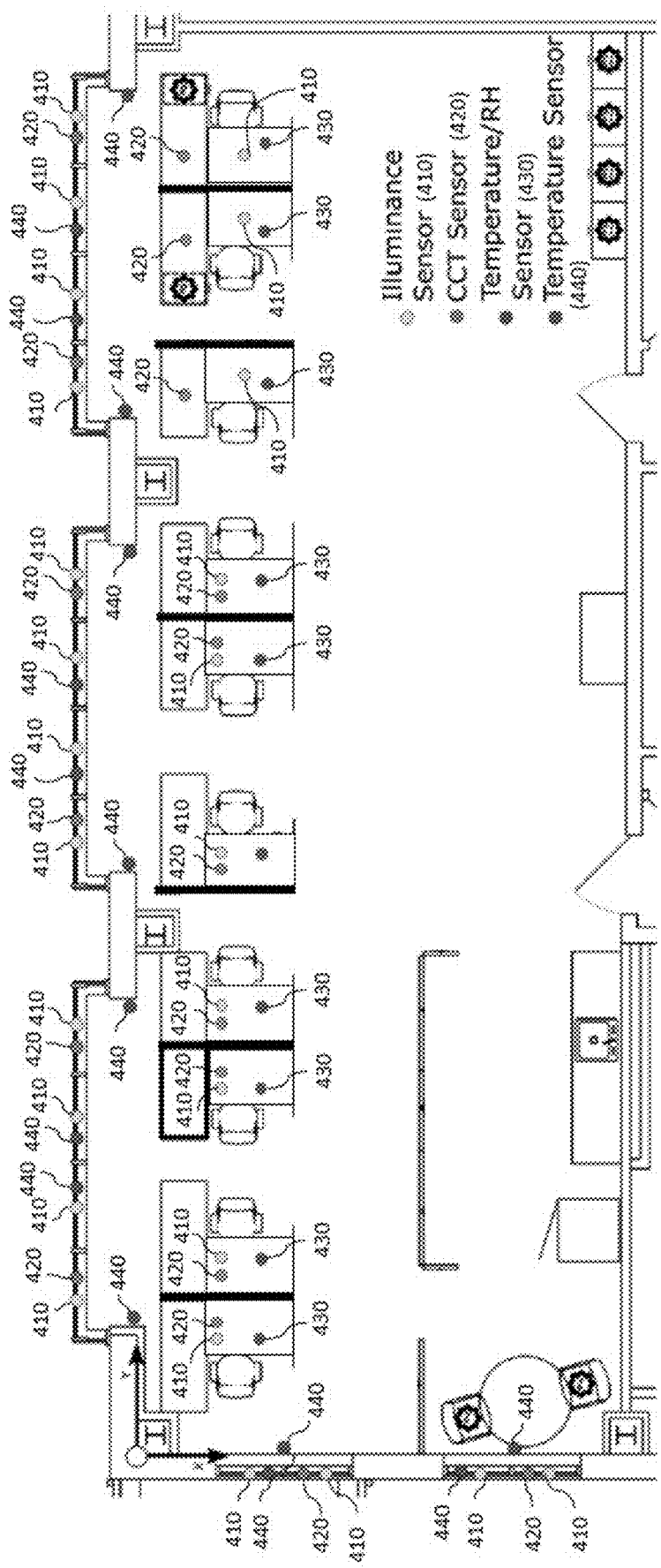
FIG. 4A is a schematic diagram illustrating exemplary light sensor placement in an indoor environment in accordance with some embodiments.
Figure 4B:
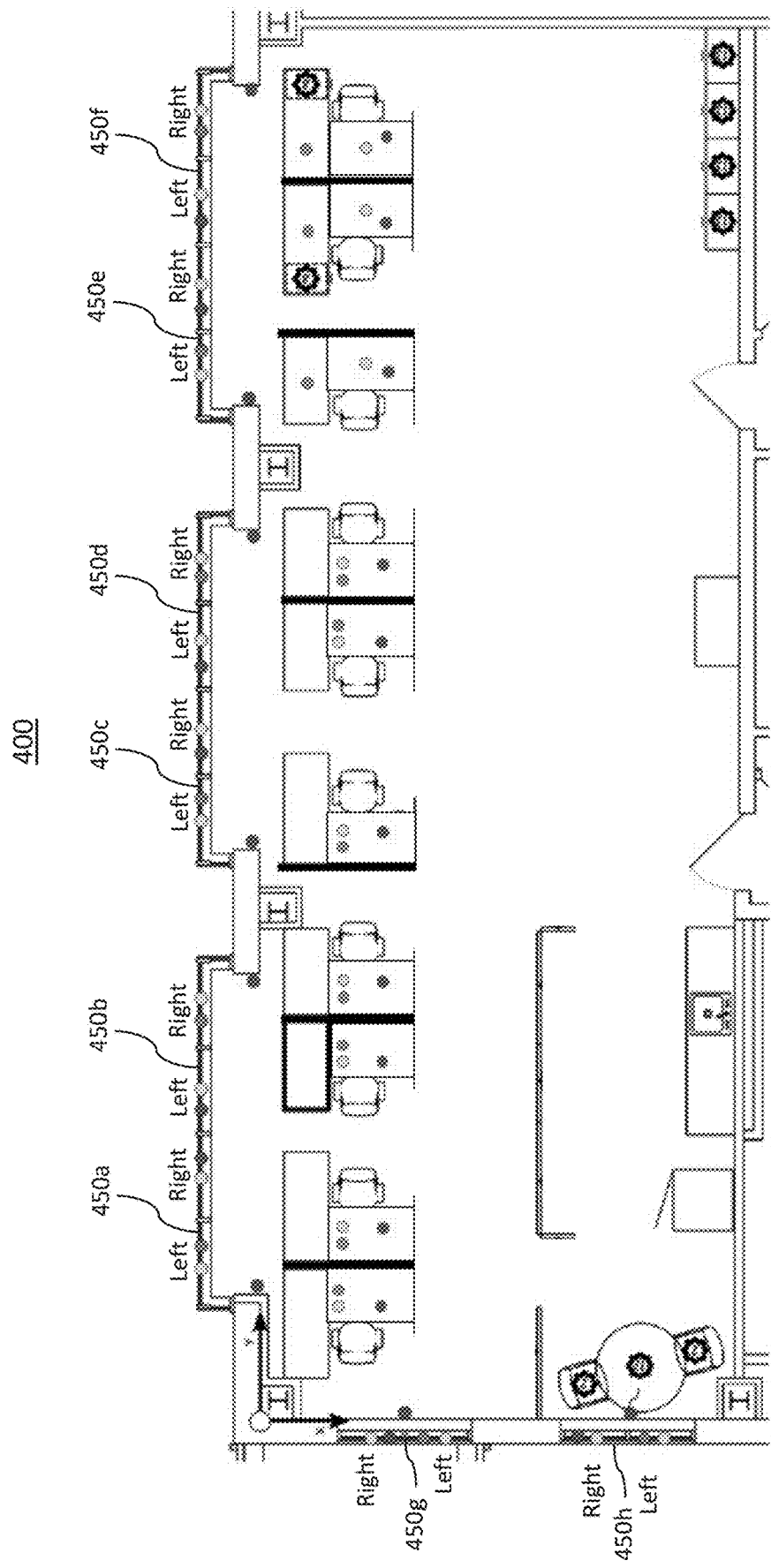
FIG. 4B is a schematic diagram illustrating exemplary window placement in an indoor environment in accordance with some embodiments.

FIGS. 4A and 4B are schematic diagrams that illustrate exemplary light sensor placement in an indoor space in accordance with some embodiments. The indoor environment in FIGS. 4A and 4B is an office space 400, depicting an exemplary layout of desks and windows. As depicted in FIG. 4A, A plurality of illuminance sensors 410, correlated color temperature sensors 420, relative humidity sensors 430, and temperature sensors 440 are positioned in the office space 400. The illuminance sensors, correlated color temperature sensors, relative humidity sensors, and temperature sensors positioned in the office space 400 may be in communication with an environmental control system, such as the environmental control system 100 described with reference to FIG. 1.

FIG. 4B illustrates an exemplary layout of windows 450 in the exemplary office space 400. By some approaches the windows 450 in the exemplary office space 400 may further include one or more light adjustment mechanisms such as, for example, electrochromic window panes or actuators operatively coupled to window shades. The one or more light adjustment mechanisms may be communicatively coupled to the environmental control system 100.

In operation, the illuminance sensors, correlated color temperature sensors, relative humidity sensors, and/or temperature sensors may collect data and transmit the collected data to an environmental control system. Data, or one or more portions thereof, collected from one or more of the illuminance sensors, correlated color temperature sensors, relative humidity sensors, and/or temperature sensors may be stored in one or more local or remote environment databases that are in communication with the environmental control system. In some embodiments, the environmental control system may be configured to operate the light adjustment mechanisms to control the level of access to natural light in the indoor environment 400. In some embodiments, the environmental control system may be configured to adjust the level of access to natural light in the indoor environment 400 in order to improve the satisfaction with lighting or cognitive function of one or more occupants of the indoor environment 400, for example, via the method described with reference to FIG. 6.

Figure 5:
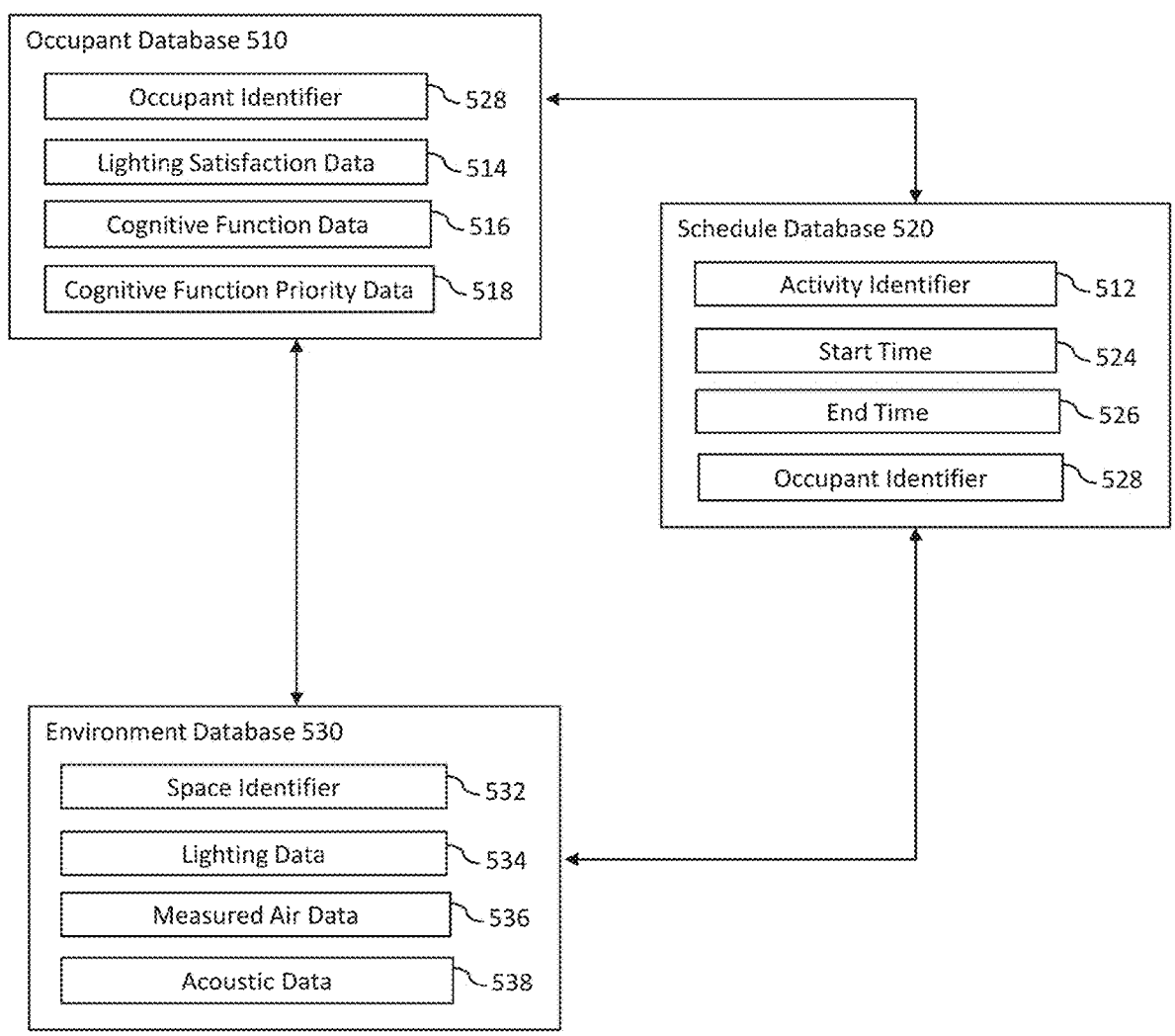
FIG. 5 is schematic diagram for a database structure for the environmental control system in accordance with some embodiments.

FIG. 5 is a schematic diagram that depicts an exemplary database structure for the environmental control system in accordance with several embodiments. By some approaches, the databases 500 depicted in FIG. 5 are communicatively coupled to the control subsystem 140, sensors 160, 165, 170, 175, 180, and/or user devices 185 of the environmental control system 100. The databases 500 in the environmental control system 500 may include an occupant database 510, a schedule database 520 and an environment database 530. Further, one or more of these databases 500 may be employed to assist the environmental control system in, for example, assigning or directing occupants to certain areas or sub-spaces, instructing or recommending particular changes to the habitable environment or the manner in which the occupants are using the habitable environment, and/or automatically adjusting parameters within the habitable environment, among other features that may be provided by the environmental control system.

In some embodiments, the occupant database 510 may include an occupant identifier 528. The occupant identifier 528 may identify an occupant or a group of occupants of the indoor environment. The occupant database 510 may further include lighting satisfaction data 514, cognitive function data 516, and cognitive function priority data 518 associated with the occupant or the group of occupants. The lighting satisfaction data 514 may include data that is indicative of the satisfaction or predicted satisfaction with lighting in the indoor environment by the occupant or group of occupants. The cognitive function data 516 may include data that is indicative of the cognitive function of an occupant. For example, cognitive function data may be indicative of the performance of the executive functions of working memory, inhibition, and/or task switching. The cognitive function priority data 518 may include data that is indicative of a priority level for various executive functions, for example, working memory, inhibition, and/or task switching, for the occupant. For example, an occupant may assign a priority level to the importance of various executive functions. By some approaches, priority levels may be associated with a particular time that the occupant will occupy the indoor environment. By some approaches, lighting satisfaction data 514, cognitive function data 516, and cognitive function priority data 518 may be collected via a survey, such as an electronic survey sent to an electronic user device 185 associated with an occupant. By some approaches, cognitive function priority level data may be collected periodically, for example, hourly, daily, bi-weekly, weekly, or monthly.

In some embodiments, the schedule database 520 may include an activity identifier 512 which uniquely identifies an activity, expected activity or planned activity to be completed by an occupant or group of occupants within the indoor environment. In the schedule database 520, a start time 524, end time 526, a location identifier, and one or more occupant identifiers 528 may be associated with the activity identifier 512. By permitting multiple occupant identifiers 528 to be indicated in the schedule database 520, the schedule database 520 may provide an indication of the expected level of occupancy within a given space at a particular time or during a particular time period. The start time 524 may indicate the time at which the particular activity associated with the activity identifier 512 is scheduled to start. Similarly, the end time 526 may indicate the time at which the particular activity associated with the activity identifier 512 is scheduled to end. Together the start time 524 and end time 526 define a period of time during which the particular activity identified by the activity identifier 512 will occur. The occupant identifier 528 may identify an occupant or group of occupants engaged in or planning to engage in the particular activity identified by the activity identifier 512. By some approaches, the schedule database 520 may capture a calendar of one or more events to occur, or that might occur, in a particular space within the indoor environment, such as a conference room, classroom, auditorium, etc. By some approaches, cognitive function priority level data and/or other data may be associated with activity or task and, for example, may also be associated with an activity identifier 512.

The environment database 530 may include a space identifier 532 which uniquely identifies a discrete space within the indoor environment. By some approaches, for example, the space identifier 532 may identify a particular workspace, conference or meeting room, collaboration space or other area within an office space. By some approaches, the space identifier 532 may identify a particular classroom, meeting room, and/or study space within a school. In the environment database 530, lighting data 534, air data 536, and/or acoustic data 538 may be associated with the space identifier 532. In some embodiments, the lighting data 534, air data 534, and acoustic data 538 may be collected by one or more of the sensors 160, 165, 170, 175 located within in the indoor environment.

Optionally, in some embodiments, the database structure may also include a biometrics database. By some approaches, the biometrics database may store measured or otherwise determined or received biometrics data associated with one or more occupants of the indoor environment. For example, the biometrics database may include the occupant identifier 528 and any biometric data collected by one or more biometric sensors 180 associated with the occupant.

FIG. 6 is a flow diagram for a method of operating the environmental control system to improve satisfaction with lighting and/or cognitive function in accordance with some embodiments. The method of FIG. 6 may be deployed by the environmental control system 100 or portions thereof as described with reference to FIG. 1. By one approach, this method is primarily executed by control subsystem 140 of environmental control system 100. In the method of FIG. 6, the environmental control system maintains at least one lighting parameter within a range, below a high threshold value, and/or above a low threshold value in order to improve satisfaction with lighting for one or more occupants of the indoor environment. By some approaches, the method of FIG. 6 may also be deployed to improve cognitive function, for example the performance of the executive functions of working memory, inhibition, and/or task switching, for one or more occupants of an indoor environment.

In the method of FIG. 6, at step 610, the environmental control system 100 receives lighting satisfaction data from or regarding one or more occupants of the indoor environment. Lighting satisfaction data may include data that is indicative of the satisfaction with lighting for one or more occupants of an indoor environment.

In some embodiments, lighting satisfaction data may be collected via an electronic survey and/or questionnaire that is provided to and answered by one or more occupants. For example, by one approach, the electronic survey may be transmitted to an electronic user device associated with an occupant of the indoor environment. For example, the electronic user device may be an electronic user device 185 as described with reference to FIG. 1. In response to receiving the electronic survey, the occupant of the indoor environment may input lighting satisfaction data via a user interface of the electronic user device 185. Various electronic surveys and/or questionnaires may be completed by an occupant of the indoor environment in order to evaluate how the indoor environment impacts the occupant's satisfaction with lighting. By some approaches, the electronic surveys may also be used to receive information about scheduled activities and/or may provide access to occupant calendars.

By some approaches, the electronic survey may include a questionnaire to evaluate an occupant's satisfaction with lighting at or near a given moment. By some approaches, the questionnaire to capture satisfaction with lighting at or near a given moment may include one or more questions from the Cost Effective Open-Plan Environments (COPE) Project questionnaire, known as the COPE Right Now questionnaire. The COPE Right Now questionnaire may ask occupants of the indoor environment to rate their satisfaction with different aspects of the indoor environment. By some approaches, the questionnaire may include one or more of the questions in TABLE 1.

TABLE 1

| Question (Broad) | Question (Specific) | Response Options |
|---|---|---|
| How do you feel about? | Light on the desk for paper-based tasks (reading and writing); Overall air quality in your work area; Odors in your work area; Temperature in your work area; Aesthetic appearance of your work area; Cleanliness of your work area; | Very dissatisfied/ Dissatisfied/ Somewhat dissatisfied/ Neutral/Somewhat satisfied/Satisfied/ Very satisfied |

TABLE 1-continued

| Question (Broad) | Question (Specific) | Response Options |
|---|---|---|
| | Level of acoustic privacy for conversation in your work area; Level of visual privacy within your work area; Amount of noise from other people's conversations while you are at your workstation; Size of your personal work area to accommodate your work, materials, and visitors; Amount of background noise from mechanical or office equipment you hear at your workstation; Light for computer work | |
| How often do you experience glare? | On your computer screen; From electric lighting fixtures; From daylight | Always/Morning/ Noon/Late afternoon/ Night/Never |
| How do you feel about? | Air movement in your work area; Your ability to alter physical conditions in your work area; Your access to a view of outside from where you sit; Distance between you and other people you work with; Overall quality of lighting in your work area; Frequency of distraction from other people; Degree of enclosure of your work area by walls, screens, or furniture | Very dissatisfied/ Dissatisfied/ Somewhat dissatisfied/ Neutral/Somewhat satisfied/Satisfied/ Very satisfied |
| Rank from 1$^{st}$ to 7$^{th}$ what should be improved to support your effectiveness at work. | Noise; Temperature; Privacy; Air Quality/Ventilation; Size of Workspace; Window Access; Lighting | Rank of importance (1-7) |
| How do you feel about? | My department/agency is a good place to work; I am satisfied with my job; The environmental conditions in my work area support my personal productivity; I am satisfied with the indoor environment in my work area as a whole | Strongly disagree/ Disagree/Somewhat disagree/Neutral/ Somewhat agree/ Agree/Strongly agree |

In addition to receiving lighting satisfaction data, in some embodiments, in step 610, the environmental control system 100 may also receive or otherwise determine cognitive function data via one or more task-based surveys, tests, and/or questionnaires. Cognitive function data may include, for example, data that is indicative of the cognitive function, including the performance of various executive functions, of an occupant. By some approaches, cognitive function data may be used to evaluate the performance of the executive functions of working memory, inhibition, and/or task switching for one or more occupants.

Various task-based surveys, tests, and/or questionnaires may be used to collect cognitive function data. These task-based surveys, tests, and/or questionnaires may be completed by an occupant of the indoor environment in order to evaluate how the indoor environment impacts the occupant's cognitive function, for example, how the environment impacts the occupant's performance of various executive functions. By some approaches, the task-based surveys may be used to collect cognitive function data, which may be used to assess cognitive function. For example, task-based surveys may be used to evaluate the performance of one or more executive functions such as, for example, task switching, inhibition, and/or working memory.

By some approaches, task switching may be evaluated for an occupant of the indoor environment via a task-based survey in which the occupant is prompted to complete a magnitude/parity test. By some approaches, the magnitude/parity test may prompt the occupant to monitor the color of digits (e.g., 1-4, 6-9) and, depending on the color of the digit, the occupant is prompted to answer whether the number is greater or less than five or whether the number is even versus odd. These trials may be either "stay" or "switch" trials. In stay trials, trials are of the same type, for example, an even versus odd trial followed by an even versus odd trial. In switch trials, the trial type varies from the one that came before it, for example, an even versus odd trial followed by a greater versus less than five trial. During the trials, occupants may be prompted to respond as quickly as possible. The reaction time, that is the time to for the occupant to provide an answer, for the occupant is measured. Via this task-based survey, a score for task switching may be assigned to an occupant based on the reaction time differences between correctly answered questions in switch versus stay trials.

By some approaches, inhibition of an occupant of the indoor environment may be evaluated via a tasked-based survey in which the occupant is prompted to indicate what color words appear in. By some approaches, the words are the names of colors. For example, in some instances, the words appear in a congruent color (e.g., the word "BLUE" written in the color blue). In other instances, for example, the words appear in an incongruent color (e.g., the word "BLUE" written in the color green). The occupant may be asked to identify the color as quickly as possible and the reaction time, that is the time taken by the occupant to identify the color, is measured. Via this task-based survey, a score for inhibition may be assigned to an occupant based on a comparison between the reaction times for congruent trials to incongruent trials.

By some approaches, working memory of an occupant of the indoor environment may be evaluated via a task-based survey in which the occupant solves one or more math problems while remembering sets of letters. For example, an occupant may be asked to solve a math problem correctly during a fixed period of time. While solving the math problem, the occupant is asked to recall memory items, such as for example letters, while maintaining good performance on the math problem. Via this task-based survey, a score for working memory may be assigned to an occupant based on the number of memory items correctly recalled and performance on the math problem.

At step 620, the environmental control system receives lighting data from one or more light sensors in the indoor environment. Step 620 may be completed before, after, or concurrently with step 610. In some embodiments, the lighting data includes at least one of correlated color temperature of light or illuminance of light.

By some approaches, the lighting data is collected via one or more light sensors positioned on in one or more discrete spaces in the indoor environment. One or more light sensors may be positioned, for example, as described with reference to FIG. 3.

Optionally, at step 630, the environmental control system 100 may receive biometric data from one or more biometric sensors associated with one or more occupants of the indoor environment. Step 630 may be completed before, after, or concurrently with steps 610 and 620.

At step 640, the environmental control system 100 may optionally analyze the lighting satisfaction data, cognitive function data, lighting data, and/or biometric data to identify correlations between the lighting satisfaction data, cognitive function data, lighting data, and/or biometric data and the satisfaction with lighting for one or more occupants of the indoor environment. By some approaches, the environmental control system 100 may also optionally analyze some or all of the lighting satisfaction data, cognitive function data, lighting data, and/or biometric data to identify correlations between the lighting satisfaction data, cognitive function data, lighting data, and/or biometric data and cognitive function of one or more occupants of the indoor environment.

In some embodiments, the environmental control system 100 may analyze the lighting satisfaction data, cognitive function data, lighting data, and/or biometric data via a machine learning circuit, algorithm or process. For example, in some approaches the machine learning circuit, algorithm or process may identify correlations between one or more of lighting satisfaction data, cognitive function data, lighting data, and biometric data and the satisfaction with lighting of one or more occupants. In other approaches the machine learning circuit, algorithm or process may identify correlations between one or more of lighting satisfaction data, cognitive function data, lighting data, and biometric data and the cognitive function of one or more occupants.

By some approaches, one or more machine learning circuits, algorithms or processes perform decision making based on pathways established between processing elements of the machine learning circuits, algorithms or processes. Machine learning circuits, algorithms or processes may be analogized to the interconnected neurological pathways of a human brain. Within a neural network type machine learning circuit, algorithm or process, the organization and weights assigned to particular connections determine the output of the neural network.

Machine learning circuits, algorithms or processes are typically trained, during a training time, using historical examples. When trained using a sufficiently large number of relative high-quality examples, machine learning circuits, algorithms or processes, operating during a run time, may produce accurate predictive models. During run time, the organization and weighting of connections within the machine learning circuits, algorithms or processes provide the decision-making capabilities. Machine learning circuits, algorithms or processes derive meaning from complicated or imprecise data and extracts patterns or trends.

The machine learning circuits, algorithms or processes may be trained using various different sets of data depending on the specific implementation. The machine learning circuits, algorithms or processes may be trained repeatedly over time, for example between run time operations.

For example, the machine learning circuits, algorithms or processes may generate, develop, or otherwise identify one or more predictive algorithms advantageously able to predict with a reasonably high degree of certainty a change in lighting parameters an environment and a resulting change in satisfaction and/or cognitive function of an individual who inhabits the environment. To facilitate this analysis, on a periodic, intermittent, or continuous basis, a training subsystem generates or otherwise compiles one or more sets of training data, and trains the machine learning circuit, algorithm, or process. The training subsystem may divide, split equally or unequally, or otherwise separate data collected from one or more habitable spaces and/or individuals into respective training data sets and test data sets. The training data sets are used to train the machine learning circuit, algorithm, or process in formulating and/or developing one or more prediction models. The test data sets may be used to test the accuracy, reliability, and predictability of the prediction models formulated and/or developed by the machine learning circuit, algorithm, or process. In at least some implementations, the training subsystem may randomly split or otherwise randomly equally or unequally separate collected data into a training data set and a test data set in which data logically associated with a single discrete space or occupant appears in both the training data set and the test data set (i.e., non-mutually exclusive training and test data sets). Such a non-mutually exclusive splitting or separation generally produces a relatively more refined prediction model. Alternatively, the training subsystem may be randomly split or otherwise randomly equally or unequally separate the collected data into a training data set and a test data set in which data logically associated with a single discrete space or occupant appears in either the training data set or the test data set (i.e., mutually exclusive training and test data sets). Such mutually exclusive splitting or separation generally produces a relatively less refined prediction model.

The training data sets are received at an input layer of the machine learning circuit, algorithm, or process. During training, the training data sets may be used to form and/or weight connections within the machine learning circuits, algorithms or processes. During subsequent training, the training data sets re-form and/or re-weight the connections within the machine learning circuits, algorithms or processes. Test data sets test the accuracy of each of the number of predictive models generated by the machine learning circuits, algorithms or processes.

The environmental control system 100 may store training data gathered from the various inputs of the environmental control system 100 in a training data storage. The training data or training examples may be used by the machine learning circuit, algorithm, or process to learn which data are predictive of satisfaction and/or cognitive function for the occupants of the indoor environment. By some approaches, the machine learning circuit may be implemented by a processor or logic associated with the control subsystem 140 or by some other computing system, such as the one or more server computer systems.

Generally, by incorporating sensors, detectors, and other information feedback into the control subsystem 140, the control subsystem may utilize machine learning circuits, algorithms or processes to allow it to conduct experimentation to find new modes of optimization. The machine learning circuit, algorithm, or process may enable the control subsystem 140 to learn which data are most predictive of beneficial health outcomes for the occupants of a building, creating new ways to fine-tune the environmental control system 100 beyond control programs that may be pre-programmed into the system.

During run-time operation, in one example, the machine learning circuit, algorithm or process may use the one or more predictive models to generate or otherwise provide data indicative of a likelihood that a particular change in one or more lighting parameters will produce a change in environmental satisfaction and/or cognitive function for one or more occupants of an indoor environment.

By some approaches, the machine learning circuit, algorithm, or process may be trained to recognize patterns in lighting satisfaction data, cognitive function data, lighting data, and/or biometric data, discerning possible cause and effect relationships or patterns between one or more stimuli (e.g., change in lighting data, biometric data) and resulting effects on occupants of the indoor environment (e.g., environmental satisfaction, cognitive function). In one example, the environmental control system may adjust lighting parameters in the indoor environment based on one or more patterns identified by the machine learning circuit, algorithm, or process. In another example, the environmental control system may provide feedback to the occupant to direct the occupant to a particular discrete space in the indoor environment based on the one or more patterns identified by the machine learning circuit, algorithm, or process.

In some embodiments, the environmental control system 100 may analyze some or all of the lighting satisfaction data, cognitive function data, lighting data, and/or biometric data in order to identify data variables that are predictive of improved satisfaction with lighting. In addition, the environmental control system 100 may analyze some or all of the lighting satisfaction data, cognitive function data, lighting data, and/or biometric data in order to identify data variables that are predictive of improved cognitive function.

At step 650, the environmental control system 100 maintains at least one lighting parameter of the indoor environment within a range, below a high threshold value, and/or above a low threshold value based at least in part on the lighting satisfaction data, cognitive function data, lighting data, and/or biometric data. In some embodiments the range is identified via the analysis performed at step 640.

At step 660, the environmental control system 100 maintains at least one lighting parameter of the indoor environment within a range, below a high threshold value, and/or above a low threshold value based at least in part on the lighting satisfaction data, cognitive function data, lighting data, and/or biometric data. In some embodiments, the threshold level is identified via the analysis performed at step 650.

In some embodiments, for example, the environmental control system 100 may adjust a lighting parameter of the indoor environment in order to maintain the lighting parameter above or below a threshold level. In some examples, the environmental control system 100 may adjust a lighting parameter of the indoor environment when the parameter is outside of an identified range. By some approaches, the threshold level of a lighting parameter may be indicative of access to natural light (i.e., a parameter a parameter above the threshold level may indicate that the indoor environment has access to natural light). By some approaches, the range for a lighting parameter may be indicative of access to natural light (i.e., a parameter within the range may indicate that the indoor environment has access to natural light).

By some approaches, the environmental control system 100 may maintain illuminance of light within a range, below a high threshold value, and/or above a low threshold value. In some approaches, the range for illuminance of light may be between about 200 lux and about 700 lux, between about 300 lux and about 600 lux, or between about 400 lux and about 500 lux. By some approaches, the environmental control system 100 may maintain illuminance of light above a threshold level. In some approaches, the threshold level for illuminance of light may be between about 100 lux and about 500 lux, between about 200 lux and about 400 lux, between about 250 lux and about 350 lux, or between about 275 lux and about 325 lux.

By some approaches, the environmental control system 100 may maintain correlated color temperature of light within a range. In some approaches, the range for correlated color temperature of light may be between about 3000 degrees Kelvin and about 7000 degrees Kelvin, between about 4000 degrees Kelvin and about 6000 degrees Kelvin, or between about 4500 degrees Kelvin and about 5500 degrees Kelvin. By some approaches, the environmental controls system 100 may maintain correlated color temperature of light above a threshold level. In some approaches, the threshold level for correlated color temperature of light may be between about 3000 degrees Kelvin and about 6000 degrees Kelvin, between about 3500 degrees Kelvin and about 5500 degrees Kelvin, between about 4000 degrees Kelvin and about 4500 degrees Kelvin, or between about 4200 degrees Kelvin and about 4300 degrees Kelvin.

By some approaches, the system maintains the illuminance of light, as measured by one or more light sensors positioned on or adjacent to a window, between about 1900 and about 2500 lux, about 2000 and about 2400 lux, or about 2100 and about 2200 lux. By some approaches, the system maintains the illuminance of light, as measured by one or more light sensors positioned on or adjacent to a window, between 3300 and about 3900 lux, about 3400 and about 3800 lux, or about 3500 and about 3700 lux. By some approaches, the system maintains the illuminance of light, as measured by one or more light sensors positioned on a window, above about 50 lux, about 60 lux, about 80 lux, above about 100 lux, or above about 200 lux. By other approaches, the system maintains the correlated color temperature, as measured by one or more light sensors positioned on or adjacent to a window, between about 5300 and about 5800 degrees Kelvin, about 5400 and about 5700 degrees Kelvin, about 5500 and about 5600 degrees Kelvin.

By some approaches, the system maintains the variation in the illuminance of light, within about 150 lux, 100 lux, 50 lux, about 20 lux, or about 10 lux. By some approaches, the system maintains the variation in the illuminance of light, as measured by one or more light sensors positioned on or adjacent to a window, within about 1000 lux, 500 lux, 250 lux, or about 100 lux. Variation in the illuminance of light may be determined, for example, by the standard deviation in illuminance of light over a period of time (e.g., day, 12-hour period, 6-hour period, week, etc.). By some approaches, system maintains the variation in the correlated color temperature of light between about 300 and about 500 degrees Kelvin, about 350 and about 450 degrees Kelvin, or about 375 to about 425 degrees Kelvin. By some approaches, system maintains the variation in the correlated color temperature of light between about 600 to about 800 degrees Kelvin, about 650 to about 750 degrees Kelvin, or about 675 to about 725 degrees Kelvin. By some approaches, the system maintains the variation in the correlated color temperature of light, within about 150 degrees Kelvin, 100 degrees Kelvin, about 50 degrees Kelvin, or about degrees Kelvin. Variation in the correlated color temperature of light may be determined, for example, by the standard deviation in illuminance of light over a period of time (e.g., day, 12-hour period, 6-hour period, week, etc.).

In some embodiments, the environmental control system 100 may adjust at least one lighting parameter within an indoor environment by controlling the amount of natural light entering the indoor environment. For example, the environmental control system 100 may control the amount of natural light entering the indoor environment my operating an actuator coupled to a window shade. In other examples, the environmental control system 100 may control the amount of natural light entering the indoor environment by operating an electrochromic pane of a window to control the amount of natural light entering the indoor environment.

In some embodiments, the environmental control system 100 may be employed to improve satisfaction with lighting in blackout environments, mesh shade environments, and/or dynamic tint environments. Blackout environments may include, for example, indoor environments employing blackout shades and/or electrochromic window panes with a low transmittance value. Mesh shade environments may include, for example, indoor environments employing one or more actuators operatively coupled to one or more mesh shades. Dynamic tint environments may include, for example, indoor environments employing one or more actuators operatively coupled to one or more electrochromic window panes.

By some approaches, a survey (e.g., the COPE survey) may be sent to one or more occupants of the indoor environment one time per day (e.g., once per workday) for example, at 10 PM, 11 PM, 12 PM, 1 PM, 2 PM, etc. to evaluate occupant satisfaction in blackout environments, mesh shade environments, and/or dynamic tint environments. To improve satisfaction with lighting, the environmental control system may employ lighting satisfaction data received from the surveys to adjust illuminance and/or correlated color temperature of light using the method described with reference to FIG. 6. By some approaches, the environmental control system 100 may maintain the illuminance and/or correlated color temperature of light within a particular range, above a low threshold level, and/or below a high threshold level depending on the time of day. By some approaches, the environmental control system 100 may maintain the illuminance and/or correlated color temperature of light within a particular range, above a low threshold level, and/or below a high threshold level depending on an amount of time before the delivery and/or receipt of the survey. For example, the environmental control system 100 may maintain the illuminance of light within a first range for a first period of time (e.g., about 8 hours until about 2 hours, about 6 hours until about 2 hours, or about 4 hours until about 2 hours before the survey is sent to and/or received by occupants) and within a second range for a second period of time (e.g., about 4 hours, 3 hours, or 2 hours until about 0 hours before the survey is sent to and/or received by occupants). In another example, the first period of time may be a first portion of a workday (e.g., about 6 AM to about 10 AM, about 7 AM to about 11 AM, about 9 AM to about 11 AM, or about 9 AM until about 12 PM) and the second period of time may be a second portion of a workday (e.g., about 10 AM to about 2 PM, about 11 AM to about 3 PM, about 12 PM to about 4 PM, or about 1 PM to about 5 PM).

In some embodiments, a blackout environment may be, for example, an indoor environment employing one or more blackout shades and/or electrochromic window panes with a low transmittance value. In some examples, the blackout environment may be an indoor environment having at least one window including motorized roller blackout shades. By some approaches, the blackout shades may be operative coupled to the environmental control system 100. The blackout shades may be, for example, Mermet Blackout-White shades with a visible transmittance value of about 0%. In some examples, the blackout shades may include on at least one window including at least one pane of electrochromic glass having a low visible transmittance value. The electrochromic glass, for example, may have a visible transmittance value of about 1%, a solar transmittance value of about 1%, a solar reflectance value of about 12%, and/or a solar heat gain coefficient of about 0.09. By some approaches, one or more blackout shades may be in the closed position in the blackout environment. In some approaches, one or more blackout shades may also be manually controllable by an occupant of the indoor environment.

In a blackout environment, the environmental control system 100 may adjust the illuminance of light in an indoor environment in order to improve occupant satisfaction with lighting by adjusting one or more blackout shades and/or electrochromic panes. By some approaches, the environmental control system 100 may maintain the illuminance of light as measured by a desktop sensor within a particular range, above a low threshold value, and/or below a high threshold value in order to improve occupant satisfaction with lighting in a blackout environment. The illuminance ranges may take into account both natural light and artificial light as measured by one or more desktop light sensors. By some approaches, the system maintains the illuminance of light between about 200 and about 1100 lux, about 300 and about lux 1000, about 307 and about 953 lux, or within any range within the low threshold level and the high threshold level, as measured by one or more desktop light sensors. By some approaches, the system maintains the illuminance of light in a blackout environment above a low threshold level of about 200 lux, about 300 lux, or about 307 lux. By some approaches, the system maintains the illuminance of light in a blackout environment below a high threshold level of about 1100 lux, about 1000 lux, or about 953 lux. In some examples, the environmental control system 100 maintains the range of illuminance values between about 300 and about 900, about 350 and about 850, about 380 and about 826 lux, about 430 and about 549 lux, and about 641 and about 816 lux during the first period of time. In some examples, the environmental control system 100 maintains the range of illuminance values between about 300 and about 900 lux, about 400 and about 850 lux, 411 and about 827 lux, about 411 and about 550 lux, about 421 and about 827 lux, or about 644 and about 815 lux during the second period of time. By some approaches, the illuminance values during the first period of time and the second period of time may by the mean illuminance values. These illuminance metrics may correspond to improved satisfaction with lighting when employed in an environmental control system that employs blackout shades.

In a blackout environment, the environmental control system 100 may also control the variations in illuminance of light in an indoor environment in order to improve occupant satisfaction with lighting by adjusting one or more blackout shades and/or electrochromic window panes. In some examples, the environmental control system 100 maintains the variations in illuminance values between about 0 and about 50, about 1 and about 41 lux, or about 2 and about 35 lux during the first period of time. In some examples, the environmental control system 100 maintains the variations in illuminance of light between about 0 and about 50 lux, about 1 and about 37 lux, or about 1 and about 5 lux during the second period of time. As a further example, the environmental control system 100 may maintain the illuminance of light within about 380 lux to about 826 lux between four to two hours before the survey is sent or otherwise provide to one or more occupants, or otherwise received or completed by the one or more occupants. Alternatively, or in sequence, the environmental control system 100 may maintain the illuminance of light within about 411 lux to about 827 lux starting up to two hours before the survey is sent or otherwise provide to one or more occupants, or otherwise received or completed by the one or more occupants. The environmental control system 100 also may limit the variation in the illuminance of the light from between about 1 lux to about 41 lux, about 2 lux to about 35 lux, etc. between four to two hours before the survey is sent or otherwise provide to one or more occupants, or otherwise received or completed by the one or more occupants. Alternatively, or in sequence, the environmental control system 100 also may limit the variation in the illuminance of the light from between about 1 lux to about 37 lux, about 1 lux to about 5 lux, etc. starting up to two hours before the survey is sent or otherwise provide to one or more occupants, or otherwise received or completed by the one or more occupants.

In a blackout environment, the environmental control system 100 may maintain the illuminance of light below a high threshold level of about 200 to about 1000 lux, about 300 to about 900 lux, or about 380 to about 826 lux for a first period of time in order to improve satisfaction with lighting. The environmental control system 100 may also maintain the illuminance of light below a high threshold level of about 300 to about 900 lux, about 400 to about 850 lux, or about 411 to about 827 lux for a second period of time in order to improve satisfaction with lighting.

In a blackout environment, the environmental control system 100 may adjust the correlated color temperature of light in an indoor environment in order to improve occupant satisfaction with lighting by adjusting one or more blackout shades and/or electrochromic window panes. By some approaches, the environmental control system 100 may maintain the correlated color temperature of light as measured by a desktop sensor within a particular range, above a low threshold value, and/or below a high threshold value in order to improve occupant satisfaction with lighting in a blackout environment. The correlated color temperature ranges may take into account both natural light and artificial light as measured by one or more desktop light sensors. By some approaches, the system maintains the correlated color temperature of light between about 3500 and about 6000 degrees Kelvin, about 4000 and about 5700 degrees Kelvin, about 4053 and about 5699 degrees Kelvin, or within any range within the low threshold level and the high threshold level, as measured by one or more desktop light sensors. By some approaches, the system maintains the correlated color temperature of light in a blackout environment above a low threshold level of about 3500 degrees Kelvin, about 4000 degrees Kelvin, about 4053 degrees Kelvin. By some approaches, the system maintains the correlated color temperature of light in a blackout environment below a high threshold level of about 6000 degrees Kelvin, about 5700 degrees Kelvin, or about 5699 degrees Kelvin. In some examples, the environmental control system 100 maintains the range of correlated color temperature values between about 4000 and about 5000 degrees Kelvin, about 4100 and about 4700 degrees Kelvin, about 4191 and about 4516 degrees Kelvin, about 4138 and about 4660 degrees Kelvin, or about 4280 and about 4550 degrees Kelvin during the first period of time. In some examples, the environment control system maintains the correlated color temperature values between about 4000 and about 5000 degrees Kelvin, about 4100 and about 4600 degrees Kelvin, about 4132 and about 4585 degrees Kelvin, about 4191 and about 4454 degrees Kelvin, about 4132 and about 4585 degrees Kelvin, or about 4268 and about 4549 degrees Kelvin during the second period of time. By some approaches, the correlated color temperature values during the first period of time and the second period of time may by the mean correlated color temperature values. These correlated color temperature metrics may correspond to improved satisfaction with lighting when employed in an environmental control system that employs blackout shades. As a further example, the environmental control system 100 may maintain the CCT light within about 4138 degrees Kelvin to about 4661 degrees Kelvin between four to two hours before the survey is sent or otherwise provide to one or more occupants, or otherwise received or completed by the one or more occupants. Alternatively, or in sequence, the environmental control system 100 may maintain the CCT of light within about 4133 degrees Kelvin to about 4585 degrees Kelvin starting up to two hours before the survey is sent or otherwise provide to one or more occupants, or otherwise received or completed by the one or more occupants. The environmental control system 100 also may limit the variation in the CCT of the light from between about 3 degrees Kelvin to about 259 degrees Kelvin, about 5 degrees Kelvin to about 66 degrees Kelvin, etc. between four to two hours before the survey is sent or otherwise provide to one or more occupants, or otherwise received or completed by the one or more occupants. Alternatively, or in sequence, the environmental control system 100 also may limit the variation in the CCT of the light from between about 3 degrees Kelvin to about 6 degrees Kelvin, about 4 degrees Kelvin to about 6 degrees Kelvin, etc. starting up to two hours before the survey is sent or otherwise provide to one or more occupants, or otherwise received or completed by the one or more occupants.

In a blackout environment, the environmental control system 100 may also control the variations in correlated color temperature of light in an indoor environment in order to improve occupant satisfaction with lighting by adjusting one or more blackout shades and/or electrochromic window panes. In some examples, the environmental control system 100 maintains the variations in correlated color temperature values between about 0 and about 300 degrees Kelvin, about 3 and about 259 degrees Kelvin, or about 5 and about 66 degrees Kelvin during the first period of time. In some examples, the environmental control system 100 maintains the variations in illuminance of light between about 0 and about 100 degrees Kelvin, about 3 and about 60 degrees Kelvin, or about 4 and about 6 degrees Kelvin during the second period of time.

In a blackout environment, the environmental control system 100 may maintain the correlated color temperature of light below a high threshold level of about 3000 to about 6000 lux, about 4000 to about 5000 lux, 4100 to about 4700 lux, or about 4138 to about 4661 lux for a first period of time in order to improve satisfaction with lighting. The environmental control system 100 may also maintain the correlated color temperature of light below a high threshold level of about 3000 to about 6000 lux, about 4000 to about 5000 lux, about 4100 to about 4600 lux, or about 4133 to about 4585 lux for a second period of time in order to improve satisfaction with lighting.

In some embodiments, a mesh shade environment may be, for example, an indoor environment employing one or more actuators operatively coupled to one or more mesh shades. In some examples, the mesh shade environment may be an indoor environment having at least one window including motorized roller mesh shades. By some approaches, the mesh shades may be operative coupled to the environmental control system 100. The mesh shades may be, for example, E Screen—THEIA, White/Pearl screens operated by a motorized roller. In some examples, the mesh shades may have an openness factor of about 1.7%±0.75%, a visible light transmittance of about 7.6%±1.6%, a solar transmittance of about 9%, a solar reflectance of about 58%, a solar absorption of about 33%, and/or a view rating of about 11%. By some approaches, in a mesh shade environment, one or more mesh shades may be employed on at least one window having at least one pane of electrochromic glass. For example, one or more mesh shades may be employed on a window having a pane of electrochromic glass having a visible light transmittance of about 40%, a solar transmittance of about 21%, a solar reflectance of about 12%, and/or a heat gain coefficient of about 0.28%. By some approaches, the mesh shades may also be manually controllable by occupants of the indoor environment.

In a mesh shade environment, the environmental control system 100 may adjust the illuminance of light in an indoor environment in order to improve occupant satisfaction with lighting by adjusting one or more mesh shades. By some approaches, the environmental control system 100 may maintain the illuminance of light as measured by a desktop sensor within a particular range, above a low threshold value, and/or below a high threshold value in order to improve occupant satisfaction with lighting in a mesh shade environment. The illuminance ranges may take into account both natural light and artificial light as measured by one or more desktop light sensors. By some approaches, the system maintains the illuminance of light between about 0 and about 70000 lux, about 0 and about 65861 lux, or within any range within the low threshold level and the high threshold level, as measured by one or more desktop light sensors. By some approaches, the system maintains the illuminance of light in a mesh shade environment above a low threshold level of about 100 lux, about 50 lux, about 10 lux, or about 0 lux. By some approaches, the system maintains the illuminance of light in a mesh shade environment below a high threshold level of about 70000 lux or about 65861 lux. In some examples, the environmental control system 100 maintains the range of illuminance values between about 500 and about 13000, about 596 and about 12470, about 596 and about 4681 lux, about 624 and about 12470 lux, and about 743 and about 10855 lux during the first period of time. In some examples, the environmental control system 100 maintains the range of illuminance values between about 100 and about 14000 lux, about 149 and about 13658 lux, about 630 and about 1891 lux, or about 997 and about 3277 lux during the second period of time. By some approaches, the illuminance values during the first period of time and the second period of time may by the mean illuminance values. These illuminance metrics may correspond to improved satisfaction with lighting when employed in an environmental control system that employs mesh shades.

In a mesh shade environment, the environmental control system 100 may also control the variations in illuminance of light in an indoor environment in order to improve occupant satisfaction with lighting by adjusting one or more mesh shades for one or more windows. In some examples, the environmental control system 100 maintains the variations in illuminance values between about 100 and about 20000, about 400 to about 10000 lux, about 111 and about 19654 lux, or about 418 and about 9485 lux during the first period of time. In some examples, the environmental control system 100 maintains the variations in illuminance of light between about 10 and about 15000 lux, about 50 and about 600 lux, about 16 and about 13069 lux, or about 79 and about 594 lux during the second period of time. As a further example, the environmental control system 100 may maintain the illuminance of light within about 596 lux to about 12471 lux between four to two hours before the survey is sent or otherwise provide to one or more occupants, or otherwise received or completed by the one or more occupants. Alternatively, or in sequence, the environmental control system 100 may maintain the illuminance of light within about 150 lux to about 13659 lux starting up to two hours before the survey is sent or otherwise provide to one or more occupants, or otherwise received or completed by the one or more occupants. The environmental control system 100 also may limit the variation in the illuminance of the light from between about 111 lux to about 19654 lux, about 418 lux to about 9485 lux, etc. between four to two hours before the survey is sent or otherwise provide to one or more occupants, or otherwise received or completed by the one or more occupants. Alternatively, or in sequence, the environmental control system 100 also may limit the variation in the illuminance of the light from between about 16 lux to about 13069 lux, about 79 lux to about 594 lux, etc. starting up to two hours before the survey is sent or otherwise provide to one or more occupants, or otherwise received or completed by the one or more occupants.

In a mesh shade environment, the environmental control system 100 may maintain the illuminance of light below a high threshold level of about 400 to about 14000 lux, about 500 to about 13000 lux, or about 596 to about 12471 lux for a first period of time in order to improve satisfaction with lighting. The environmental control system 100 may also maintain the illuminance of light below a high threshold level of about 50 to about 15000 lux, about 100 to about 14000 lux, or about 150 to about 13659 lux for a second period of time in order to improve satisfaction with lighting.

In a mesh shade environment, the environmental control system 100 may adjust the correlated color temperature of light in an indoor environment in order to improve occupant satisfaction with lighting by adjusting one or more mesh shades. By some approaches, the environmental control system 100 may maintain the correlated color temperature of light as measured by a desktop sensor within a particular range, above a low threshold value, and/or below a high threshold value in order to improve occupant satisfaction with lighting in a mesh shade environment. The correlated color temperature ranges may take into account both natural light and artificial light as measured by one or more desktop light sensors. By some approaches, the system maintains the correlated color temperature of light between about 2000 and about 20000 degrees Kelvin, about 2500 and about 19000 degrees Kelvin, about 2549 and about 18926 degrees Kelvin, or within any range within the low threshold level and the high threshold level, as measured by one or more desktop light sensors. By some approaches, the system maintains the correlated color temperature of light in a mesh shade environment above a low threshold level of about 2000 degrees Kelvin, about 2500 degrees Kelvin, or about 2549 degrees Kelvin. By some approaches, the system maintains the correlated color temperature of light in a mesh shade environment below a high threshold level of about 20000 degrees Kelvin, about 19000 degrees Kelvin, or about 18926 degrees Kelvin. In some examples, the environmental control system 100 maintains the range of correlated color temperature values between about 4000 and about 6000 degrees Kelvin, about 4100 and about 5300 degrees Kelvin, about 4170 and about 5289 degrees Kelvin, about 4199 and about 5395 degrees Kelvin, or about 4104 and about 5775 degrees Kelvin during the first period of time. In some examples, the environmental control system 100 maintains the range of correlated color temperature values between about 4000 and about 6000 degrees Kelvin, about 4400 and about 5900 degrees Kelvin, about 4401 and about 5839 degrees Kelvin, about 4823 and about 5652 degrees Kelvin, about 4401 and about 5670 degrees Kelvin, or about 4407 and about 5839 degrees Kelvin during the second period of time. By some approaches, the correlated color temperature values during the first period of time and the second period of time may by the mean correlated color temperature values. These correlated color temperature metrics may correspond to improved satisfaction with lighting when employed in an environmental control system that employs mesh shades. As a further example, the environmental control system 100 may maintain the CCT light within about 4104 degrees Kelvin to about 5776 degrees Kelvin between four to two hours before the survey is sent or otherwise provide to one or more occupants, or otherwise received or completed by the one or more occupants. Alternatively, or in sequence, the environmental control system 100 may maintain the CCT of light within about 4401 degrees Kelvin to about 5839 degrees Kelvin starting up to two hours before the survey is sent or otherwise provide to one or more occupants, or otherwise received or completed by the one or more occupants. The environmental control system 100 also may limit the variation in the CCT of the light from between about 30 degrees Kelvin to about 2368 degrees Kelvin, about 251 degrees Kelvin to about 496 degrees Kelvin, etc. between four to two hours before the survey is sent or otherwise provide to one or more occupants, or otherwise received or completed by the one or more occupants. Alternatively, or in sequence, the environmental control system 100 also may limit the variation in the CCT of the light from between about 7 degrees Kelvin to about 1835 degrees Kelvin, about 31 degrees Kelvin to about 378 degrees Kelvin, etc. starting up to two hours before the survey is sent or otherwise provide to one or more occupants, or otherwise received or completed by the one or more occupants.

In a mesh shade environment, the environmental control system 100 may also control the variations in correlated color temperature of light in an indoor environment in order to improve occupant satisfaction with lighting by adjusting one or more mesh shades. In some examples, the environmental control system 100 maintains the variations in correlated color temperature values between about 0 and about 2500 degrees Kelvin, about 200 and about 500, about 30 and about 2368 degrees Kelvin, or about 251 and about 496 degrees Kelvin during the first period of time. In some examples, the environmental control system 100 maintains the variations in illuminance of light between about 0 and about 2000 degrees Kelvin, about 30 and about 400 degrees Kelvin, about 7 and about 1835 degrees Kelvin, or about 31 and about 378 degrees Kelvin during the second period of time.

In a mesh shade environment, the environmental control system 100 may maintain the correlated color temperature of light below a high threshold level of about 4000 to about 6000 lux, 4100 to about 5800 lux, or about 4104 to about 5776 lux for a first period of time in order to improve satisfaction with lighting. The environmental control system 100 may also maintain the correlated color temperature of light below a high threshold level of about 4000 to about 6000 lux, about 4400 to about 6000 lux, or about 4401 to about 5839 lux for a second period of time in order to improve satisfaction with lighting.

Dynamic tint environments may include, for example, indoor environments employing one or more actuators operatively coupled to one or more electrochromic window panes. In some examples, the dynamic tint environment may be an indoor environment having at least one window including at least one pane of electrochromic glass. By some approaches, the electrochromic glass may be operatively coupled to the environmental control system 100. By some approaches, the electrochromic window panes may also be manually controllable by occupants of the indoor environment. In some examples, the electrochromic window panes may be adjustable between more than one level of visible light transmittance, solar transmittance, solar reflectance, and/or solar heat gain coefficient. For example, the electrochromic glass may be adjustable between the exemplary levels displayed in TABLE 2.

TABLE 2

|  | Level 1 | Level 2 | Level 3 | Level 4 |
| --- | --- | --- | --- | --- |
| Visible Light Transmittance (%) | 58 | 40 | 6 | 1 |
| Solar Transmittance (%) | 34 | 21 | 2 | 1 |
| Solar Reflectance (%) | 15 | 12 | 11 | 12 |
| Heat Gain Coefficient | 0.41 | 0.28 | 0.11 | 0.09 |

In a dynamic tint environment, the environmental control system 100 may adjust the illuminance of light in an indoor environment in order to improve occupant satisfaction with lighting by adjusting one or more electrochromic window panes. By some approaches, the environmental control system 100 may maintain the illuminance of light as measured by a desktop sensor within a particular range, above a low threshold value, and/or below a high threshold value in order to improve occupant satisfaction with lighting in a dynamic tint environment. The illuminance ranges may take into account both natural light and artificial light as measured by one or more desktop light sensors. By some approaches, the system maintains the illuminance of light between about 300 and about 70000 lux, about 391 and about 69271 lux, or within any range within the low threshold level and the high threshold level, as measured by one or more desktop light sensors. By some approaches, the system maintains the illuminance of light in a dynamic tint environment above a low threshold level of about 300 lux or about 391 lux. By some approaches, the system maintains the illuminance of light in a dynamic tint environment below a high threshold level of about 70000 lux or about 69270 lux. In some examples, the environmental control system 100 maintains the range of illuminance values between about 500 and about 15000 lux, about 600 and about 14000 lux, about 639 and about 13212, about 675 and about 12328 lux, and about 732 and about 10283 lux during the first period of time. In some examples, the environmental control system 100 maintains the range of illuminance values between about 700 and about 6000 lux, between about 800 and about 5000 lux, about 819 and about 3921 lux, about 957 and about 4317 lux, or about 1487 and about 3913 lux during the second period of time. By some approaches, the illuminance values during the first period of time and the second period of time may by the mean illuminance values. These illuminance metrics may correspond to improved satisfaction with lighting when employed in an environmental control system that employs electrochromic window panes.

In a dynamic tint environment, the environmental control system 100 may also control the variations in illuminance of light in an indoor environment in order to improve occupant satisfaction with lighting by adjusting one or more electrochromic window panes. In some examples, the environmental control system 100 maintains the variations in illuminance values between about 100 and about 20000 lux, about 250 and about 15000 lux, about 198 and about 19104 lux, or about 279 and about 13614 lux during the first period of time. In some examples, the environmental control system 100 maintains the variations in illuminance of light between about 50 and about 1500 lux, about 150 and about 850 lux, about 79 and about 999 lux, or about 197 and about 821 lux during the second period of time. As a further example, the environmental control system 100 may maintain the illuminance of light within about 639 lux to about 13213 lux between four to two hours before the survey is sent or otherwise provide to one or more occupants, or otherwise received or completed by the one or more occupants. Alternatively, or in sequence, the environmental control system 100 may maintain the illuminance of light within about 819 lux to about 4317 lux starting up to two hours before the survey is sent or otherwise provide to one or more occupants, or otherwise received or completed by the one or more occupants. The environmental control system 100 also may limit the variation in the illuminance of the light from between about 198 lux to about 19104 lux, about 279 lux to about 13614 lux, etc. between four to two hours before the survey is sent or otherwise provide to one or more occupants, or otherwise received or completed by the one or more occupants. Alternatively, or in sequence, the environmental control system 100 also may limit the variation in the illuminance of the light from between about 79 lux to about 999 lux, about 197 lux to about 821 lux, etc. starting up to two hours before the survey is sent or otherwise provide to one or more occupants, or otherwise received or completed by the one or more occupants.

In a dynamic tint environment, the environmental control system 100 may maintain the illuminance of light below a high threshold level of about 500 to about 15000 lux, about 600 to about 14000 lux, or about 639 to about 13213 lux for a first period of time in order to improve satisfaction with lighting. The environmental control system 100 may also maintain the illuminance of light below a high threshold level of about 600 to about 6000 lux, about 800 to about 5000 lux, or about 819 to about 4317 lux for a second period of time in order to improve satisfaction with lighting.

In a dynamic tint environment, the environmental control system 100 may adjust the correlated color temperature of light in an indoor environment in order to improve occupant satisfaction with lighting by adjusting one or more electrochromic window panes. By some approaches, the environmental control system 100 may maintain the correlated color temperature of light as measured by a desktop sensor within a particular range, above a low threshold value, and/or below a high threshold value in order to improve occupant satisfaction with lighting in a dynamic tint environment. The correlated color temperature ranges may take into account both natural light and artificial light as measured by one or more desktop light sensors. By some approaches, the system maintains the correlated color temperature of light between about 3000 and about 19000 degrees Kelvin, about 3500 and about 18500 degrees Kelvin, or about 3544 and about 18354 degrees Kelvin, or within any range within the low threshold level and the high threshold level, as measured by one or more desktop light sensors. By some approaches, the system maintains the correlated color temperature of light in a dynamic tint environment above a low threshold level of about 3000 degrees Kelvin, about 3500 degrees Kelvin, or about 3544 degrees Kelvin. By some approaches, the system maintains the correlated color temperature of light in a dynamic tint environment below a high threshold level of 18354 degrees Kelvin. In some examples, the environmental control system 100 maintains the range of correlated color temperature values between about 4000 and about 7000 degrees Kelvin, about 4700 and about 6500 degrees Kelvin, about 4701 and about 6337 degrees Kelvin, about 4827 and about 6324 degrees Kelvin, about 4701 and about 6337 degrees Kelvin, or about 4715 and about 6256 degrees Kelvin during the first period of time. In some examples, the environmental control system 100 maintains the range of correlated color temperature values between about 5000 and about 6000 degrees Kelvin, about 5100 and about 5800 degrees Kelvin, about 5115 and about 5710 degrees Kelvin, about 4833 and about 5678 degrees Kelvin, or about 4776 and about 5818 degrees Kelvin during the second period of time. By some approaches, the correlated color temperature values during the first period of time and the second period of time may by the mean correlated color temperature values. These correlated color temperature metrics may correspond to improved satisfaction with lighting when employed in an environmental control system that employs electrochromic window panes.

In a dynamic tint environment, the environmental control system 100 may also control the variations in correlated color temperature of light in an indoor environment in order to improve occupant satisfaction with lighting by adjusting one or more electrochromic window panes. In some examples, the environmental control system 100 maintains the variations in correlated color temperature values between about 100 and about 3000 degrees Kelvin, about 400 and about 1500, about 124 and about 2815 degrees Kelvin, or about 415 and about 1480 degrees Kelvin during the first period of time. In some examples, the environmental control system 100 maintains the variations in illuminance of light between about 20 and about 500 degrees Kelvin, about 40 and about 300 degrees Kelvin, about 27 and about 378 degrees Kelvin, or about 40 and about 239 degrees Kelvin during the second period of time. As a further example, the environmental control system 100 may maintain the CCT light within about 4701 degrees Kelvin to about 6337 degrees Kelvin between four to two hours before the survey is sent or otherwise provide to one or more occupants, or otherwise received or completed by the one or more occupants. Alternatively, or in sequence, the environmental control system 100 may maintain the CCT of light within about 4776 degrees Kelvin to about 5818 degrees Kelvin starting up to two hours before the survey is sent or otherwise provide to one or more occupants, or otherwise received or completed by the one or more occupants. The environmental control system 100 also may limit the variation in the CCT of the light from between about 124 degrees Kelvin to about 2815 degrees Kelvin, about 415 degrees Kelvin to about 1480 degrees Kelvin, etc. between four to two hours before the survey is sent or otherwise provide to one or more occupants, or otherwise received or completed by the one or more occupants. Alternatively, or in sequence, the environmental control system 100 also may limit the variation in the CCT of the light from between about 27 degrees Kelvin to about 378 degrees Kelvin, about 40 degrees Kelvin to about 239 degrees Kelvin, etc. starting up to two hours before the survey is sent or otherwise provide to one or more occupants, or otherwise received or completed by the one or more occupants.

In a dynamic tint environment, the environmental control system 100 may maintain the correlated color temperature of light below a high threshold level of about 4000 to about 7000 lux, 4700 to about 6500 lux, or about 4701 to about 6337 lux for a first period of time in order to improve satisfaction with lighting. The environmental control system 100 may also maintain the correlated color temperature of light below a high threshold level of about 4000 to about 7000 lux, about 4500 to about 6000 lux, or about 4776 to about 5818 lux for a second period of time in order to improve satisfaction with lighting.

There is a relationship between access to natural light in a discrete space and satisfaction and/or cognitive function for an occupant of the discrete space. For example, an occupant's satisfaction with lighting and satisfaction with the overall environment may be improved with access to natural light. Furthermore, an occupant's cognitive function performance may be improved with access to natural light. For example, an occupant's working memory (i.e., an occupant's ability to hold and manipulate items in memory) and/or inhibition (i.e., an occupant's ability to inhibit responses when it is necessary to do so) may be improved by access to natural light. Thus, in some embodiments, the level of access to natural light may be employed by the system to improve an occupant's satisfaction and/or cognitive function. For example, the method described with reference to FIG. 6 may be used to adjust or maintain a level of natural light in an indoor environment in order to improve an occupant's satisfaction and/or cognitive function.

FIG. 7 is a flow diagram for a method of operating the environmental control system to assign a particular discrete space to at least one occupant of the indoor environment in accordance with some embodiments. The method of FIG. 7 may be deployed by the environmental control system 100 or portions thereof as described with reference to FIG. 1. By one approach, this method is primarily executed by control subsystem 140 of environmental control system 100. In the method of FIG. 7, the environmental control system 100 assigns a discrete space in the indoor environment to an occupant or group of occupants.

In the method of FIG. 7, at step 705, the environmental control system 100 receives a first set of lighting data, where the first set of lighting data includes parameters that indicative of the presence of natural light in the first discrete space. By some approaches, the first set of lighting data may include one or more lighting parameters measured by at least one sensor in the first discrete space. In some embodiments, the sensor in the first discrete space may be, for example, an illuminance sensor or a correlated color temperature sensor. The at least one sensor in the first discrete space may be a light sensor 160, air sensor 165, acoustic sensor 170, and/or occupancy sensor 175 as described with reference to FIG. 1.

By other approaches, the first set of lighting data may include a parameter that indicates whether a first discrete space has access to or is otherwise near a window. For example, lighting data may be based on an electronic floor plan of the indoor environment which indicates the location of the first discrete space relative to windows of the indoor environment. By some approaches, for example, the electronic floor plan may be used to evaluate a distance from the first discrete space to window and whether the view of the window from the first discrete space is unobstructed.

By other approaches, the lighting data may include data collected via an electronic survey completed by an occupant of the first discrete space. The electronic survey may, for example, may include a questionnaire that includes a question asking the occupant whether the first discrete space has access to natural light or access to a window.

At step 710, the environmental control system 100 determines a level of access to natural light for the first discrete space based, at least in part, on the first set of lighting data. For example, the level of access to natural light. In some embodiments, the environmental control system 100 may determine whether natural light is present in the discrete space, for example, in a yes or no analysis.

In some embodiments, for example, the environmental control system 100 may determine a level of access to natural light via one or more lighting parameters that are indicative of access to natural light. In one example, an increase in a lighting parameter may indicate an increase in a level of access to natural light. In one approach, lighting parameters that may indicate an increase in a level of access to natural light may include, for example, the variation in the illuminance of light or the variation in the correlated color temperature of light.

In other examples, when a lighting parameter is above a threshold value, that may indicate that the discrete space has access to natural light. By one approach, an illuminance of light that is between about 100 lux and about 500 lux, between about 200 lux and about 400 lux, between about 250 lux and about 350 lux, or between about 275 lux and about 325 lux may indicate that the discrete space has access to natural light. In another approach, a correlated color temperature of light that is between about 3000 degrees Kelvin and about 6000 degrees Kelvin, between about 3500 degrees Kelvin and about 5500 degrees Kelvin, between about 4000 degrees Kelvin and about 4500 degrees Kelvin, or between about 4200 degrees Kelvin and about 4300 degrees Kelvin may indicate that the discrete space has access to natural light.

In some examples, when a lighting parameter is within a particular range, that may indicate that the discrete space has access to natural light. By one approach, when illuminance of light is between about 200 lux and about 700 lux, between about 300 lux and about 600 lux, or between about 400 lux and about 500 lux, that may indicate that the discrete space has access to natural light. In another approach, when the correlated color temperature of light is within the range of between about 3000 degrees Kelvin and about 7000 degrees Kelvin, between about 4000 degrees Kelvin and about 6000 degrees Kelvin, or between about 4500 degrees Kelvin and about 5500 degrees Kelvin, that may indicate that the discrete space has access to natural light.

There is a relationship between access to natural light in a discrete space and satisfaction and/or cognitive function for an occupant of the discrete space. For example, an occupant's satisfaction with lighting and satisfaction with the overall environment may be improved with access to daylight. Furthermore, an occupant's cognitive function performance may be improved with access to natural light. For example, an occupant's working memory (i.e., an occupant's ability to hold and manipulate items in memory) and/or inhibition (i.e., an occupant's ability to inhibit responses when it is necessary to do so) may be improved by access to natural light. Thus, in some embodiments, the level of access to natural light may be employed by the system to improve an occupant's satisfaction and/or cognitive function. For example, the environmental control system 100 may employ data on the level of access to natural light in an indoor environment to assign an occupant to a particular discrete space in the indoor environment.

At step 715, the environmental control system 100 receives a second set of lighting data, where the second set of lighting data includes parameters that indicative of the presence of natural light in the second discrete space. By some approaches, the second set of lighting data may include one or more lighting parameters that are measured by at least one sensor in the second discrete space. In some embodiments, the sensor in the second discrete space may be, for example, an illuminance sensor or a correlated color temperature sensor. The at least one sensor in the second discrete space may be a light sensor 160, air sensor 165, acoustic sensor 170, and/or occupancy sensor 175 as described with reference to FIG. 1.

By other approaches, the second set of lighting data may include a parameter that indicates whether a second discrete space has access to a window. For example, lighting data may be based on an electronic floor plan of the indoor environment which indicates the location of the second discrete space relative to windows of the indoor environment. By some approaches, for example, the electronic floor plan may be used to evaluate or determine a distance from the second discrete space to one or more windows and whether the view of the window(s) from the second discrete space is unobstructed.

By other approaches, the lighting data may include data collected via an electronic survey completed by an occupant of the second discrete space. The electronic survey may, for example, may include a questionnaire that includes a question asking the occupant whether the second discrete space has access to natural light or access to a window.

At step 720, the environmental control system 100 determines a level of access to natural light for the second discrete space based, at least in part, on the second set of lighting data. The methods for determining a level of access to natural light for a second discrete space is described with reference to step 710 of FIG. 7.

At step 725, the environmental control system 100 determines whether working memory is a priority for the occupant or group of occupants. In some embodiments, the environmental control system 100 may also determine whether inhibition is a priority for the occupant or group of occupants. In some embodiments, the environmental control system may also determine whether task switching is a priority for an occupant or group of occupants.

In some embodiments, the system 100 may determine or identify whether working memory, inhibition, and/or task switching is a priority for an occupant or group of occupants by collecting cognitive function priority data via an electronic survey transmitted to the occupant or group of occupants. In some embodiments, the electronic survey may be transmitted to the occupant or group or occupants via one or more electronic user devices associated with the occupant or group of occupants. By some approaches, the electronic survey may include one or more questions prompting the occupant to assign a priority level to various executive functions, for example, working memory, inhibition, and/or task switching. By some approaches, the occupant may assign a priority level for various cognitive functions, such as the executive functions of working memory, inhibition, and/or task switching for different periods of time. By some approaches, the electronic survey may be transmitted to the occupant or group of occupants periodically, for example, on a daily, weekly, or monthly basis or at other time-intervals. In other approaches, the electronic survey may be a one-time survey.

In some embodiments, the system may determine or identify whether working memory, inhibition, and/or task switching is a priority for an occupant or group of occupants via an activity that is currently being or scheduled to be performed by the occupant or group of occupants. By some approaches, a schedule of one or more activities currently being or scheduled to be performed by the occupant or group of occupants may be stored in a local or remote database. An exemplary database, for example, may include an identifier that identifies the occupant or group of occupants. The exemplary database may include one or more activities associated with the occupant and group of occupants and the corresponding, activity start time(s), activity end time(s), and activity cognitive function data. The activity cognitive function data, for example, may identify whether the activity requires inhibition, task switching, and/or cognitive function.

At step 730, the environmental control system 100 determines whether to assign at least one of the first discrete space or the second discrete space to the occupant or group of occupants immediately, starting at some time, for some period of time, etc. In some embodiments, the system may determine whether assign the first discrete space or second discrete space to the occupant or group of occupants based, at least in part on whether working memory, inhibition, and/or task switching is a priority for the occupant or group of occupants immediately, starting at some time, for some period of time, etc. In some embodiments, the system may also determine whether to assign the first discrete space or second discrete space to the occupant or group of occupants based, at least in part on the level of access to natural light in the first discrete space and second discrete space.

By some approaches, when working memory, inhibition, and/or task switching is a priority for the occupant or group of occupants and when the level of access to natural light is greater in the first discrete space than in the second discrete space, the system determines that the occupant or group of occupants is assigned to the first discrete space. By some approaches, when working memory, inhibition, and/or task switching is a priority for the occupant or group of occupants and when the level of access to natural light is greater in the second discrete space than in the first discrete space, the system determines that the occupant or group of occupants is assigned to the first second discrete space.

By some approaches, when working memory, inhibition, and/or task switching is not a priority for the occupant or group of occupants and when the level of access to natural light is greater in the first discrete space than in the second discrete space, the system determines that the occupant or group of occupants is assigned to the second discrete space. By some approaches, when working memory, inhibition, and/or task switching is not a priority for the occupant or group of occupants and when the level of access to natural light is greater in the second discrete space than in the first discrete space, the system determines that the occupant or group of occupants is assigned to the first second discrete space.

At step, 740, the environmental control system assigns at least one of the first discrete space or the second discrete space to the occupant or group of occupants, based at least in part on the discrete space determined in step 730.

At step 745, the environmental control system 100 instructs the occupant or group of occupants to occupy the assigned discrete space. In some embodiments, instructing one or more occupant to occupy a particular discrete space in the indoor environment includes sending a notification to the occupant(s). The notification, for example, may include instructions to occupy the particular discrete space.

It should be understood that, while the method described in FIG. 7 addresses two discrete spaces, the method may be deployed in an indoor environment having more than two discrete spaces.

FIG. 8 illustrates a flow diagram for a method of operating the environmental control system that assigns particular discrete spaces to occupants of the indoor environment. The method of FIG. 8 may be deployed by the environmental control system 100 or portions thereof as described with reference to FIG. 1. By one approach, this method is primarily executed by control subsystem 140 of environmental control system 100. In the method of FIG. 8, the environmental control system 100 assigns discrete spaces in the indoor environment multiple occupants of the indoor environment.

In the method of FIG. 8, at step 805, the environmental control system 100 receives a first set of lighting data from at least one sensor in a first discrete space in the indoor environment. The methods for receiving lighting data from at least one sensor in a discrete space are described with reference to step 705 of FIG. 7.

At step 810, the environmental control system 100 determines a level of access to natural light for the first discrete space based, at least in part, on the first set of lighting data. The methods for determining a level of access to natural light for a second discrete space is described with reference to step 710 of FIG. 7.

At step 815, the environmental control system 100 receives a second set of lighting data from at least one sensor in a second discrete space in the indoor environment. The methods for receiving lighting data from at least one sensor in a discrete space are described with reference to step 705 of FIG. 7.

At step 820, the environmental control system 100 determines a level of access to natural light for the second discrete space based, at least in part, on the second set of lighting data. The methods for determining a level of access to natural light for a second discrete space is described with reference to step 710 of FIG. 7.

At step 825, the environmental control system 100 determines whether working memory is a priority for a first occupant or group of occupants. In some embodiments, the environmental control system 100 may also determine whether inhibition is a priority for the first occupant or group of occupants. In some embodiments, the environmental control system 100 may also determine whether inhibition is a priority for the occupant or group of occupants. In some embodiments, the environmental control system may also determine whether task switching is a priority for an occupant or group of occupants. The methods for determining whether working memory, inhibition, and/or task switching are a priority for an occupant or group of occupants are described with reference to step 725 in FIG. 7.

In some embodiments, the system 100 may determine or identify whether working memory, inhibition, and/or task switching is a priority for an occupant or group of occupants by collecting cognitive function priority data via an electronic survey transmitted to the occupant or group of occupants. In some embodiments, the electronic survey may be transmitted to the occupant or group or occupants via one or more electronic user devices associated with the occupant or group of occupants. By some approaches, the electronic survey may include one or more questions prompting the occupant to assign a priority level to various executive functions, for example, working memory, inhibition, and/or task switching. By some approaches, the occupant may assign a priority level for various cognitive functions, such as the executive functions of working memory, inhibition, and/or task switching for different periods of time. By some approaches, the electronic survey may be transmitted to the occupant or group of occupants periodically, for example, on a daily, weekly, or monthly basis or at other time-intervals. In other approaches, the electronic survey may be a one-time survey.

In some embodiments, the system may determine or identify whether working memory, inhibition, and/or task switching is a priority for an occupant or group of occupants via an activity that is currently being or scheduled to be performed by the occupant or group of occupants. By some approaches, a schedule of one or more activities currently being or scheduled to be performed by the occupant or group of occupants may be stored in a local or remote database. An exemplary database, for example, may include an identifier that identifies the occupant or group of occupants. The exemplary database may include one or more activities associated with the occupant and group of occupants and the corresponding, activity start time(s), activity end time(s), and activity cognitive function data. The activity cognitive function data, for example, may identify whether the activity requires inhibition, task switching, and/or cognitive function.

At step 830, the environmental control system 100 determines whether working memory is a priority for a second occupant or group of occupants. In some embodiments, the environmental control system 100 may also determine whether inhibition is a priority for the first occupant or group of occupants. In some embodiments, the environmental control system 100 may also determine whether inhibition is a priority for the occupant or group of occupants. In some embodiments, the environmental control system may also determine whether task switching is a priority for an occupant or group of occupants. The methods for determining whether working memory, inhibition, and/or task switching are a priority for an occupant or group of occupants are described with reference to step 725 in FIG. 7.

In some embodiments, the system 100 may determine or identify whether working memory, inhibition, and/or task switching is a priority for an occupant or group of occupants by collecting cognitive function priority data via an electronic survey transmitted to the occupant or group of occupants. In some embodiments, the electronic survey may be transmitted to the occupant or group or occupants via one or more electronic user devices associated with the occupant or group of occupants. By some approaches, the electronic survey may include one or more questions prompting the occupant to assign a priority level to various executive functions, for example, working memory, inhibition, and/or task switching. By some approaches, the occupant may assign a priority level for various cognitive functions, such as the executive functions of working memory, inhibition, and/or task switching for different periods of time. By some approaches, the electronic survey may be transmitted to the occupant or group of occupants periodically, for example, on a daily, weekly, or monthly basis or at other time-intervals. In other approaches, the electronic survey may be a one-time survey.

In some embodiments, the system may determine or identify whether working memory, inhibition, and/or task switching is a priority for an occupant or group of occupants via an activity that is currently being or scheduled to be performed by the occupant or group of occupants. By some approaches, a schedule of one or more activities currently being or scheduled to be performed by the occupant or group of occupants may be stored in a local or remote database. An exemplary database, for example, may include an identifier that identifies the occupant or group of occupants. The exemplary database may include one or more activities associated with the occupant and group of occupants and the corresponding, activity start time(s), activity end time(s), and activity cognitive function data. The activity cognitive function data, for example, may identify whether the activity requires inhibition, task switching, and/or cognitive function.

At step 835, the environmental control system 100 assigns at least one of the first discrete space or the second discrete space to the first occupant or group of occupants based at least in part on whether working memory is a priority for the first group of occupants and the level of access to natural light in the first discrete space and second discrete space. In some embodiments, the system may assign the first or second discrete space to the first or second occupant or group of occupants based, at least in part on whether working memory, inhibition, and/or task switching is a priority for the occupant or group of occupants. In some embodiments, the system may also assign the first or second discrete space to the first or second occupant or group of occupants based, at least in part on the level of access to natural light in the first discrete space and second discrete space.

In one example, the first and second occupant or group of occupants may complete an electronic survey to assign a priority level (e.g., 1-10, 1 being the lowest priority, 10 being the highest priority) to working memory. If the first occupant, for example, assigns a 5 to working memory and the second occupant assigns a 1 to working memory, then the environmental control system 100 may assign the first occupant to a discrete space having a higher level of natural light in order to improve the first occupant's working memory. For example, if a first discrete space is closer to a window than a second discrete space, the environmental control system 100 may assign the first occupant to the first discrete space. By one approach, the first and second occupants may be occupants of an office space and the approach of step 835 may be employed to assign the occupants to workspaces within an office space. In another approach, the first and second occupants may be occupants of a school and step 835 may be employed to assign the occupants to classrooms, study spaces, and/or testing spaces.

In another example, environmental control system 100 may access one or more electronic schedules to determine an activity currently being or scheduled to be performed by the first and second occupants. The system may then assign a priority level to working memory based on the activity. For example, if the activity for the first occupant requires brainstorming, math, reading comprehension, or complex problem solving, the system may be configured to assign a high priority level to working memory. Likewise, if the activity scheduled for the second occupant does not require brainstorming, math, reading comprehension, or complex problem solving, the system may be configured to assign a low priority level to working memory. Since working memory is a higher priority for the first occupant than it is for the second occupant, then the environmental control system 100 may assign the first occupant to a discrete space having a higher level of natural light in order to improve the first occupant's working memory.

By some approaches, when working memory, inhibition, and/or task switching is a higher priority for the first occupant or group of occupants than it is for the second occupant or group of occupants and when the level of access to natural light is greater in the first discrete space than the second discrete space, the system assigns the first discrete space to the first occupant or group of occupants. By some approaches, when working memory, inhibition, and/or task switching is a higher priority for the second occupant or group of occupants than it is for the first occupant or group of occupants and when the level of access to natural light is greater in the first discrete space than the second discrete space, the system assigns the first discrete space to the second occupant or group of occupants.

By some approaches, when working memory, inhibition, and/or task switching is a higher priority for the first occupant or group of occupants than it is for the second occupant or group of occupants and when the level of access to natural light is greater in the second discrete space than the first discrete space, the system assigns the second discrete space to the first occupant or group of occupants. By some approaches, when working memory, inhibition, and/or task switching is a higher priority for the second occupant or group of occupants than it is for the first occupant or group of occupants and when the level of access to natural light is greater in the second discrete space than the first discrete space, the system assigns the first discrete space to the second occupant or group of occupants.

At step 840, the environmental control system 100 instructs the occupant or group of occupants to occupy the assigned discrete space. In some embodiments, instructing one or more occupant to occupy a particular discrete space in the indoor environment includes sending a notification to the occupant(s), via, for example, one or more electronic user devices, which may include personal device(s), such as a laptop or handheld device, and/or installed electronic user devices such as a kiosk or television screen, among other optional electronic user devices. The notification, for example, may include instructions to occupy the particular discrete space.

This application relates to International Application No. PCT/US17/48382, filed Aug. 24, 2017, which claims the benefit of U.S. Provisional Application No. 62/379,086, filed Aug. 24, 2016, and claims the benefit of U.S. Provisional Application No. 62/379,079, filed Aug. 24, 2016, all of which are hereby incorporated by reference herein in their entirety. This application also relates to U.S. application Ser.

No. 15/421,022, filed Jan. 31, 2017, and U.S. application Ser. No. 15/409,233, filed Jan. 18, 2017, both of which are continuations of U.S. application Ser. No. 14/012,444, filed Aug. 28, 2013, which claims the benefit of U.S. Provisional Application No. 61/694,125, filed Aug. 28, 2012, all of which are hereby incorporated by reference herein in their entirety. This application also relates to U.S. application Ser. No. 15/121,953, now allowed, filed Aug. 26, 2016, which is a National Stage Entry of PCT/US15/17528, filed Feb. 25, 2015, and which claims the benefit of U.S. Provisional Application No. 61/946,159, all of which are hereby incorporated by reference herein in their entirety. This application also relates to U.S. application Ser. No. 15/249,184, filed Aug. 26, 2016, which is a continuation of International Application No. PCT/US15/17528, filed Feb. 25, 2015, and which claims the benefit of U.S. Provisional Application No. 61/946,159, all of which are hereby incorporated by reference herein in their entirety. This application also relates to International Application No. PCT/US13/57070, filed Aug. 28, 2013, which claims the benefit of U.S. Provisional Application No. 61/694,125, all of which are hereby incorporated by reference herein in their entirety.

It should be understood that, while the method described in FIG. 8 addresses two discrete spaces, the method may be deployed in an indoor environment having more than two discrete spaces. Furthermore, it should be understood that, while the method described in FIG. 8 addresses two occupants or groups of occupants, the method may be deployed for an indoor environment have more than two occupants or groups of occupants.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An environmental control system for improving satisfaction with lighting in an indoor environment, the environmental control system comprising:
   at least one light sensor configured to collect and transmit lighting data;
   a lighting subsystem comprising at least one light adjustment mechanism operable to effect a plurality of lighting parameters in the indoor environment; and
   a control circuit including at least one processor and at least one nontransitory processor-readable medium communicatively coupled to the at least one processor, the at least one light sensor, and the lighting subsystem, wherein the control circuit is configured to improve satisfaction with lighting for a first occupant by:
      receiving lighting satisfaction data for at least one occupant of the indoor environment, the lighting satisfaction data indicative of a satisfaction with lighting for the at least one occupant of the indoor environment,
      receiving lighting data from the at least one light sensor, the lighting data including at least one lighting parameter in the indoor environment, and
      maintaining the at least one lighting parameter in the indoor environment within a range, wherein the range is identified based at least in part on the lighting satisfaction data and the lighting data via the at least one light adjustment mechanism.

2. The environmental control system of claim 1, wherein the system maintains correlated color temperature of light within a first range for about 4 hours to about 2 hours before an electronic survey is transmitted to the at least one occupant and within a second range for about 2 hours to about 0 hours before the electronic survey is transmitted to the at least one occupant, the first range being between about 4000 degrees Kelvin and about 6000 degrees Kelvin, and the second range being between about 4000 degrees Kelvin and about 6000 degrees Kelvin, and wherein the control circuit is further configured to determine the lighting satisfaction data based, at least in part, on responses to the survey by the at least one occupant.

3. The environmental control system of claim 1, wherein the system maintains illuminance of light within a first range for about 4 hours to about 2 hours before an electronic survey is transmitted to the at least one occupant and within a second range for about 2 hours to about 0 hours before the electronic survey is transmitted to the at least one occupant, the first range being between about 500 lux and about 13000 lux, and the second range being between about 100 lux and about 14000 lux, and wherein the control circuit is further configured to determine the lighting satisfaction data based, at least in part, on responses to the survey by the at least one occupant.

4. The environmental control system of claim 1 wherein the control circuit is further configured to maintain correlated color temperature of light below a first high threshold value for about 4 hours to about 2 hours before an electronic survey is transmitted to the at least one occupant and below a second high threshold value for about 2 hours to about 0 hours before the electronic survey is transmitted to the at least one occupant, the first high threshold value being between about 4000 degrees Kelvin and about 6000 degrees Kelvin, and the second high threshold value being between about 4000 degrees Kelvin and about 6000 degrees Kelvin, and wherein the control circuit is further configured to determine the lighting satisfaction data based, at least in part, on responses to the survey by the at least one occupant.

5. The environmental control system of claim 1, wherein the control circuit is further configured to maintain illuminance of light below a first high threshold value for about 4 hours to about 2 hours before an electronic survey is transmitted to the at least one occupant and below a second high threshold value for about 2 hours to about 0 hours before the electronic survey is transmitted to the at least one occupant, the first high threshold value being between about 400 lux and about 14000 lux, and the second high threshold value being between about 50 lux and about 15000 lux, and wherein the control circuit is further configured to determine the lighting satisfaction data based, at least in part, on responses to the survey by the at least one occupant.

6. The environmental control system of claim 1 wherein the control circuit is further configured to maintain correlated color temperature of light above a first low threshold value for about 4 hours to about 2 hours before an electronic survey is transmitted to the at least one occupant and above a second low threshold value for about 2 hours to about 0 hours before the electronic survey is transmitted to the at least one occupant, the first low threshold value being between about 4000 degrees Kelvin, and the second low threshold value being between about 4000 degrees Kelvin, and wherein the control circuit is further configured to determine the lighting satisfaction data based, at least in part, on responses to the survey by the at least one occupant.

7. The environmental control system of claim 1, wherein the control circuit is further configured to maintain illuminance of light above a first low threshold value for about 4 hours to about 2 hours before an electronic survey is transmitted to the at least one occupant and below a second low threshold value for about 2 hours to about 0 hours before the electronic survey is transmitted to the at least one occupant, the first high threshold value being about 400 lux, and the second low threshold value being about 50 lux, and wherein the control circuit is further configured to determine the lighting satisfaction data based, at least in part, on responses to the survey by the at least one occupant.

8. The environmental control system of claim 1, wherein the control circuit is further configured improve satisfaction with lighting by:
receiving biometric data from the at least one biometric sensor associated with the at least one occupant of the indoor environment, and
wherein the range is identified based at least in part on the biometric data.

9. The environmental control system of claim 8, wherein the control circuit is further configured to improve satisfaction with lighting by:
analyzing, via the at least one processor, the lighting satisfaction data, the lighting data, and the biometric data to identify correlations between the at least one lighting parameter, the biometric data, and the satisfaction with lighting for the first occupant, and
wherein the range is identified based at least in part on the identified correlations.

10. The environmental control system of claim 1, wherein the control circuit is further configured to improve satisfaction with lighting by:
analyzing, via the at least one processor, the lighting satisfaction data and the lighting data to identify correlations between the at least one lighting parameter and the satisfaction with lighting for the at least one occupant, and
wherein the range is identified based at least in part on the identified correlations.

11. The environmental control system of claim 1, wherein the at least one light sensor is positioned on a desk within a workspace associated with the first occupant.

12. A method for improving satisfaction with lighting in at least a portion of an indoor environment, comprising the steps of:
receiving lighting satisfaction data for at least one occupant of the indoor environment, the lighting satisfaction data indicative of a satisfaction with lighting for the at least one occupant of the indoor environment;
receiving lighting data from at least one light sensor, the lighting data including at least one lighting parameter in the indoor environment; and
maintaining the at least one lighting parameter in the indoor environment within a range, wherein the range is identified based at least in part on the lighting satisfaction data and the lighting data, via at least one light adjustment mechanism operable to effect at least one lighting parameter in the indoor environment.

13. The method of claim 12 further comprising the steps of:
maintaining correlated color temperature of light below a first high threshold value for about 4 hours to about 2 hours before an electronic survey is transmitted to the at least one occupant and below a second high threshold value for about 2 hours to about 0 hours before the electronic survey is transmitted to the at least one occupant, the first high threshold value being between about 4000 degrees Kelvin and about 6000 degrees Kelvin, and the second high threshold value being between about 4000 degrees Kelvin and about 6000 degrees Kelvin; and
determining the lighting satisfaction data based, at least in part, on responses to the survey by the at least one occupant.

14. The method of claim 12, further comprising the steps of:
maintaining illuminance of light below a first high threshold value for about 4 hours to about 2 hours before an electronic survey is transmitted to the at least one occupant and below a second high threshold value for about 2 hours to about 0 hours before the electronic survey is transmitted to the at least one occupant, the first high threshold value being between about 400 lux and about 14000 lux, and the second high threshold value being between about 50 lux and about 15000 lux; and
determining the lighting satisfaction data based, at least in part, on responses to the survey by the at least one occupant.

15. The method of claim 12, further comprising the steps of:
maintaining correlated color temperature of light above a first low threshold value for about 4 hours to about 2 hours before an electronic survey is transmitted to the at least one occupant and above a second low threshold value for about 2 hours to about 0 hours before the electronic survey is transmitted to the at least one occupant, the first low threshold value being between about 4000 degrees Kelvin, and the second low threshold value being between about 4000 degrees Kelvin; and
determining the lighting satisfaction data based, at least in part, on responses to the survey by the at least one occupant.

16. The method of claim 12, further comprising the steps of:
maintaining illuminance of light above a first low threshold value for about 4 hours to about 2 hours before an electronic survey is transmitted to the at least one occupant and below a second low threshold value for about 2 hours to about 0 hours before the electronic survey is transmitted to the at least one occupant, the first high threshold value being about 400 lux, and the second low threshold value being about 50 lux; and
determining the lighting satisfaction data based, at least in part, on responses to the survey by the at least one occupant.

17. The method of claim 12, further comprising the step of:
receiving biometric data from the at least one biometric sensor associated with the at least one occupant of the indoor environment,
wherein the range is identified based at least in part on the biometric data.

18. The method of claim 17, further comprising the step of:
analyzing, via at least one processor, the lighting satisfaction data, the lighting data, and the biometric data to identify correlations between the at least one lighting parameter, the biometric data, and the satisfaction with lighting for the first occupant,
wherein the range is identified based at least in part on the identified correlations.

19. The method of claim 12, further comprising the step of:
- analyzing, via at least one processor, the lighting satisfaction data and the lighting data to identify correlations between the at least one lighting parameter and the satisfaction with lighting for the at least one occupant,
- wherein the range is identified based at least in part on the identified correlations.

20. The method of claim 12, wherein the at least one light sensor is positioned on a desk within a workspace associated with the at least one occupant.

* * * * *